(12) United States Patent
Cho

(10) Patent No.: US 11,984,042 B2
(45) Date of Patent: May 14, 2024

(54) METHODS, SYSTEMS, APPARATUSES, AND DEVICES FOR FACILITATING LEARNING OF CONCEPTS ASSOCIATED WITH MATHEMATICS

(71) Applicant: Yoonsung Cho, Long Beach, CA (US)

(72) Inventor: Yoonsung Cho, Long Beach, CA (US)

( * ) Notice: Subject to any disclaimer, the term of this patent is extended or adjusted under 35 U.S.C. 154(b) by 16 days.

(21) Appl. No.: 17/839,285

(22) Filed: Jun. 13, 2022

(65) Prior Publication Data

US 2022/0398939 A1    Dec. 15, 2022

Related U.S. Application Data

(60) Provisional application No. 63/259,002, filed on Jun. 11, 2021.

(51) Int. Cl.
*G09B 19/02* (2006.01)
*G09B 5/02* (2006.01)

(52) U.S. Cl.
CPC ............ *G09B 19/025* (2013.01); *G09B 5/02* (2013.01)

(58) Field of Classification Search
CPC ................................ G09B 19/025; G09B 5/02
See application file for complete search history.

(56) References Cited

U.S. PATENT DOCUMENTS

| | | | |
|---|---|---|---|
| 7,077,654 B2 | 7/2006 | Burtness | |
| 8,926,417 B1* | 1/2015 | Pulido | G09B 5/06 |
| | | | 463/9 |
| 9,561,431 B1* | 2/2017 | Pulido | G09B 5/06 |
| 2004/0072132 A1* | 4/2004 | Burtness | G09B 23/02 |
| | | | 434/188 |
| 2004/0084840 A1* | 5/2004 | Krigmont | G09B 11/00 |
| | | | 273/272 |
| 2009/0136908 A1 | 5/2009 | Smothers | |
| 2010/0285437 A1 | 11/2010 | Radas | |
| 2015/0206445 A1* | 7/2015 | Modde | G09B 5/06 |
| | | | 434/362 |

FOREIGN PATENT DOCUMENTS

CN    112764645 A    5/2021

* cited by examiner

*Primary Examiner* — Eddy Saint-Vil

(57) ABSTRACT

Disclosed herein is a method for facilitating learning of concepts associated with mathematics, in accordance with some embodiments. Accordingly, the method comprises receiving a request for learning a concept associated with mathematics from a user device, retrieving an example, generating a dynamic prompt for the example which assists a user in performing a task for the learning of the concept, integrating the dynamic prompt with an example component of the example, generating a visual representation of the example based on the integrating, and transmitting the visual representation to the user device. Further, the user device comprises an output device and an input device. Further, the output device presents the visual representation. Further, the input device receives an input. Further, a visual prompt representation of the dynamic prompt transitions to one of a plurality of modified visual prompt representations based on the input.

17 Claims, 88 Drawing Sheets

| 8 - | 7 - | 6 - |
|---|---|---|
| 5 - | 4 - | 3 - |
| 2 - | 1 - | (0 -) |

←

| -1 | -2 | -3 |
|---|---|---|
| -4 | -5 | -6 |
| -7 | -8 | (-9) |

METHODS, SYSTEMS, APPARATUSES, AND DEVICES FOR FACILITATING LEARNING OF CONCEPTS ASSOCIATED WITH MATHEMATICS

The current application claims a priority to the U.S. provisional patent application Ser. No. 63/259,002 filed on Jun. 11, 2021. The current application is filed on Jun. 13, 2022, while Jun. 11, 2022 was on a weekend.

FIELD OF THE INVENTION

Generally, the present disclosure relates to the field of data processing. More specifically, the present disclosure relates to methods, systems, apparatuses, and devices for facilitating learning of concepts associated with mathematics.

BACKGROUND OF THE INVENTION

Existing techniques for facilitating learning of concepts associated with mathematics are deficient with regard to several aspects. For instance, current technologies do not produce objectified numeric digits for facilitating the recognition of the numeric digits. Furthermore, current technologies do not produce the objectified numeric digits with prompts to assist users in performing tasks. Moreover, current technologies do not produce a number of prompts corresponding to values of the numeric digits.

Therefore, there is a need for improved methods, systems, apparatuses, and devices for facilitating learning of concepts associated with mathematics that may overcome one or more of the above-mentioned problems and/or limitations.

SUMMARY OF THE INVENTION

This summary is provided to introduce a selection of concepts in a simplified form, which are further described below in the Detailed Description. This summary is not intended to identify key features or essential features of the claimed subject matter. Nor is this summary intended to be used to limit the claimed subject matter's scope.

Disclosed herein is a method for facilitating learning of concepts associated with mathematics, in accordance with some embodiments. Accordingly, the method may include a step of receiving, using a communication device, a request for learning a concept associated with mathematics from at least one user device. Further, the request may include the concept. Further, the method may include a step of retrieving, using a storage device, an example associated with the concept based on the concept. Further, the example may include at least one example component. Further, the method may include a step of generating, using a processing device, a dynamic prompt for the example based on the example. Further, the dynamic prompt assists a user in performing a task for the learning of the concept. Further, the dynamic prompt may be associated with a visual prompt representation. Further, the visual prompt representation may be configured to be transitionable between a plurality of modified visual prompt representations. Further, the method may include a step of integrating, using the processing device, the dynamic prompt with the at least one example component based on the generating. Further, the method may include a step of generating, using the processing device, a visual representation of the example based on the integrating. Further, the method may include a step of transmitting, using the communication device, the visual representation of the example to the at least one user device. Further, the at least one user device may include at least one output device and at least one input device. Further, the at least one output device may be configured for presenting the visual representation of the example to the user. Further, the at least one input device may be configured for receiving at least one input from the user corresponding to the performing of the task. Further, the visual prompt representation of the dynamic prompt transitions to one of the plurality of modified visual prompt representations based on the at least one input.

Further disclosed herein is a system for facilitating learning of concepts associated with mathematics, in accordance with some embodiments. Accordingly, the system may include a communication device configured for receiving a request for learning a concept associated with mathematics from at least one user device. Further, the request may include the concept. Further, the communication device may be configured for transmitting a visual representation of an example to the at least one user device. Further, the at least one user device may include at least one output device and at least one input device. Further, the at least one output device may be configured for presenting the visual representation of the example to a user. Further, the at least one input device may be configured for receiving at least one input from the user corresponding to performing a task. Further, the system may include a storage device communicatively coupled with the communication device. Further, the storage device may be configured for retrieving the example associated with the concept based on the concept. Further, the example may include at least one example component. Further, the system may include a processing device communicatively coupled with the communication device and the storage device. Further, the processing device may be configured for generating a dynamic prompt for the example based on the example. Further, the dynamic prompt assists the user in the performing of the task for the learning of the concept. Further, the dynamic prompt may be associated with a visual prompt representation. Further, the visual prompt representation may be configured to be transitionable between a plurality of modified visual prompt representations. Further, the visual prompt representation of the dynamic prompt transitions to one of the plurality of modified visual prompt representations based on the at least one input. Further, the processing device may be configured for integrating the dynamic prompt with the at least one example component based on the generating. Further, the processing device may be configured for generating the visual representation of the example based on the integrating.

Further disclosed herein is a device for facilitating learning of concepts associated with mathematics, in accordance with some embodiments. Accordingly, the device may include at least one input device, a storage device, a processing device, and at least one output device. Further, the at least one input device may be configured for receiving a request for learning a concept associated with mathematics from a user. Further, the request may include the concept. Further, the at least one input device may be configured for receiving at least one input from the user corresponding to performing a task by the user. Further, the storage device may be communicatively coupled with the at least one input device. Further, the storage device may be configured for retrieving an example associated with the concept based on the concept. Further, the example may include at least one example component. Further, the processing device may be communicatively coupled with the storage device. Further, the processing device may be configured for generating a dynamic prompt for the example based on the example. Further, the dynamic prompt assists the user in the performing of the task for the learning of the concept. Further, the dynamic prompt may be associated with a visual prompt representation. Further, the visual prompt representation may be configured to be transitionable between a plurality of modified visual prompt representations. Further, the processing device may be configured for integrating the dynamic prompt with the at least one example component based on the generating. Further, the processing device may be configured for generating a visual representation of the example based on the integrating. Further, the at least one output device may be communicatively coupled with the processing device and the at least one input device. Further, the at least one output device may be configured for presenting the visual representation of the example to the user. Further, the visual prompt representation of the dynamic prompt in the visual representation transitions to one of the plurality of modified visual prompt representations based on the at least one input.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 76 illustrates a visual representation of a process for writing a times table of seven ("7") with prompts for facilitating the learning of the concepts associated with mathematics, in accordance with some embodiments.

FIG. 77 illustrates a visual representation of a process for writing a times table of nine ("9") with prompts for facilitating the learning of the concepts associated with mathematics, in accordance with some embodiments.

FIG. 82 illustrates a visual representation of a practice frame for learning a ten's digits of a times table of three ("3") with prompts for facilitating the learning of the concepts associated with mathematics, in accordance with some embodiments.

FIG. 83 illustrates a visual representation of a practice frame for learning a ten's digits of a times table of seven ("7") with prompts for facilitating the learning of the concepts associated with mathematics, in accordance with some embodiments.

FIG. 87 illustrates a visual representation of a practice frame for learning a ten's digits of a times table of two ("2") with prompts for facilitating the learning of the concepts associated with mathematics, in accordance with some embodiments.

FIG. 88 illustrates a visual representation of a practice frame for learning a ten's digits of a times table of eight ("8") with prompts for facilitating the learning of the concepts associated with mathematics, in accordance with some embodiments.

DETAILED DESCRIPTIONS OF THE INVENTION

Figure 1:
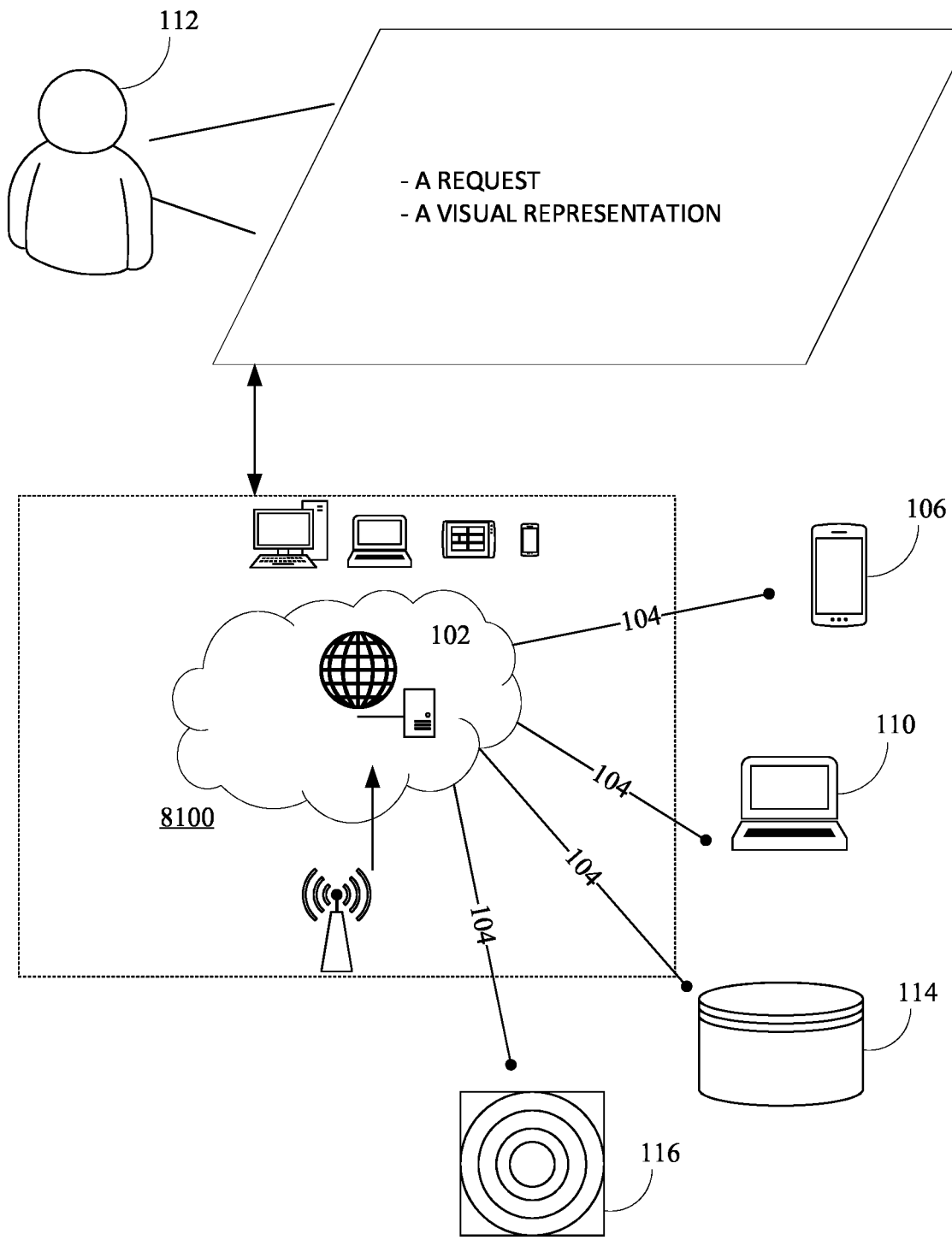
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for facilitating learning of concepts associated with mathematics, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g., a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g., Windows, Mac OS, Unix, Linux, Android, etc.) in order to provide a user interface (e.g., GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third-party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role-based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g., username, password, passphrase, PIN, secret question, secret answer etc.) and/or possession of a machine readable secret data (e.g., encryption key, decryption key, bar codes, etc.) and/or or possession of one or more embodied characteristics unique to the user (e.g., biometric variables such as, but not limited to, fingerprint, palm-print, voice characteristics, behavioral characteristics, facial features, iris pattern, heart rate variability, evoked potentials, brain waves, and so on) and/or possession of a unique device (e.g., a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g., transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g., the server computer, a client device etc.) corresponding to the performance of the one or more steps, environmental variables (e.g., temperature, humidity, pressure, wind speed, lighting, sound, etc.) associated with a device corresponding to the performance of the one or more steps, physical state and/or physiological state and/or psychological state of the user, physical state (e.g., motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g., a real-time clock), a location sensor (e.g., a GPS receiver, a GLONASS receiver, an indoor location sensor etc.), a biometric sensor (e.g., a fingerprint sensor), an environmental variable sensor (e.g., temperature sensor, humidity sensor, pressure sensor, etc.) and a device state sensor (e.g., a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g., initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

FIG. 1 is an illustration of an online platform 100 consistent with various embodiments of the present disclosure. By way of non-limiting example, the online platform 100 to facilitate learning of concepts associated with mathematics may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, end-users, administrators, service providers, service consumers, and so on. Accordingly, in some instances, electronic devices operated by the one or more relevant parties may be in communication with the platform.

A user 112, such as the one or more relevant parties, may access online platform 100 through a web-based software application or browser. The web-based software application may be embodied as, for example, but not be limited to, a website, a web application, a desktop application, and a mobile application compatible with a computing device 8100.

Figure 2:
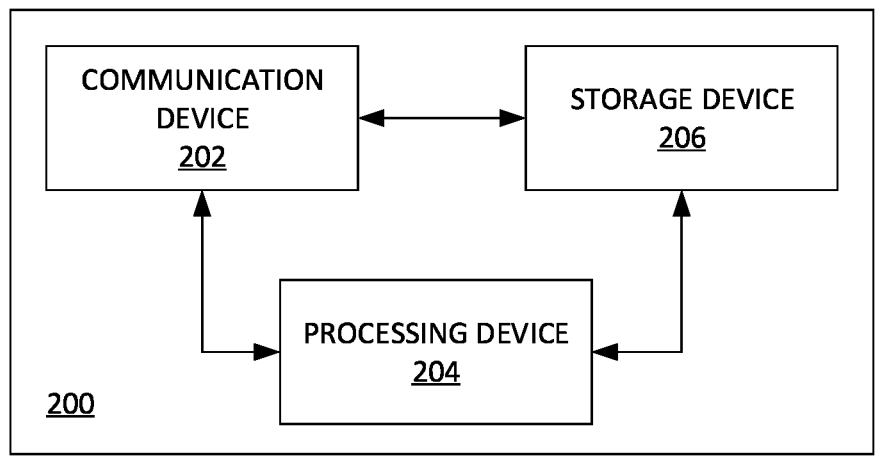
FIG. 2 is a block diagram of a system for facilitating learning of concepts associated with mathematics, in accordance with some embodiments.
Figure 3:
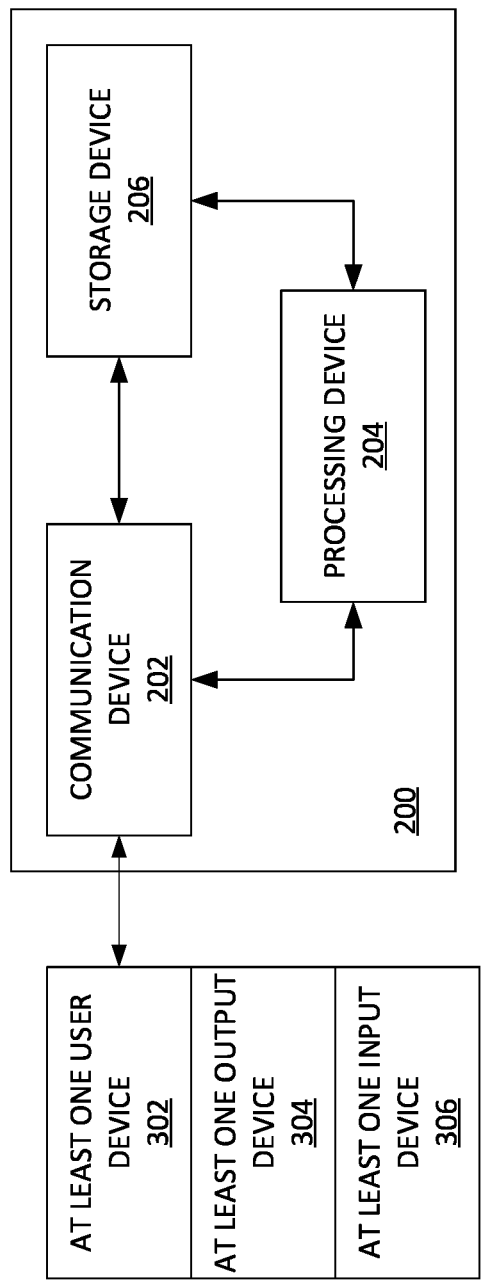
FIG. 3 is a block diagram of the system, in accordance with some embodiments.

FIG. 2 is a block diagram of a system 200 for facilitating learning of concepts associated with mathematics, in accordance with some embodiments. Accordingly, the system 200 may include a communication device 202 configured for receiving a request for learning a concept associated with mathematics from at least one user device 302, as shown in FIG. 3. Further, the at least one user device 302 may include a computing device, an IoT device, etc. Further, the concept may include a concept of number recognition, a concept of addition, a concept of subtraction, a concept of multiplication, a concept of division, etc. Further, the request may include the concept. Further, the communication device 202 may be configured for transmitting a visual representation of an example to the at least one user device 302. Further, the example may be an illustration of the concept. Further, the at least one user device 302 may include at least one output device 304 and at least one input device 306, as shown in FIG. 3. Further, the at least one output device 304 may include a display device, a touchscreen, etc. Further, the at least one output device 304 may be configured for presenting the visual representation of the example to a user. Further, the user may include a student, etc. Further, the at least one input device 306 may be configured for receiving at least one input from the user corresponding to performing a task. Further, the at least one input device 306 may include a keypad device, a touchscreen, etc. Further, the at least one input may include an answer. Further, the task may include counting, forward counting, backward counting, adding, subtracting, multiplying, dividing, etc. performed by the user.

Further, the system 200 may include a storage device 206 communicatively coupled with the communication device 202. Further, the storage device 206 may be configured for retrieving the example associated with the concept based on the concept. Further, the example may include at least one example component.

Further, the system 200 may include a processing device 204 communicatively coupled with the communication device 202 and the storage device 206. Further, the processing device 204 may be configured for generating a dynamic prompt for the example based on the example. Further, the dynamic prompt may include a spot, a mark, etc. Further, the dynamic prompt assists the user in the performing of the task for the learning of the concept. Further, the dynamic prompt may be associated with a visual prompt representation. Further, the visual prompt representation may be associated with a color, an opacity, a size, a shape, etc. Further, the visual prompt representation may be configured to be transitionable between a plurality of modified visual prompt representations. Further, each of the plurality of modified visual prompt representations may be associated with a first color, a first opacity, a first size, a first shape, etc. Further, the visual prompt representation of the dynamic prompt transitions to one of the plurality of modified visual prompt representations based on the at least one input. Further, the processing device 204 may be configured for integrating the dynamic prompt with the at least one example component based on the generating. Further, the processing device 204 may be configured for generating the visual representation of the example based on the integrating.

Further, in some embodiments, the at least one example component may include at least one numeric digit. Further, the at least one numeric digit may include an Arabic numeral. Further, the processing device 204 may be configured for generating at least one visual numeric representation of the at least one numeric digit based on the at least one numeric digit. Further, the processing device 204 may be configured for identifying at least one object similar to the at least one visual numeric representation based on the at least one visual numeric representation. Further, the at least one object may include an article, an item, a human body part, etc. Further, the processing device 204 may be configured for objectifying the at least one visual numeric representation based on the at least one object. Further, the objectifying of the at least one visual numeric representation may include morphing the at least one visual numeric representation to look like the at least one object. Further, the processing device 204 may be configured for generating at least one objectified numeric visual representation of the at least one numeric digit based on the objectifying. Further, the integrating may include overlaying the visual prompt representation of the dynamic prompt over the at least one objectified numeric visual representation. Further, the generating of the visual representation may be based on the overlaying of the visual prompt representation of the dynamic prompt over the at least one objectified numeric visual representation.

Further, in an embodiment, the dynamic prompt may include a number of dynamic prompts. Further, the number of dynamic prompts may be equal to a numerical value of one of the at least one numeric digit. Further, the overlaying of the visual prompt representation of the dynamic prompt over the at least one objectified numeric visual representation may include overlaying the visual prompt representation of each of the number of dynamic prompts over one of the at least one objectified numeric visual representation. Further, the generating of the visual representation of the example may be based on the overlaying of the visual prompt representation of each of the number of dynamic prompts over one of the at least one objectified numeric visual representation.

Further, in an embodiment, the processing device 204 may be configured for analyzing one of the at least one objectified numeric visual representation. Further, the processing device 204 may be configured for identifying a number of features in one of the at least one objectified numeric visual representation based on the analyzing. Further, the number of features of one of the at least one objectified numeric visual representation corresponds to the numerical value of one of the at least one numeric digit. Further, the processing device 204 may be configured for assigning each of the number of dynamic prompts to each of the number of features in one of the at least one objectified numeric visual representation based on the identifying of the number of features. Further, the overlaying of the visual prompt representation of each of the number of dynamic prompts over one of the at least one objectified numeric visual representation may include placing the visual prompt representation of each of the number of dynamic prompts onto each of the number of features in one of the at least one objectified numeric visual representation. Further, the generating of the visual representation of the example may be based on the placing.

Further, in an embodiment, the analyzing of the at least one objectified numeric visual representation may include analyzing the at least one objectified numeric visual representation using at least one machine learning model. Further, the at least one machine learning model may be trained for identifying distinct visual features in visual representations. Further, the identifying of the number of features in one of the at least one objectified numeric visual representation based on the analyzing of the at least one objectified numeric visual representation using the at least one machine learning model.

Further, in an embodiment, the number of dynamic prompts may be countable by the user by perceiving the visual representation of each of the number of dynamic prompts based on the presenting of the visual representation. Further, the performing of the task by the user may be based on counting the visual representation of each of the number of dynamic prompts.

Further, in some embodiments, the processing device 204 may be configured for analyzing the at least one input. Further, the processing device 204 may be configured for determining a learning status of the user based on the analyzing of the at least one input. Further, the learning status corresponds to a degree of success in the performing of the task. Further, the processing device 204 may be configured for identifying the example based on the learning status. Further, the retrieving of the example may be based on the identifying of the example.

Further, in some embodiments, the at least one example component may include at least one mathematical operator. Further, the at least one mathematical operator may include an addition operator, a subtraction operator, a multiplication operator, a division operator, etc. Further, the processing device 204 may be configured for generating at least one visual operator representation of the at least one mathematical operator based on the at least one mathematical operator.

Further, the integrating may include overlaying the visual prompt representation of the dynamic prompt over the at least one visual operator representation. Further, the generating of the visual representation may be based on the overlaying of the visual prompt representation of the dynamic prompt over the at least one visual operator representation.

Further, in some embodiments, the at least one example component may include at least one mathematical symbol. Further, the at least one mathematical symbol may include a division symbol, a division frame, a multiplication frame, a division bracket, etc. Further, the processing device 204 may be configured for generating at least one visual symbol representation of the at least one mathematical symbol based on the at least one mathematical symbol. Further, the integrating may include overlaying the visual prompt representation of the dynamic prompt over the at least one visual symbol representation. Further, the generating of the visual representation may be based on the overlaying of the visual prompt representation of the dynamic prompt over the at least one visual symbol representation.

FIG. 3 is a block diagram of the system 200, in accordance with some embodiments.

Figure 4:
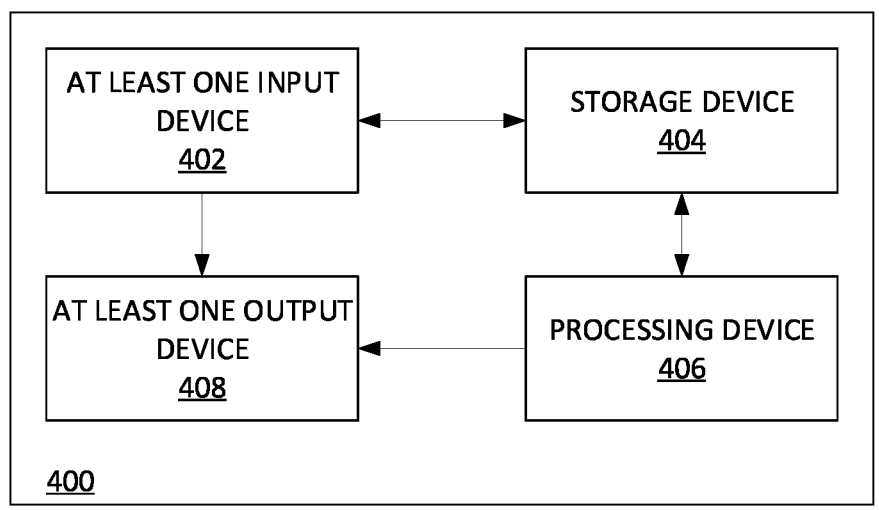
FIG. 4 is a block diagram of a device for facilitating learning of concepts associated with mathematics, in accordance with some embodiments.

FIG. 4 is a block diagram of a device 400 for facilitating learning of concepts associated with mathematics, in accordance with some embodiments. Accordingly, the device 400 may include at least one input device 402, a storage device 404, a processing device 406, and at least one output device 408.

Further, the at least one input device 402 may be configured for receiving a request for learning a concept associated with mathematics from a user. Further, the request may include the concept. Further, the at least one input device 402 may be configured for receiving at least one input from the user corresponding to performing a task by the user.

Further, the storage device 404 may be communicatively coupled with the at least one input device 402. Further, the storage device 404 may be configured for retrieving an example associated with the concept based on the concept. Further, the example may include at least one example component.

Further, the processing device 406 may be communicatively coupled with the storage device 404. Further, the processing device 406 may be configured for generating a dynamic prompt for the example based on the example. Further, the dynamic prompt assists the user in the performing of the task for the learning of the concept. Further, the dynamic prompt may be associated with a visual prompt representation. Further, the visual prompt representation may be configured to be transitionable between a plurality of modified visual prompt representations. Further, the processing device 406 may be configured for integrating the dynamic prompt with the at least one example component based on the generating. Further, the processing device 406 may be configured for generating a visual representation of the example based on the integrating.

Further, the at least one output device 408 may be communicatively coupled with the processing device 406 and the at least one input device 402. Further, the at least one output device 408 may be configured for presenting the visual representation of the example to the user. Further, the visual prompt representation of the dynamic prompt in the visual representation transitions to one of the plurality of modified visual prompt representations based on the at least one input.

Further, in some embodiments, the at least one example component may include at least one numeric digit. Further, the processing device 406 may be configured for generating at least one visual numeric representation of the at least one numeric digit based on the at least one numeric digit. Further, the processing device 406 may be configured for identifying at least one object similar to the at least one visual numeric representation based on the at least one visual numeric representation. Further, the processing device 406 may be configured for objectifying the at least one visual numeric representation based on the at least one object. Further, the processing device 406 may be configured for generating at least one objectified numeric visual representation of the at least one numeric digit based on the objectifying. Further, the integrating may include overlaying the visual prompt representation of the dynamic prompt over the at least one objectified numeric visual representation. Further, the generating of the visual representation may be further based on the overlaying of the visual prompt representation of the dynamic prompt over the at least one objectified numeric visual representation.

Figure 5:
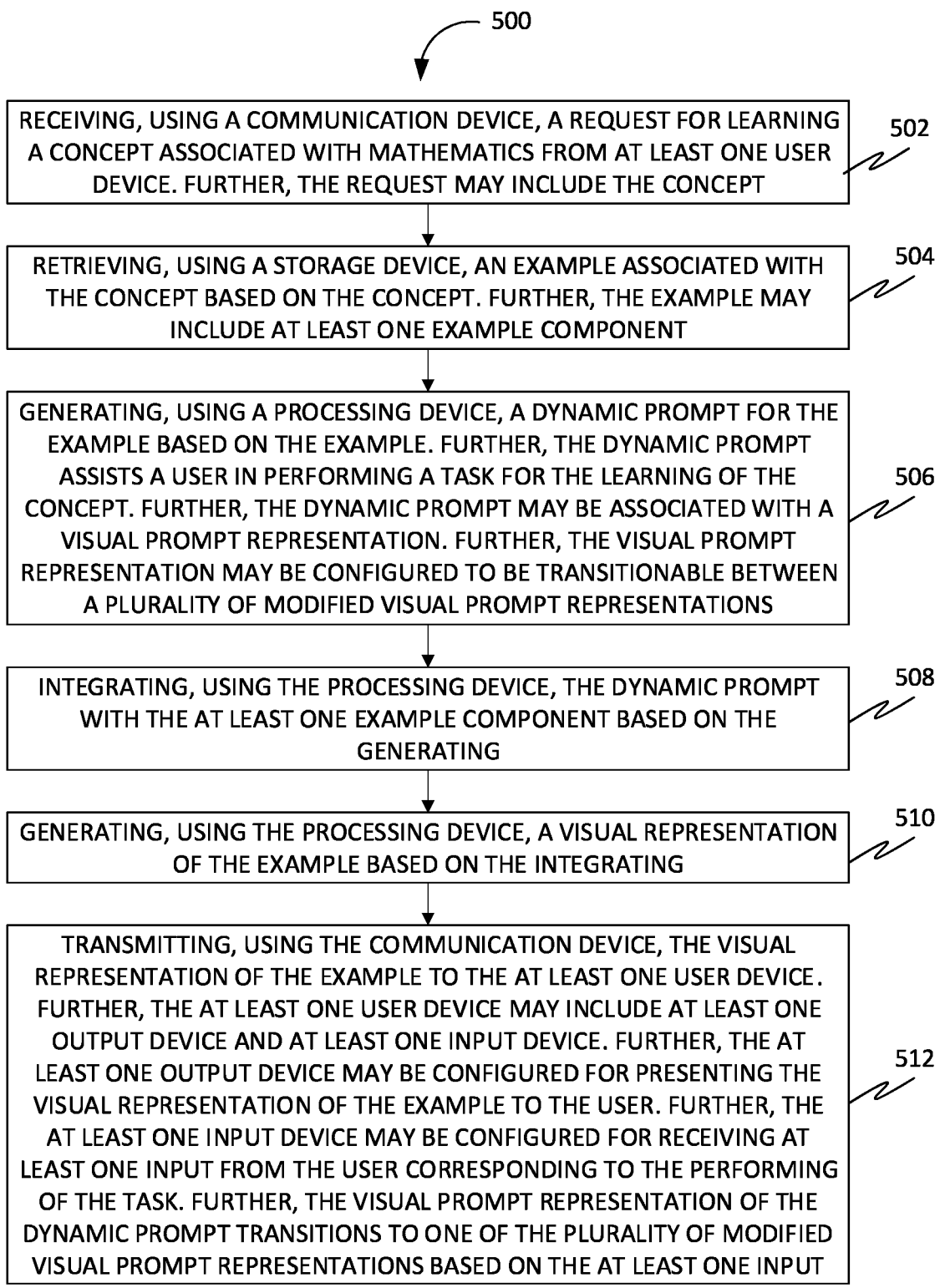
FIG. 5 is a flowchart of a method for facilitating learning of concepts associated with mathematics, in accordance with some embodiments.

FIG. 5 is a flowchart of a method 500 for facilitating learning of concepts associated with mathematics, in accordance with some embodiments. Accordingly, at 502, the method 500 may include receiving, using a communication device, a request for learning a concept associated with mathematics from at least one user device. Further, the request may include the concept.

Further, at 504, the method 500 may include retrieving, using a storage device, an example associated with the concept based on the concept. Further, the example may include at least one example component.

Further, at 506, the method 500 may include generating, using a processing device, a dynamic prompt for the example based on the example. Further, the dynamic prompt assists a user in performing a task for the learning of the concept. Further, the dynamic prompt may be associated with a visual prompt representation. Further, the visual prompt representation may be configured to be transitionable between a plurality of modified visual ons.

Further, at 508, the method 500 may include integrating, using the processing device, the dynamic prompt with the at least one example component based on the generating.

Further, at 510, the method 500 may include generating, using the processing device, a visual representation of the example based on the integrating.

Further, at 512, the method 500 may include transmitting, using the communication device, the visual representation of the example to the at least one user device. Further, the at least one user device may include at least one output device and at least one input device. Further, the at least one output device may be configured for presenting the visual representation of the example to the user. Further, the at least one input device may be configured for receiving at least one input from the user corresponding to the performing of the task. Further, the visual prompt representation of the dynamic prompt transitions to one of the plurality of modified visual prompt representations based on the at least one input.

Further, in some embodiments, the at least one example component may include at least one mathematical operator. Further, the method 500 may include generating, using the processing device, at least one visual operator representation of the at least one mathematical operator based on the at least one mathematical operator. Further, the integrating may include overlaying the visual prompt representation of the dynamic prompt over the at least one visual operator representation. Further, the generating of the visual representation may be based on the overlaying of the visual prompt representation of the dynamic prompt over the at least one visual operator representation.

Further, in some embodiments, the at least one example component may include at least one mathematical symbol. Further, the method 500 may include generating, using the processing device, at least one visual symbol representation of the at least one mathematical symbol based on the at least one mathematical symbol. Further, the integrating may include overlaying the visual prompt representation of the dynamic prompt over the at least one visual symbol representation. Further, the generating of the visual representation may be based on the overlaying of the visual prompt representation of the dynamic prompt over the at least one visual symbol representation.

Figure 6:
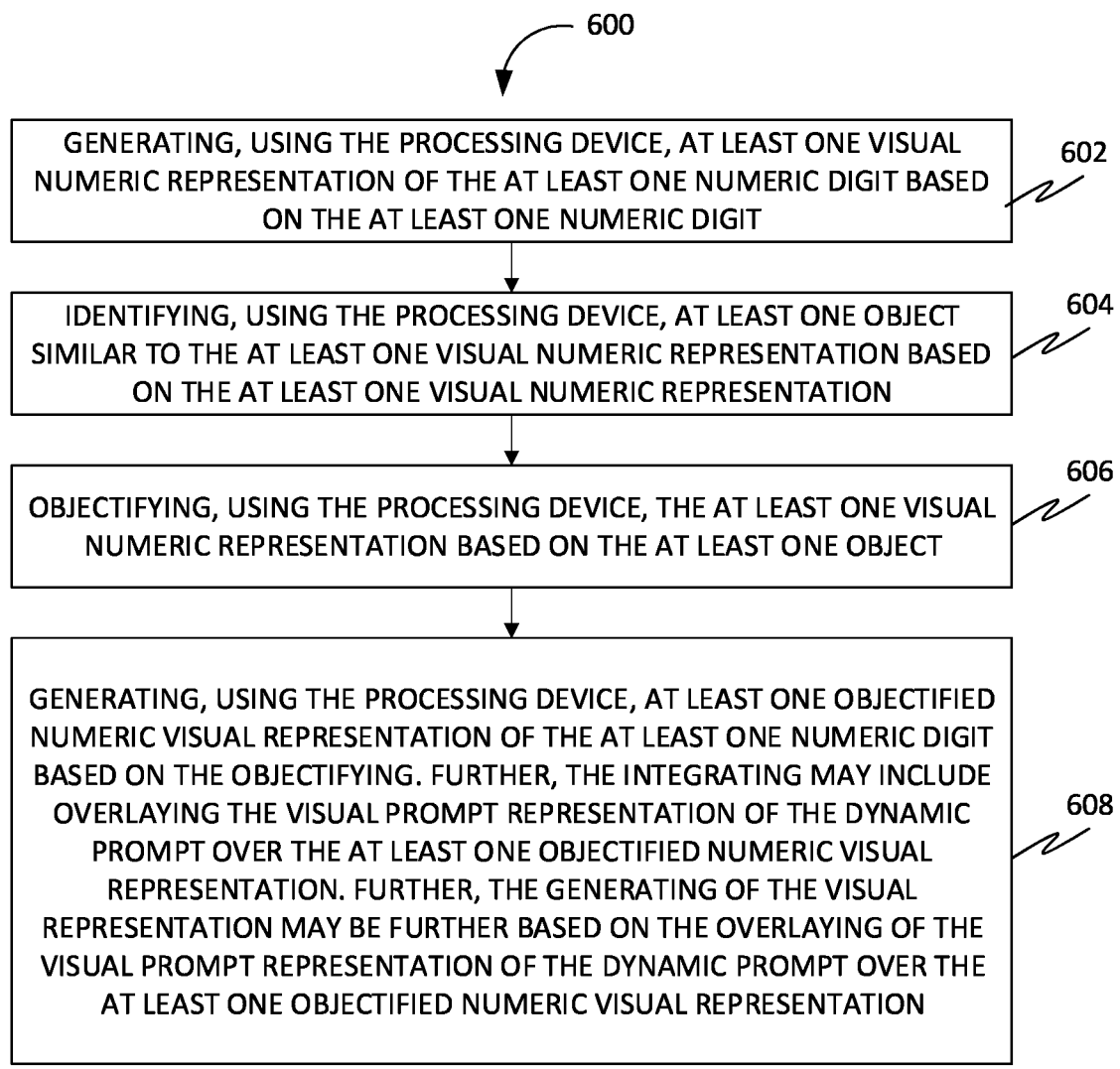
FIG. 6 is a flowchart of a method for generating objectified numeric visual representations of numeric digits for facilitating the learning of the concepts associated with mathematics, in accordance with some embodiments.

FIG. 6 is a flowchart of a method 600 for generating objectified numeric visual representations of numeric digits for facilitating the learning of the concepts associated with mathematics, in accordance with some embodiments. Further, the at least one example component may include at least one numeric digit. Further, at 602, the method 600 may include generating, using the processing device, at least one visual numeric representation of the at least one numeric digit based on the at least one numeric digit.

Further, at 604, the method 600 may include identifying, using the processing device, at least one object similar to the at least one visual numeric representation based on the at least one visual numeric representation.

Further, at 606, the method 600 may include objectifying, using the processing device, the at least one visual numeric representation based on the at least one object.

Further, at 608, the method 600 may include generating, using the processing device, at least one objectified numeric visual representation of the at least one numeric digit based on the objectifying. Further, the integrating may include overlaying the visual prompt representation of the dynamic prompt over the at least one objectified numeric visual representation. Further, the generating of the visual representation may be based on the overlaying of the visual prompt representation of the dynamic prompt over the at least one objectified numeric visual representation.

Further, in some embodiments, the dynamic prompt may include a number of dynamic prompts. Further, the number of dynamic prompts may be equal to a numerical value of one of the at least one numeric digit. Further, the overlaying of the visual prompt representation of the dynamic prompt over the at least one objectified numeric visual representation may include overlaying the visual prompt representation of each of the number of dynamic prompts over one of the at least one objectified numeric visual representation. Further, the generating of the visual representation of the example may be based on the overlaying of the visual prompt representation of each of the number of dynamic prompts over one of the at least one objectified numeric visual representation.

Figure 7:
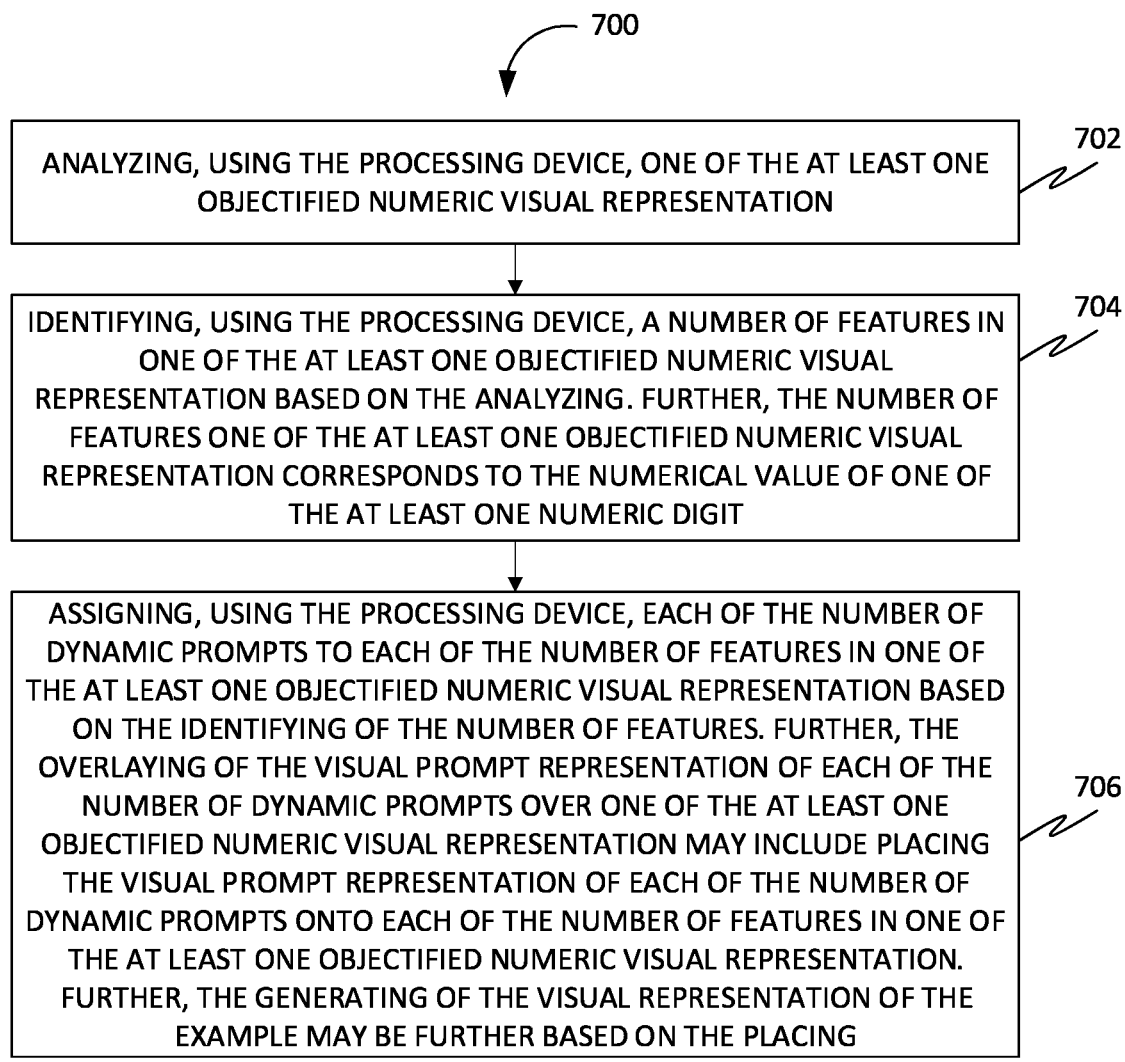
FIG. 7 is a flowchart of a method for identifying features in the objectified numeric visual representations for placing visual prompt representations of dynamic prompts for facilitating the learning of the concepts associated with mathematics, in accordance with some embodiments.

FIG. 7 is a flowchart of a method 700 for identifying features in the objectified numeric visual representations for placing visual prompt representations of dynamic prompts for facilitating the learning of the concepts associated with mathematics, in accordance with some embodiments. Further, at 702, the method 700 may include analyzing, using the processing device, one of the at least one objectified numeric visual representation.

Further, at 704, the method 700 may include identifying, using the processing device, a number of features in one of the at least one objectified numeric visual representation based on the analyzing. Further, the number of features one of the at least one objectified numeric visual representation corresponds to the numerical value of one of the at least one numeric digit.

Further, at 706, the method 700 may include assigning, using the processing device, each of the number of dynamic prompts to each of the number of features in one of the at least one objectified numeric visual representation based on the identifying of the number of features. Further, the overlaying of the visual prompt representation of each of the number of dynamic prompts over one of the at least one objectified numeric visual representation may include placing the visual prompt representation of each of the number of dynamic prompts onto each of the number of features in one of the at least one objectified numeric visual representation. Further, the generating of the visual representation of the example may be based on the placing.

Further, in some embodiments, the analyzing of the at least one objectified numeric visual representation may include analyzing the at least one objectified numeric visual representation using at least one machine learning model. Further, the at least one machine learning model may be trained for identifying distinct visual features in visual representations. Further, the identifying of the number of features in one of the at least one objectified numeric visual representation based on the analyzing of the at least one objectified numeric visual representation using the at least one machine learning model.

Further, in some embodiments, the number of dynamic prompts may be countable by the user by perceiving the visual representation of each of the number of dynamic prompts based on the presenting of the visual representation. Further, the performing of the task by the user may be based on counting the visual representation of each of the number of dynamic prompts.

Figure 8:
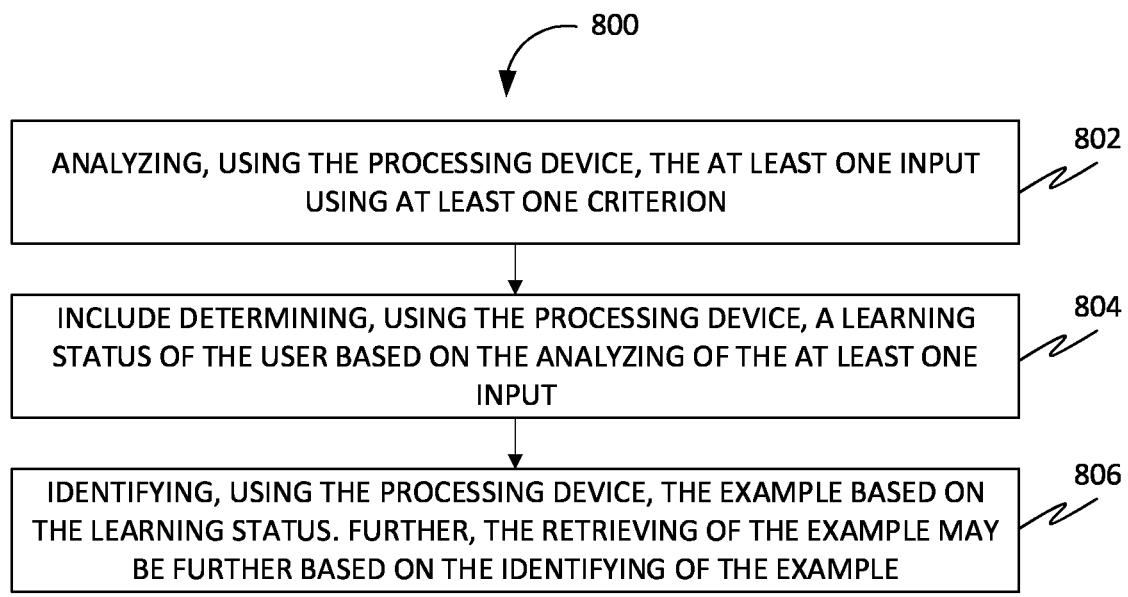
FIG. 8 is a flowchart of a method for identifying examples for the concepts for facilitating the learning of the concepts associated with mathematics, in accordance with some embodiments.

FIG. 8 is a flowchart of a method 800 for identifying examples for the concepts for facilitating the learning of the concepts associated with mathematics, in accordance with some embodiments. Further, at 802, the method 800 may include analyzing, using the processing device, the at least one input.

Further, at 804, the method 800 may include determining, using the processing device, a learning status of the user based on the analyzing of the at least one input.

Further, at 806, the method 800 may include identifying, using the processing device, the example based on the learning status. Further, the retrieving of the example may be based on the identifying of the example.

Figure 9:
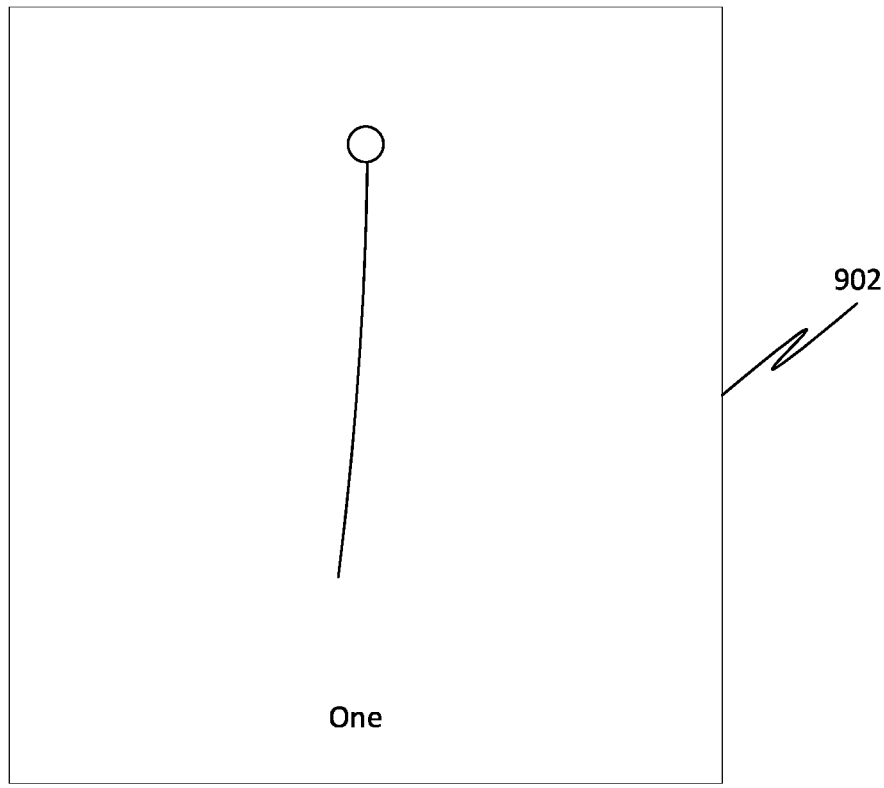
FIG. 9 illustrates a visual representation of a numeric digit ("1") with prompts for facilitating the learning of the concepts associated with mathematics, in accordance with some embodiments.

FIG. 9 illustrates a visual representation 902 of a numeric digit ("1") with prompts for facilitating the learning of the concepts associated with mathematics, in accordance with some embodiments. Further, the numeric digit may be a number ("1"). Further, the prompts may be dots. Further, a number of the dots on a number refer to a numerical value of the number.

Figure 10:
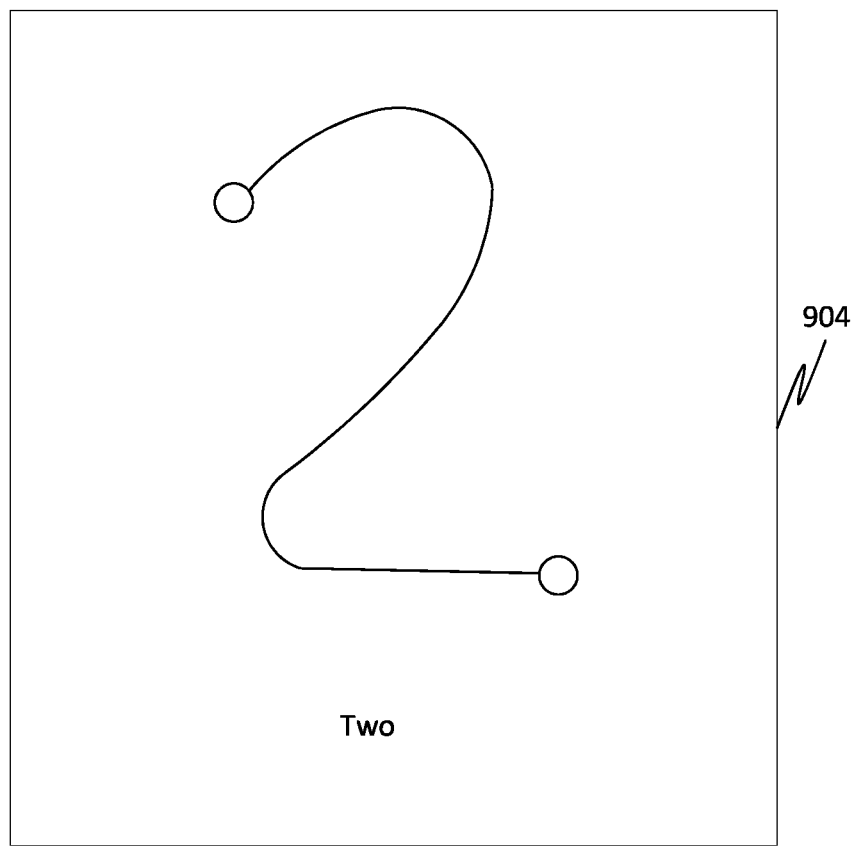
FIG. 10 illustrates a visual representation of a numeric digit ("2") with prompts for facilitating the learning of the concepts associated with mathematics, in accordance with some embodiments.

FIG. 10 illustrates a visual representation 904 of a numeric digit ("2") with prompts for facilitating the learning of the concepts associated with mathematics, in accordance with some embodiments. Further, the numeric digit may be a number ("2"). Further, the prompts may be dots. Further, a number of the dots on a number refer to a numerical value of the number.

Figure 11:
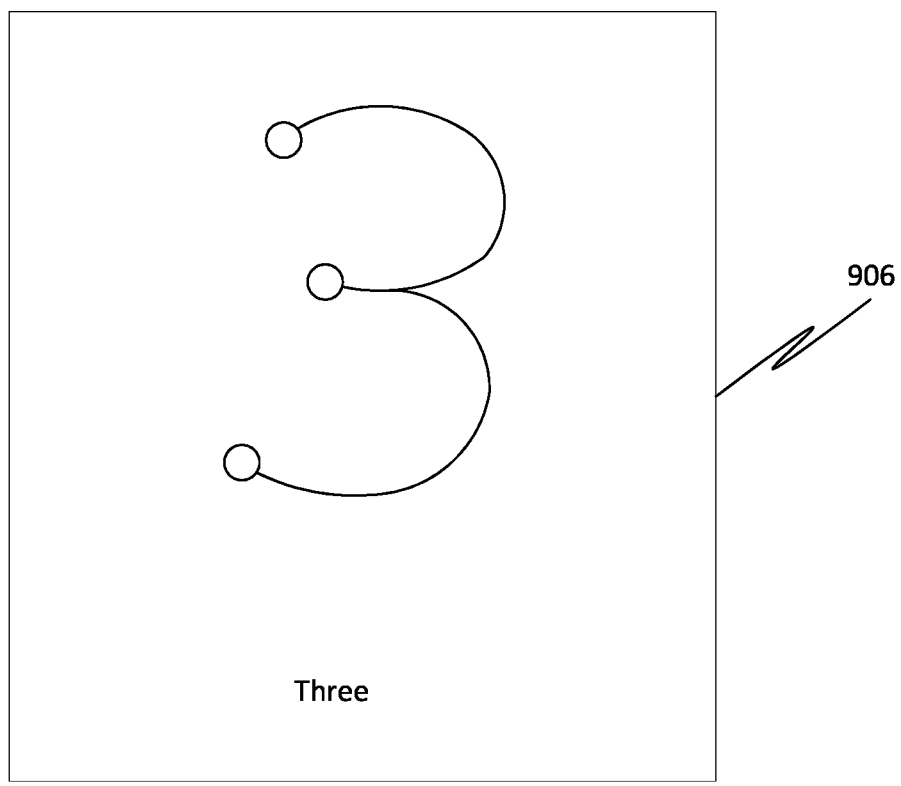
FIG. 11 illustrates a visual representation of a numeric digit ("3") with prompts for facilitating the learning of the concepts associated with mathematics, in accordance with some embodiments.

FIG. 11 illustrates a visual representation 906 of a numeric digit ("3") with prompts for facilitating the learning of the concepts associated with mathematics, in accordance with some embodiments. Further, the numeric digit may be a number ("3"). Further, the prompts may be dots. Further, a number of the dots on a number refer to a numerical value of the number.

Figure 12:
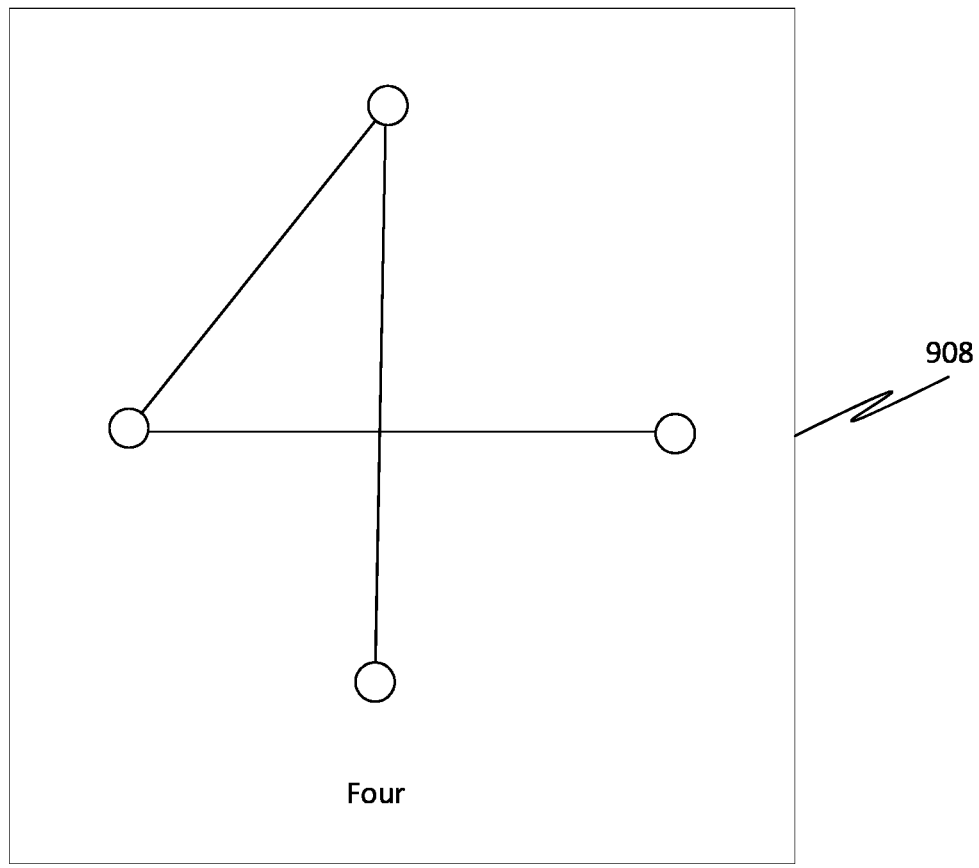
FIG. 12 illustrates a visual representation of a numeric digit ("4") with prompts for facilitating the learning of the concepts associated with mathematics, in accordance with some embodiments.

FIG. 12 illustrates a visual representation 908 of a numeric digit ("4") with prompts for facilitating the learning of the concepts associated with mathematics, in accordance with some embodiments. Further, the numeric digit may be a number ("4"). Further, the prompts may be dots. Further, a number of the dots on a number refer to a numerical value of the number.

Figure 13:
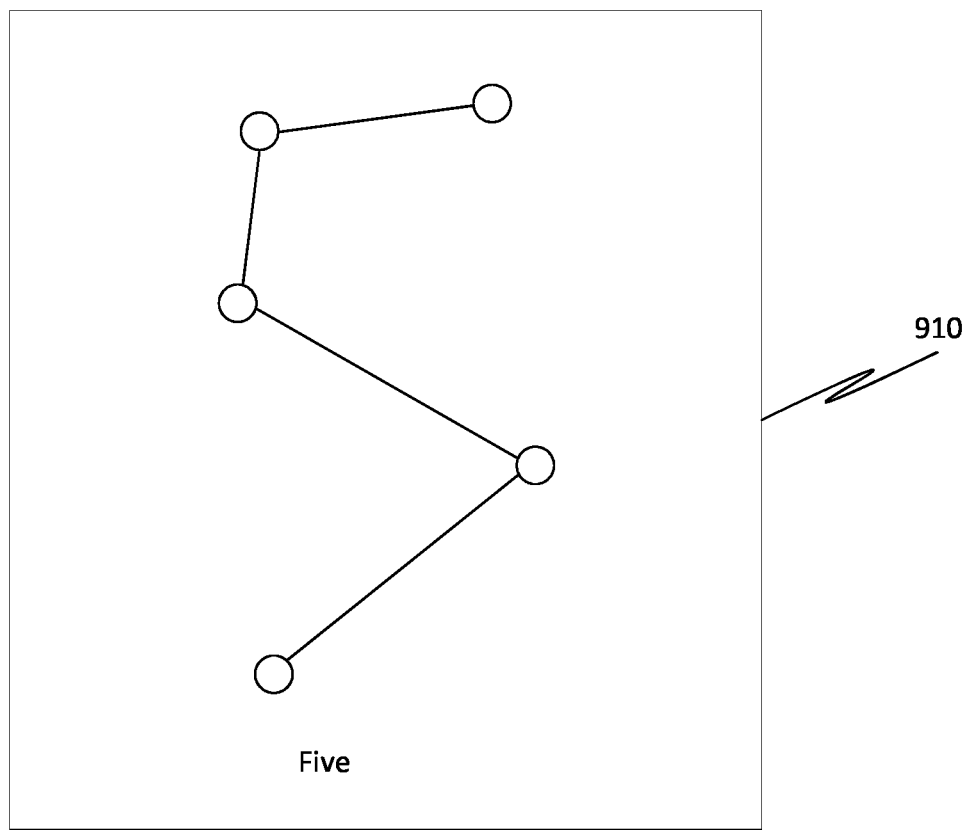
FIG. 13 illustrates a visual representation of a numeric digit ("5") with prompts for facilitating the learning of the concepts associated with mathematics, in accordance with some embodiments.

FIG. 13 illustrates a visual representation 910 of a numeric digit ("5") with prompts for facilitating the learning of the concepts associated with mathematics, in accordance with some embodiments. Further, the numeric digit may be a number ("5"). Further, the prompts may be dots. Further, a number of the dots on a number refer to a numerical value of the number.

Figure 14:
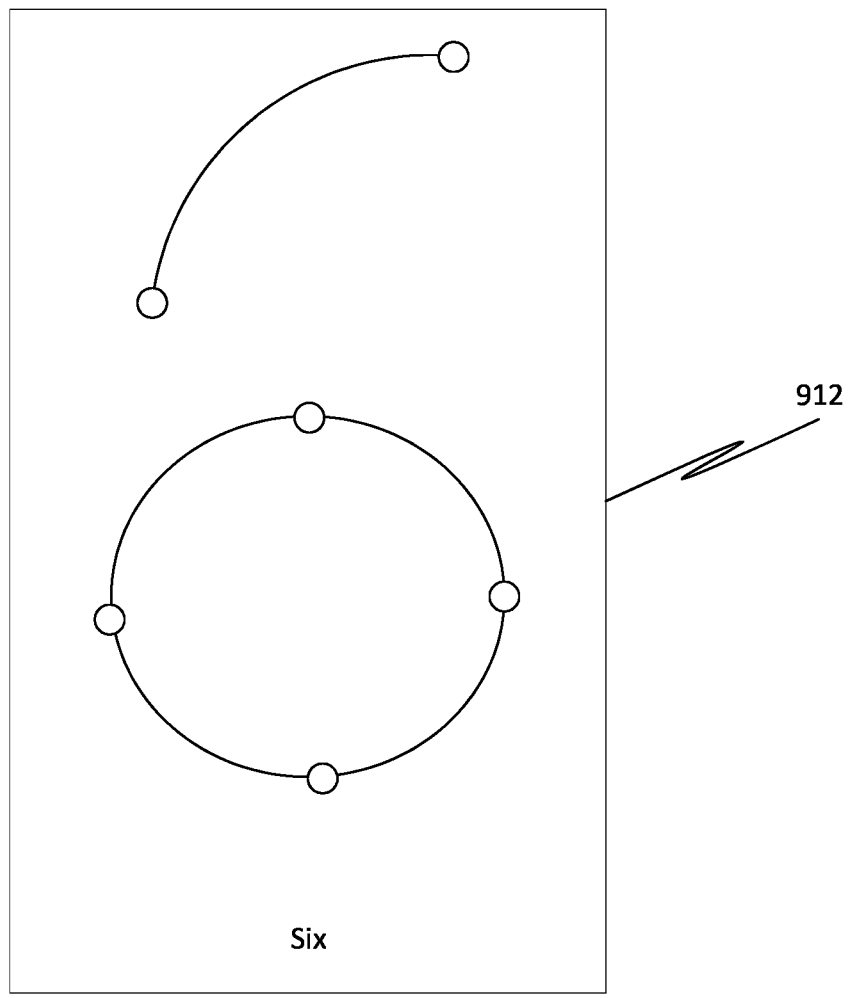
FIG. 14 illustrates a visual representation of a numeric digit ("6") with prompts for facilitating the learning of the concepts associated with mathematics, in accordance with some embodiments.

FIG. 14 illustrates a visual representation 912 of a numeric digit ("6") with prompts for facilitating the learning of the concepts associated with mathematics, in accordance with some embodiments. Further, the numeric digit may be a number ("6"). Further, the prompts may be dots. Further, a number of the dots on a number refer to a numerical value of the number.

Figure 15:
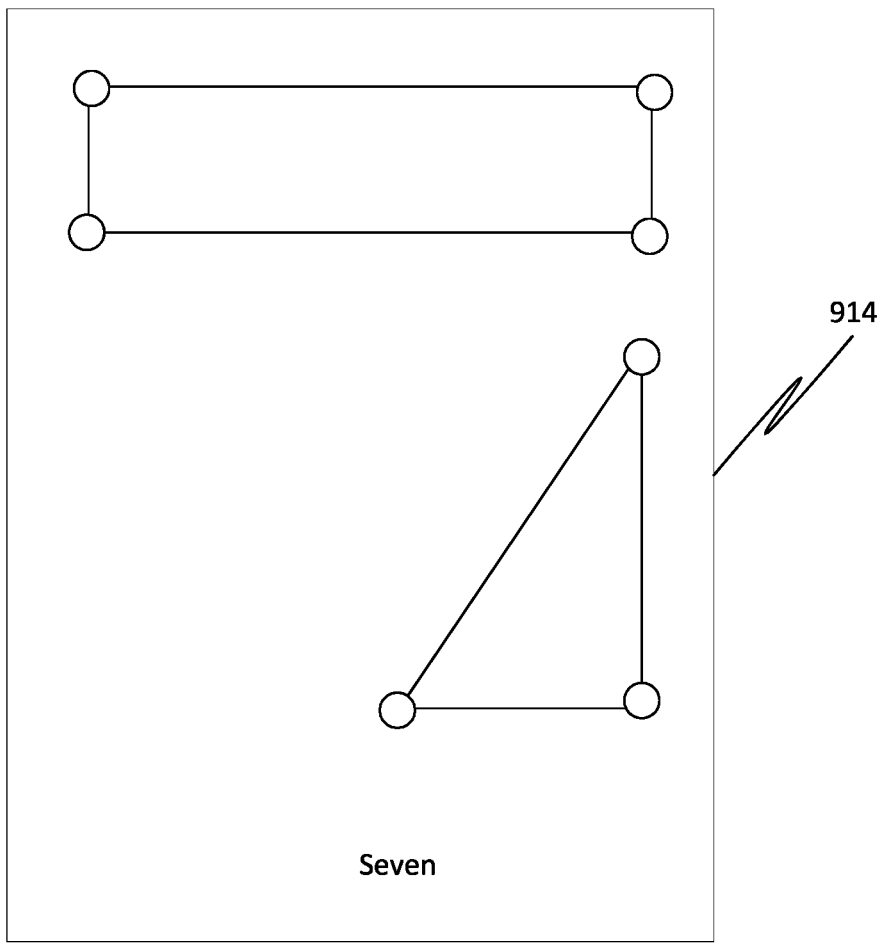
FIG. 15 illustrates a visual representation of a numeric digit ("7") with prompts for facilitating the learning of the concepts associated with mathematics, in accordance with some embodiments.

FIG. 15 illustrates a visual representation 914 of a numeric digit ("7") with prompts for facilitating the learning of the concepts associated with mathematics, in accordance with some embodiments. Further, the numeric digit may be a number ("7"). Further, the prompts may be dots. Further, a number of the dots on a number refer to a numerical value of the number.

Figure 16:
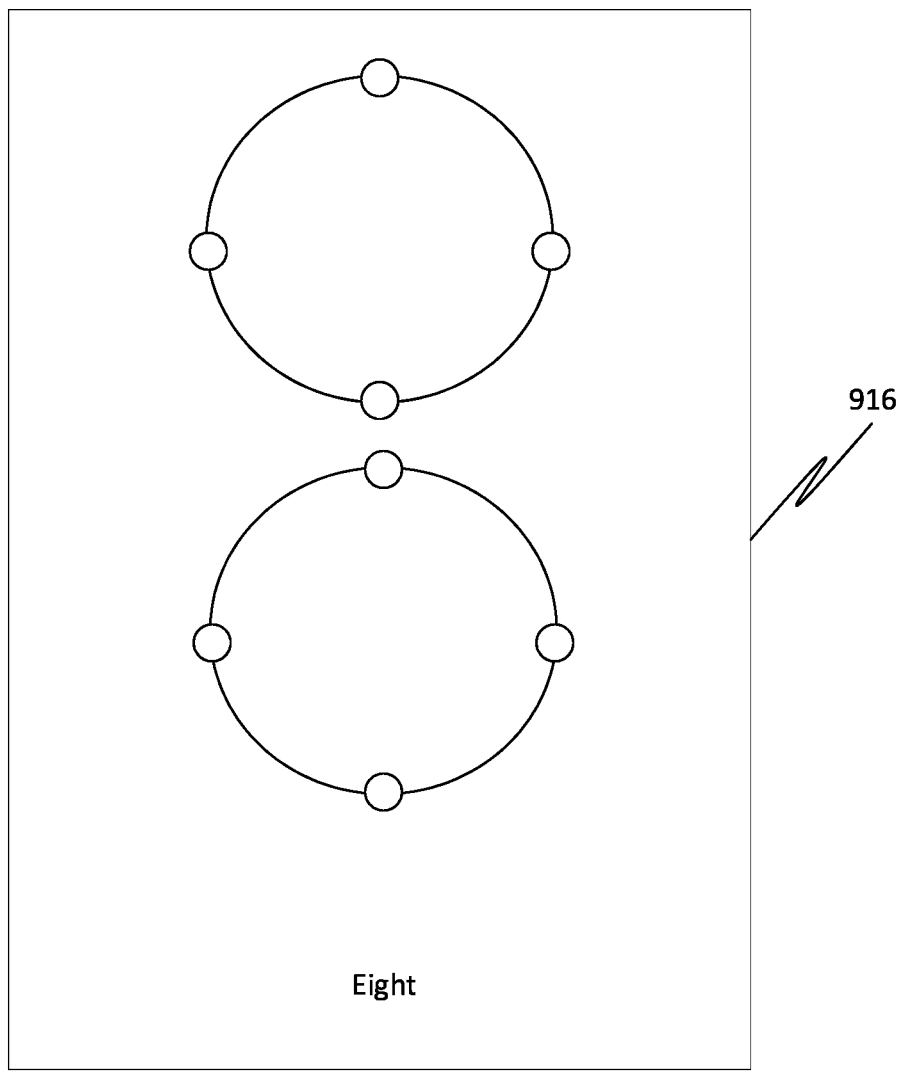
FIG. 16 illustrates a visual representation of a numeric digit ("8") with prompts for facilitating the learning of the concepts associated with mathematics, in accordance with some embodiments.

FIG. 16 illustrates a visual representation 916 of a numeric digit ("8") with prompts for facilitating the learning of the concepts associated with mathematics, in accordance with some embodiments. Further, the numeric digit may be a number ("8"). Further, the prompts may be dots. Further, a number of the dots on a number refer to a numerical value of the number.

Figure 17:
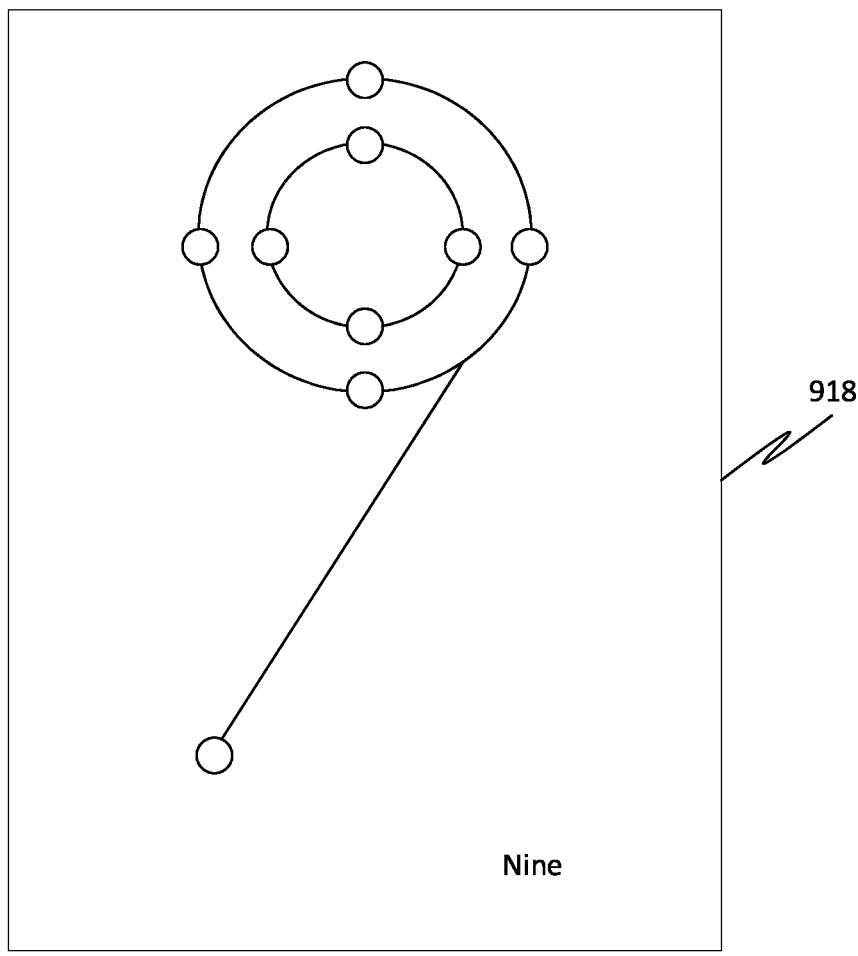
FIG. 17 illustrates a visual representation of a numeric digit ("9") with prompts for facilitating the learning of the concepts associated with mathematics, in accordance with some embodiments.

FIG. 17 illustrates a visual representation 918 of a numeric digit ("9") with prompts for facilitating the learning of the concepts associated with mathematics, in accordance with some embodiments. Further, the numeric digit may be a number ("9"). Further, the prompts may be dots. Further, a number of the dots on a number refer to a numerical value of the number.

Figure 18:
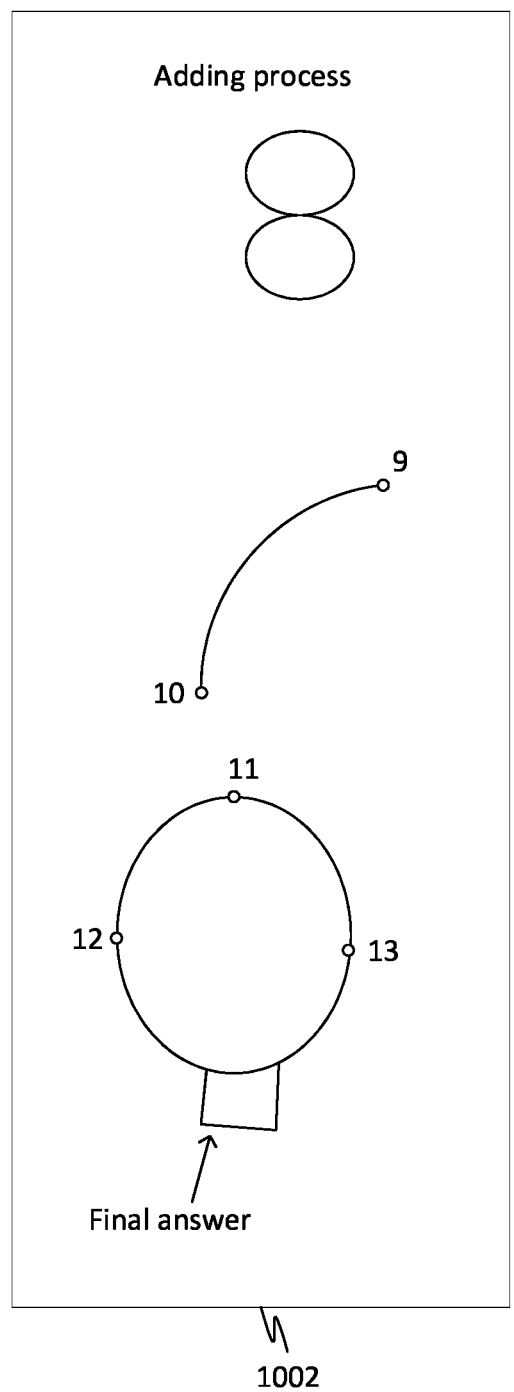
FIG. 18 illustrates a visual representation of a first addition process of multiple addition processes using the plurality of numeric digits with prompts for facilitating the learning of the concepts associated with mathematics, in accordance with some embodiments.

FIG. 18 illustrates a visual representation 1002 of a first addition process of multiple addition processes using the plurality of numeric digits with prompts for facilitating the learning of the concepts associated with mathematics, in accordance with some embodiments. Further, the first addition process is a process with high level prompts.

Figure 19:
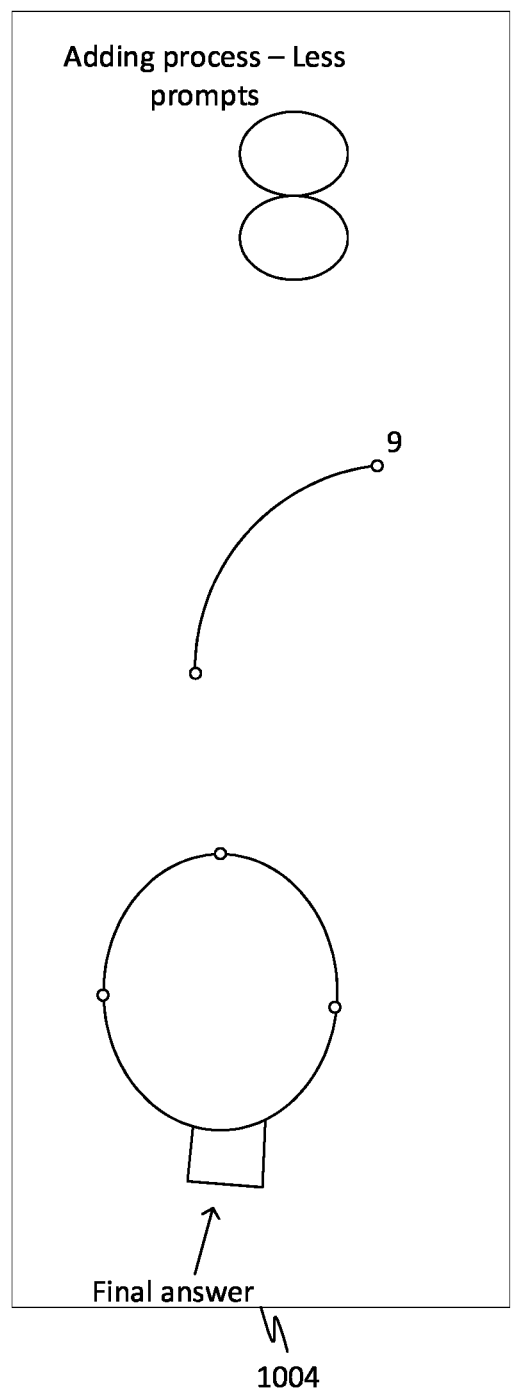
FIG. 19 illustrates a visual representation of a second addition process of the multiple addition processes using the plurality of numeric digits with prompts for facilitating the learning of the concepts associated with mathematics, in accordance with some embodiments.

FIG. 19 illustrates a visual representation 1004 of a second addition process of the multiple addition processes using the plurality of numeric digits with prompts for facilitating the learning of the concepts associated with mathematics, in accordance with some embodiments. Further, the second addition process is a process with only one prompt.

Figure 20:
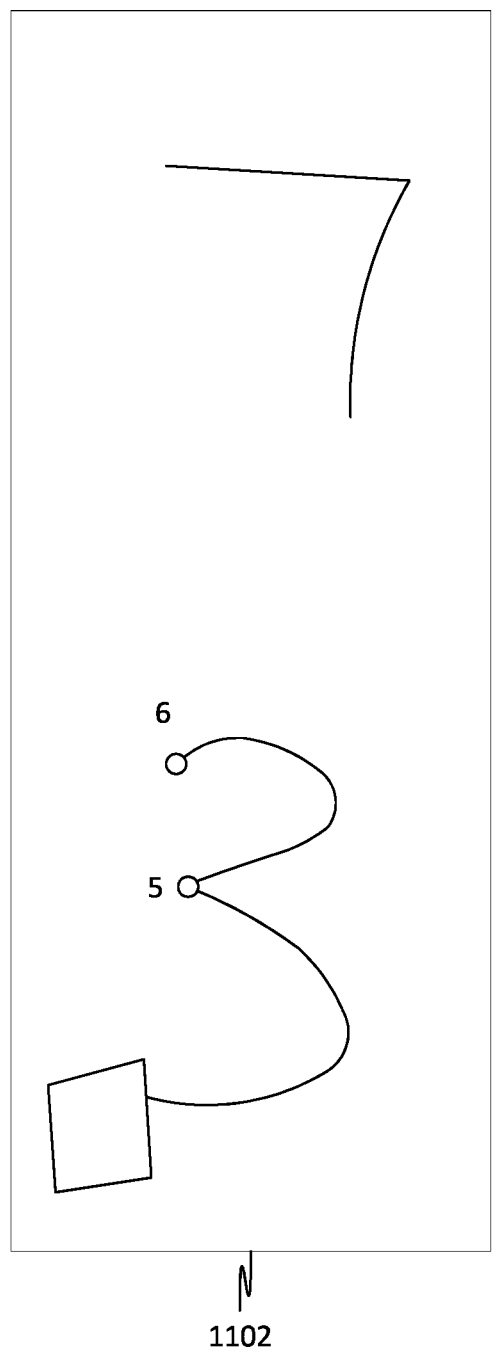
FIG. 20 illustrates a visual representation of a first subtraction process of multiple subtraction processes using the plurality of numeric digits with prompts for facilitating the learning of the concepts associated with mathematics, in accordance with some embodiments.

FIG. 20 illustrates a visual representation 1102 of a first subtraction process of multiple subtraction processes using the plurality of numeric digits with prompts for facilitating the learning of the concepts associated with mathematics, in accordance with some embodiments. Further, the first subtraction process is a process with high level prompts.

Figure 21:
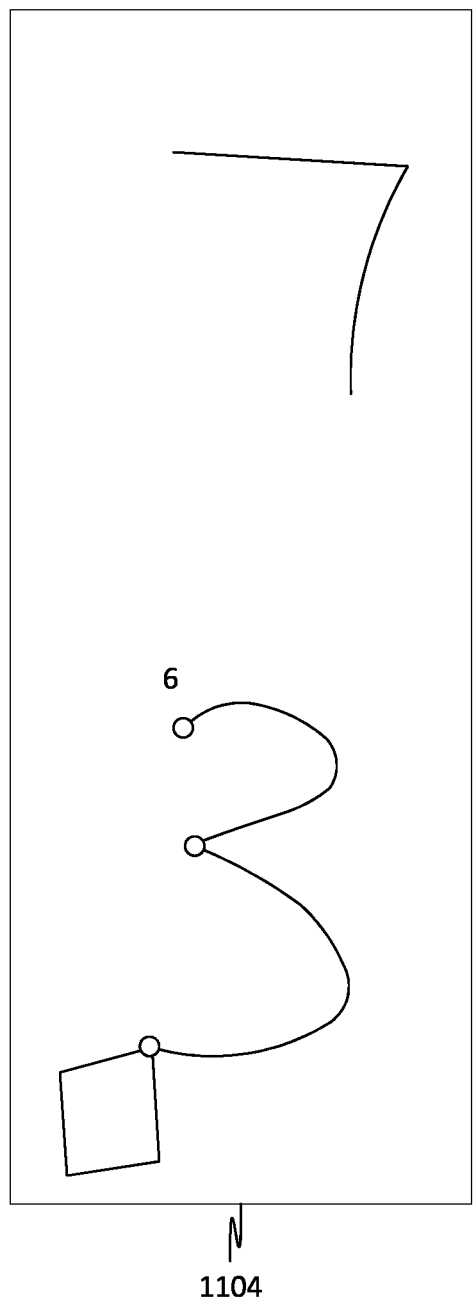
FIG. 21 illustrates a visual representation of a second subtraction process of the multiple subtraction processes using the plurality of numeric digits with prompts for facilitating the learning of the concepts associated with mathematics, in accordance with some embodiments.

FIG. 21 illustrates a visual representation 1104 of a second subtraction process of the multiple subtraction processes using the plurality of numeric digits with prompts for facilitating the learning of the concepts associated with mathematics, in accordance with some embodiments. Further, the second subtraction process is a process with only one prompt.

Figure 22:
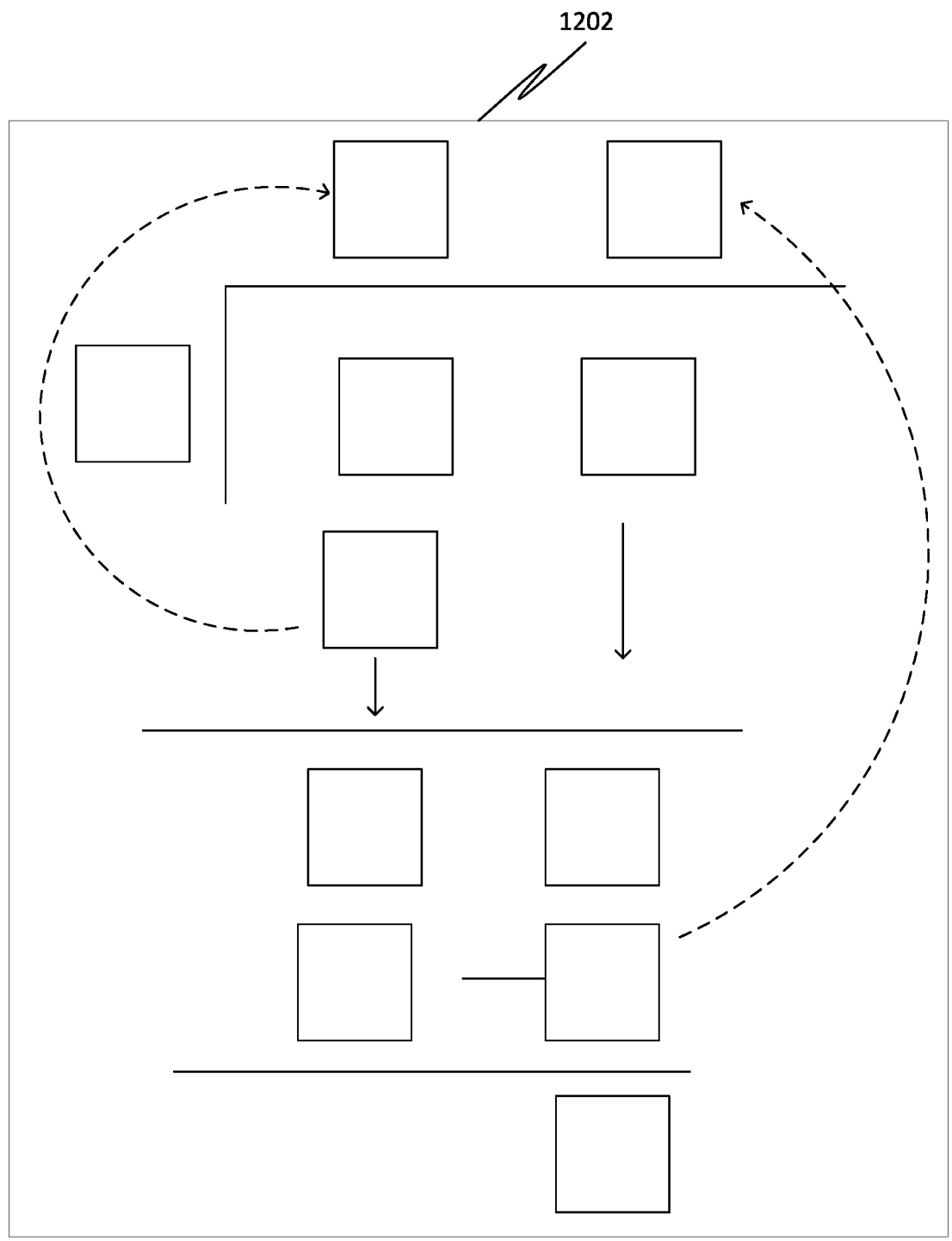
FIG. 22 illustrates a visual representation of a division process with prompts for facilitating the learning of the concepts associated with mathematics, in accordance with some embodiments.

FIG. 22 illustrates a visual representation 1202 of a division process with prompts for facilitating the learning of the concepts associated with mathematics, in accordance with some embodiments. Further, the visual representation 1202 may include a black box which is a divisor. Further, the visual representation 1202 may include black boxes inside a division bracket which is a dividend. Further, red colored numbers in the visual representation 1202 are answers. Further, blue colored numbers in the visual representation 1202 are quotients. Further, letters (A-D) in the visual representation 1202 match the answers to the quotients.

Figure 23:
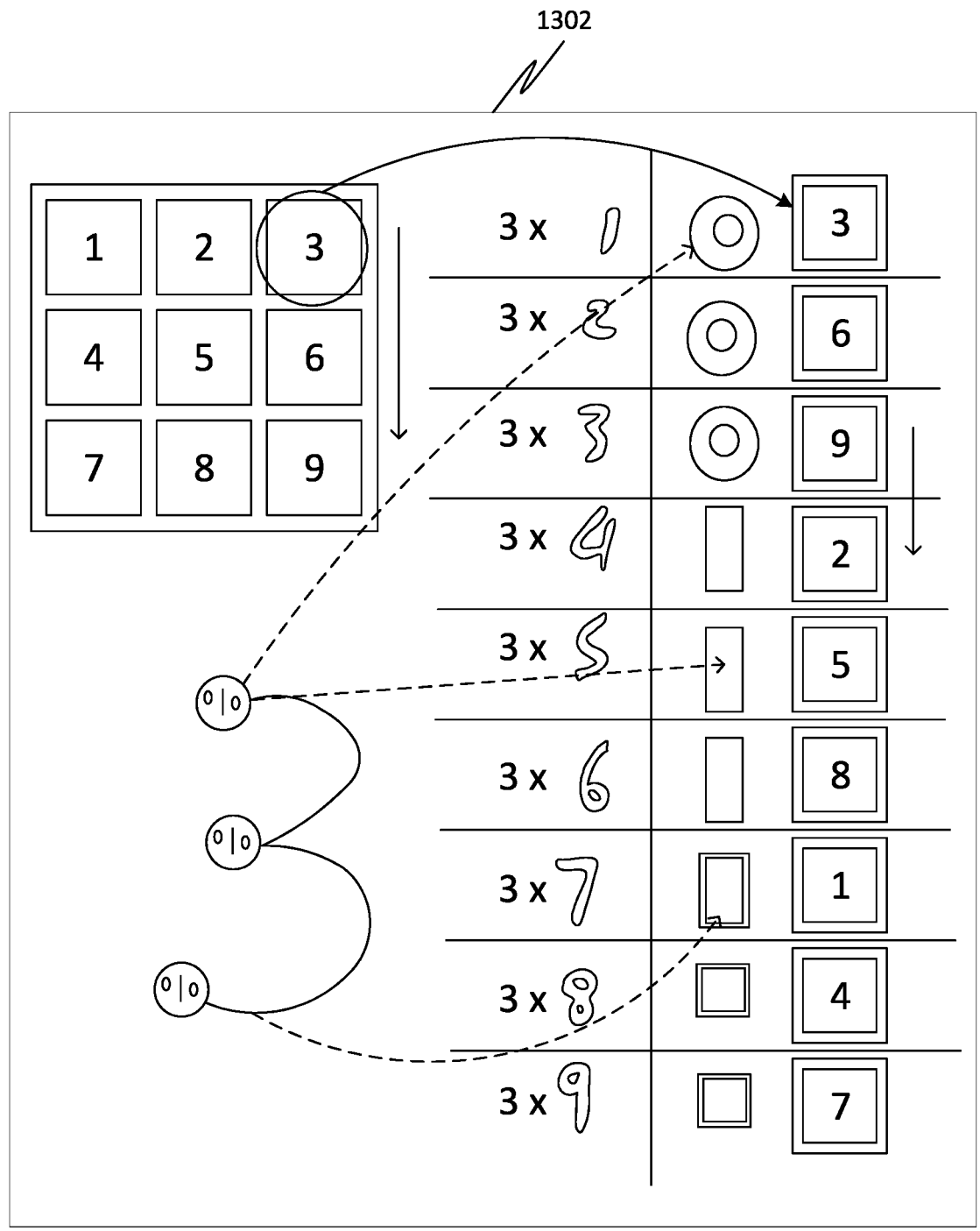
FIG. 23 illustrates a visual representation of a times table writing process with prompts for facilitating the learning of the concepts associated with mathematics, in accordance with some embodiments.

FIG. 23 illustrates a visual representation 1302 of a times table writing process with prompts for facilitating the learning of the concepts associated with mathematics, in accordance with some embodiments. Further, the visual representation 1302 may include red colored box as a product of two single digit multiplicand.

Figure 24:
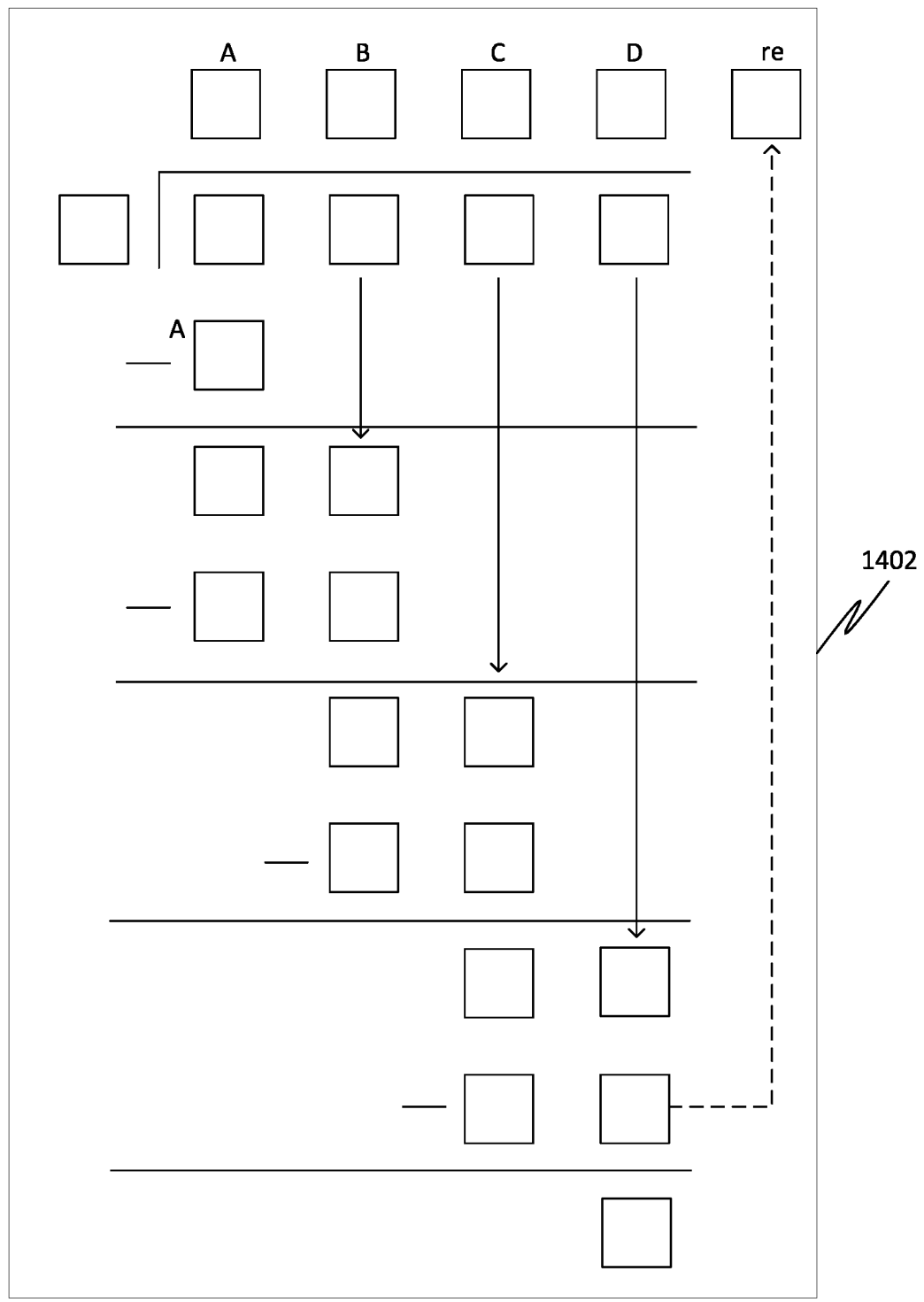
FIG. 24 illustrates a visual representation of a long division process with prompts for facilitating the learning of the concepts associated with mathematics, in accordance with some embodiments.

FIG. 24 illustrates a visual representation 1402 of a long division process with prompts for facilitating the learning of the concepts associated with mathematics, in accordance with some embodiments. Further, products of the visual representation 1402 are red colored with a letter (e.g., "a") to match with blue colored numeric digits that are quotients.

Figure 25:
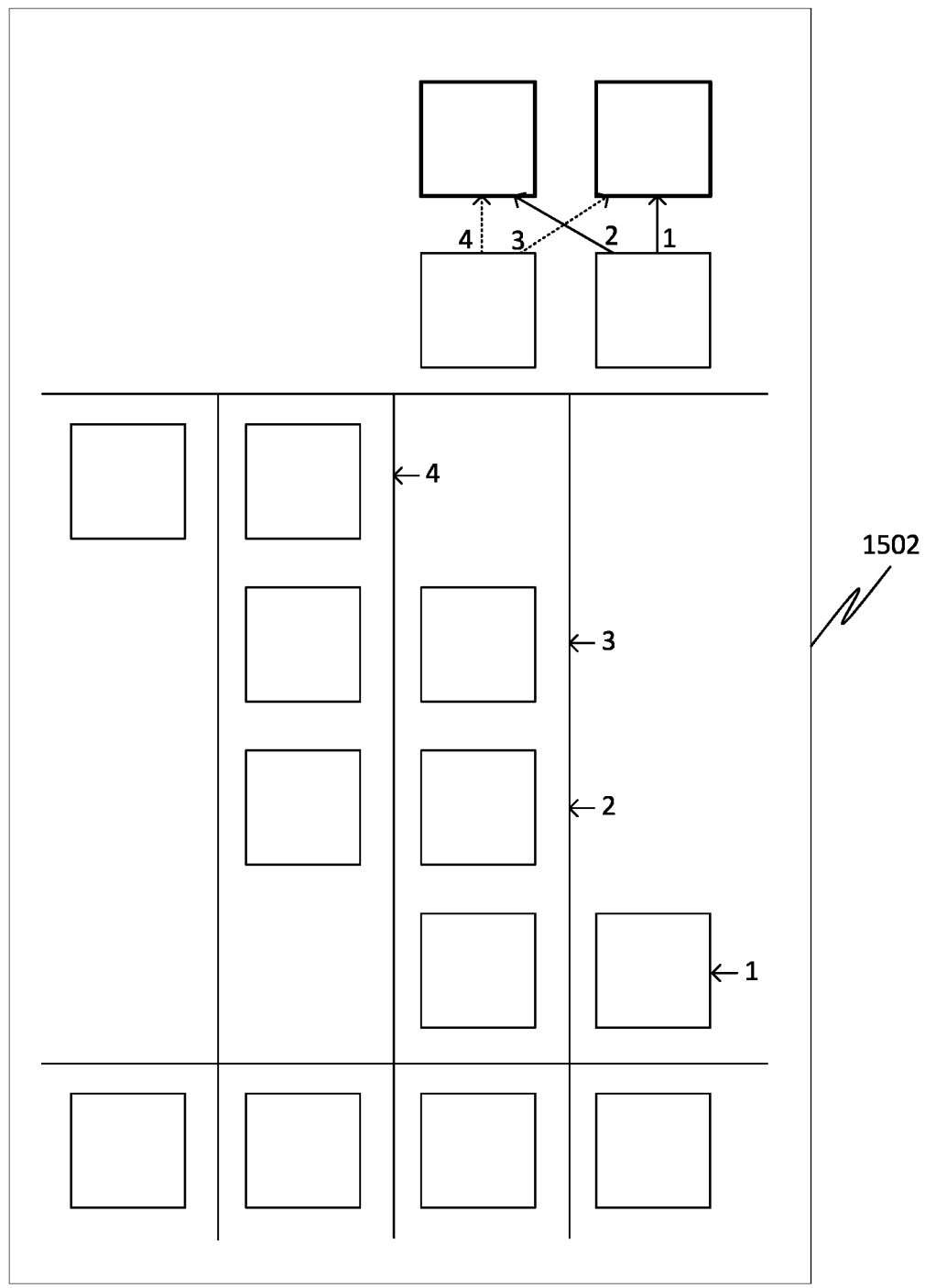
FIG. 25 illustrates a visual representation of a multiplication process with prompts for facilitating the learning of the concepts associated with mathematics, in accordance with some embodiments.

FIG. 25 illustrates a visual representation 1502 of a multiplication process with prompts for facilitating the learning of the concepts associated with mathematics, in accordance with some embodiments. Further, red colored boxes of the visual representation 1502 represent products and blue colored numeric digits represent quotients. Further, the numeric digits with arrows represent operations to correlate the placement of the products.

Figure 26:
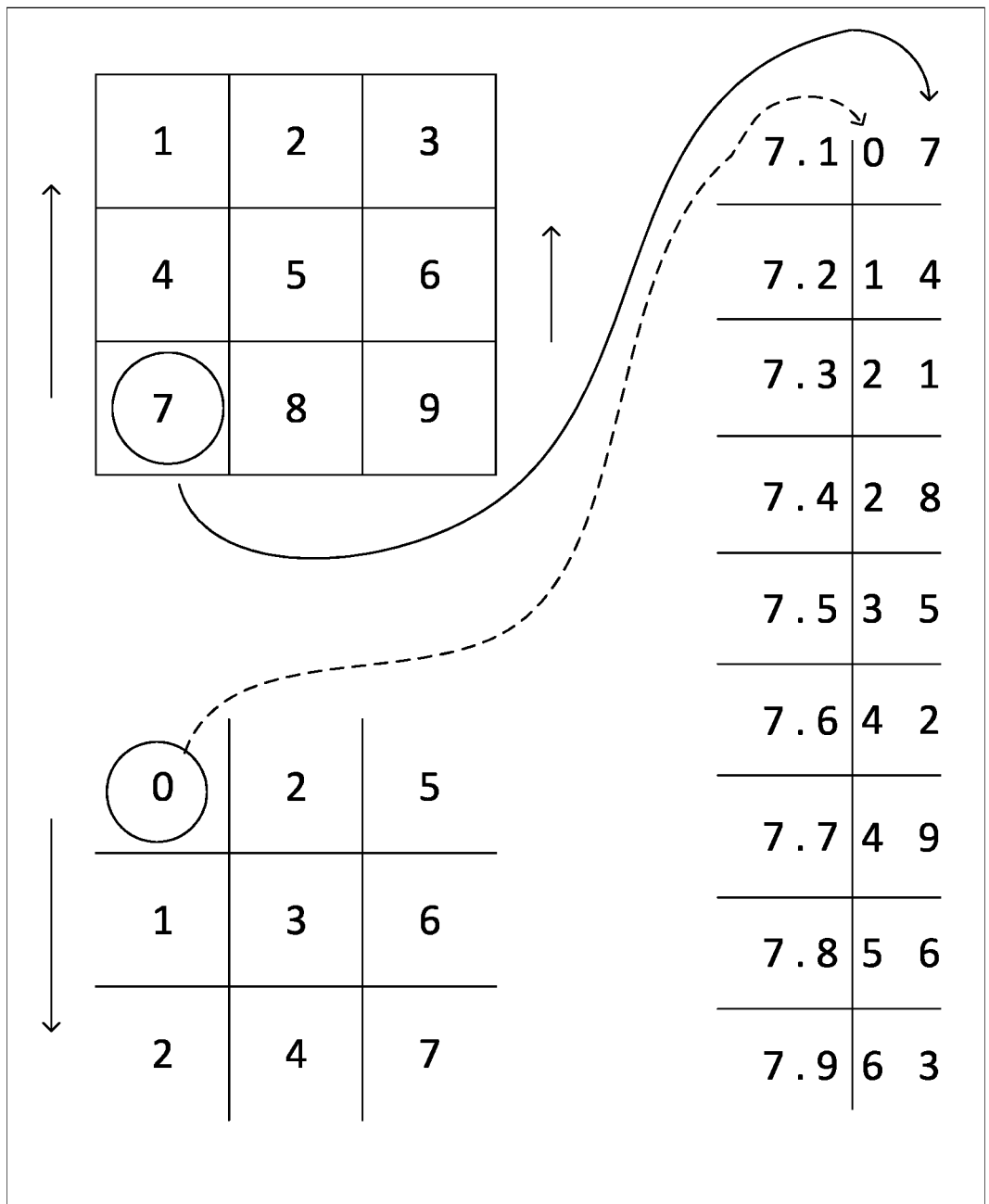
FIG. 26 illustrates a visual representation of a process for writing a times table of seven with prompts for facilitating the learning of the concepts associated with mathematics, in accordance with some embodiments.

FIG. 26 illustrates a visual representation 1602 of a process for writing a times table of seven with prompts for facilitating the learning of the concepts associated with mathematics, in accordance with some embodiments. Further, the visual representation 1602 may include two red colored boxes. Further, each one of the two red colored boxes refers to a product of one's and ten's digit of numeric digits. Further, the numeric digits are blue colored.

Figure 27:
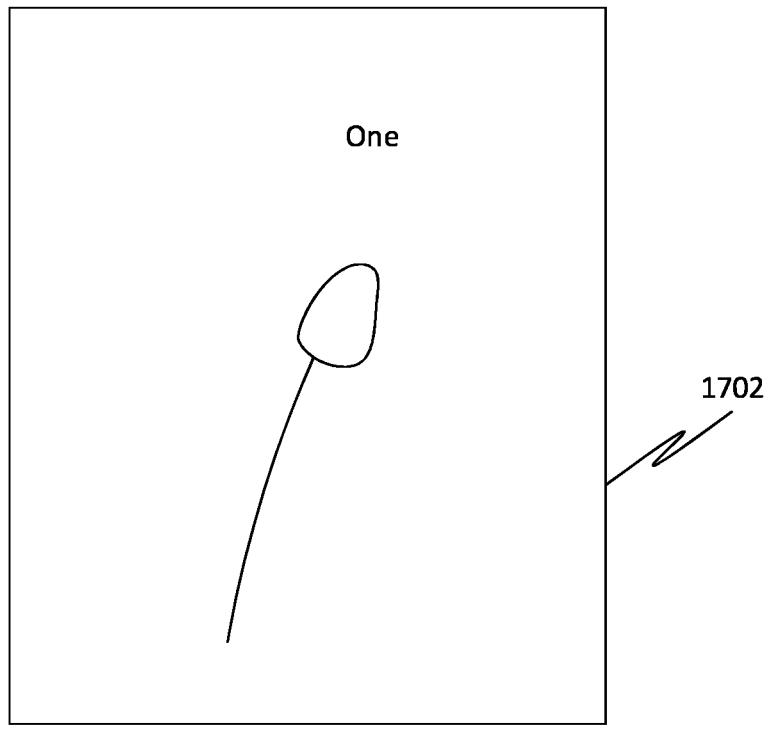
FIG. 27 illustrates a visual representation of a numeric digit ("1") with prompts for facilitating the learning of the concepts associated with mathematics, in accordance with some embodiments.

FIG. 27 illustrates a visual representation 1702 of a numeric digit ("1") with prompts for facilitating the learning of the concepts associated with mathematics, in accordance with some embodiments. Further, the numeric digit may be a number ("1"). Further, the prompts may be dots. Further, a number of the dots on a number refer to a numerical value of the number. Further, the dots are initially orange colored and change to black color.

Figure 28:
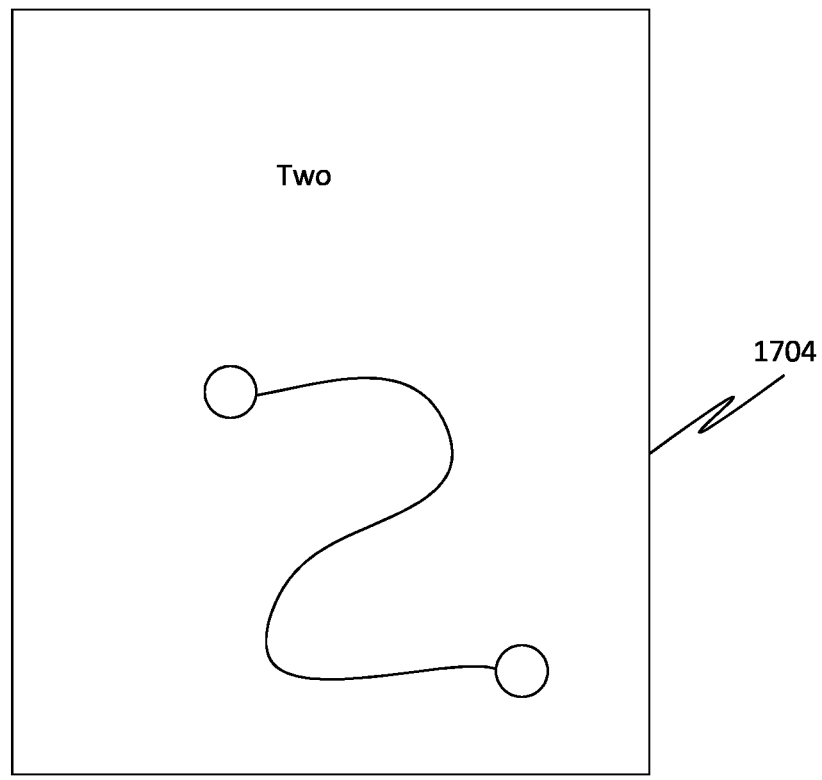
FIG. 28 illustrates a visual representation of a numeric digit ("2") with prompts for facilitating the learning of the concepts associated with mathematics, in accordance with some embodiments.

FIG. 28 illustrates a visual representation 1704 of a numeric digit ("2") with prompts for facilitating the learning of the concepts associated with mathematics, in accordance with some embodiments. Further, the numeric digit may be a number ("2"). Further, the prompts may be dots. Further, a number of the dots on a number refer to a numerical value of the number. Further, the dots are initially orange colored and change to black color.

Figure 29:
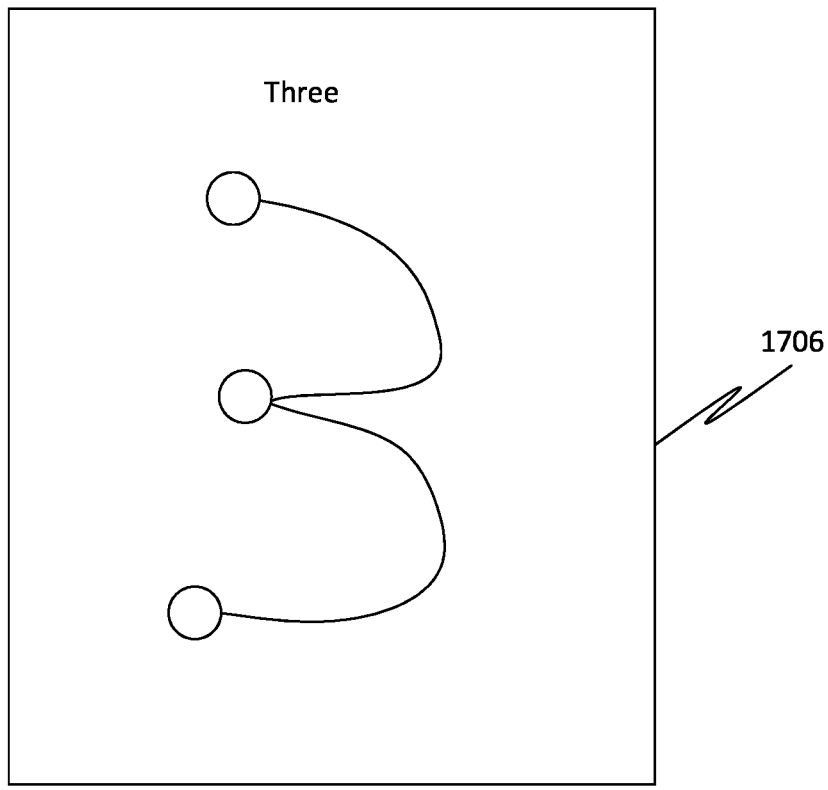
FIG. 29 illustrates a visual representation of a numeric digit ("3") with prompts for facilitating the learning of the concepts associated with mathematics, in accordance with some embodiments.

FIG. 29 illustrates a visual representation 1706 of a numeric digit ("3") with prompts for facilitating the learning of the concepts associated with mathematics, in accordance with some embodiments. Further, the numeric digit may be a number ("3"). Further, the prompts may be dots. Further, a number of the dots on a number refer to a numerical value of the number. Further, the dots are initially orange colored and change to black color.

Figure 30:
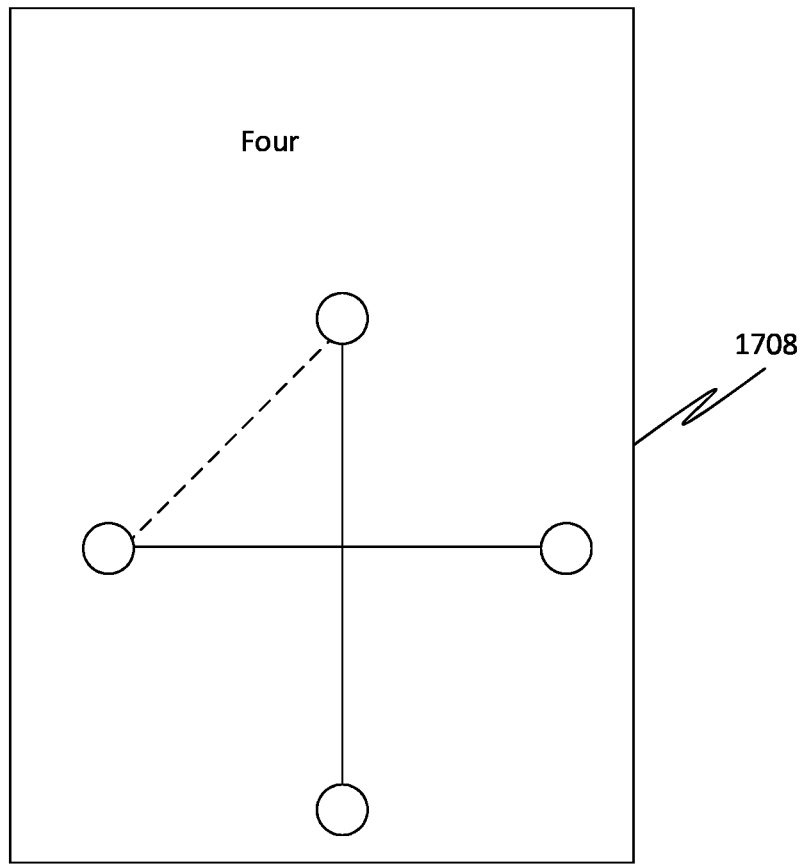
FIG. 30 illustrates a visual representation of a numeric digit ("4") with prompts for facilitating the learning of the concepts associated with mathematics, in accordance with some embodiments.

FIG. 30 illustrates a visual representation 1708 of a numeric digit ("4") with prompts for facilitating the learning of the concepts associated with mathematics, in accordance with some embodiments. Further, the numeric digit may be a number ("4"). Further, the prompts may be dots. Further, a number of the dots on a number refer to a numerical value of the number. Further, the dots are initially orange colored and change to black color.

Figure 31:
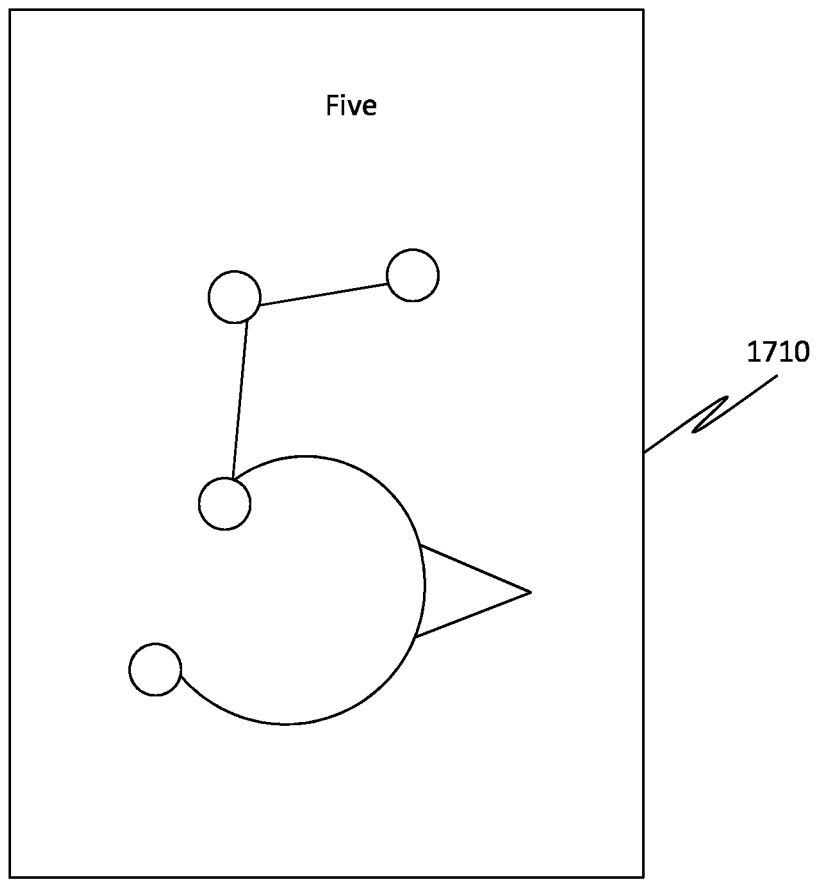
FIG. 31 illustrates a visual representation of a numeric digit ("5") with prompts for facilitating the learning of the concepts associated with mathematics, in accordance with some embodiments.

FIG. 31 illustrates a visual representation 1710 of a numeric digit ("5") with prompts for facilitating the learning of the concepts associated with mathematics, in accordance with some embodiments. Further, the numeric digit may be a number ("5"). Further, the prompts may be dots. Further, a number of the dots on a number refer to a numerical value of the number. Further, the dots are initially orange colored and change to black color.

Figure 32:
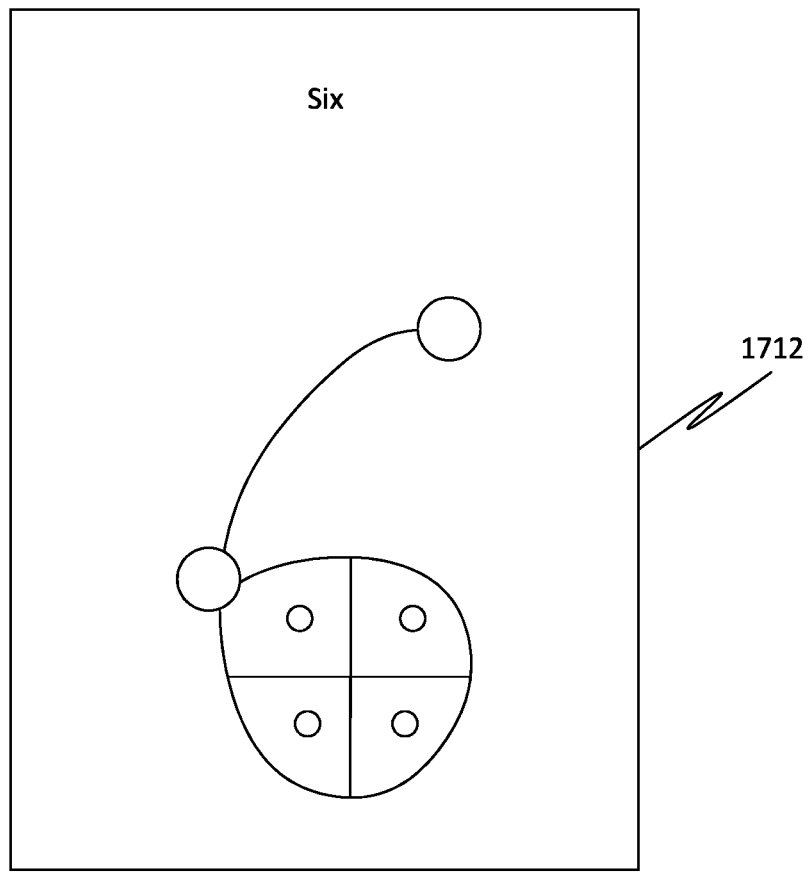
FIG. 32 illustrates a visual representation of a numeric digit ("6") with prompts for facilitating the learning of the concepts associated with mathematics, in accordance with some embodiments.

FIG. 32 illustrates a visual representation 1712 of a numeric digit ("6") with prompts for facilitating the learning of the concepts associated with mathematics, in accordance with some embodiments. Further, the numeric digit may be a number ("6"). Further, the prompts may be dots. Further, a number of the dots on a number refer to a numerical value of the number. Further, the dots are initially orange colored and change to black color.

Figure 33:
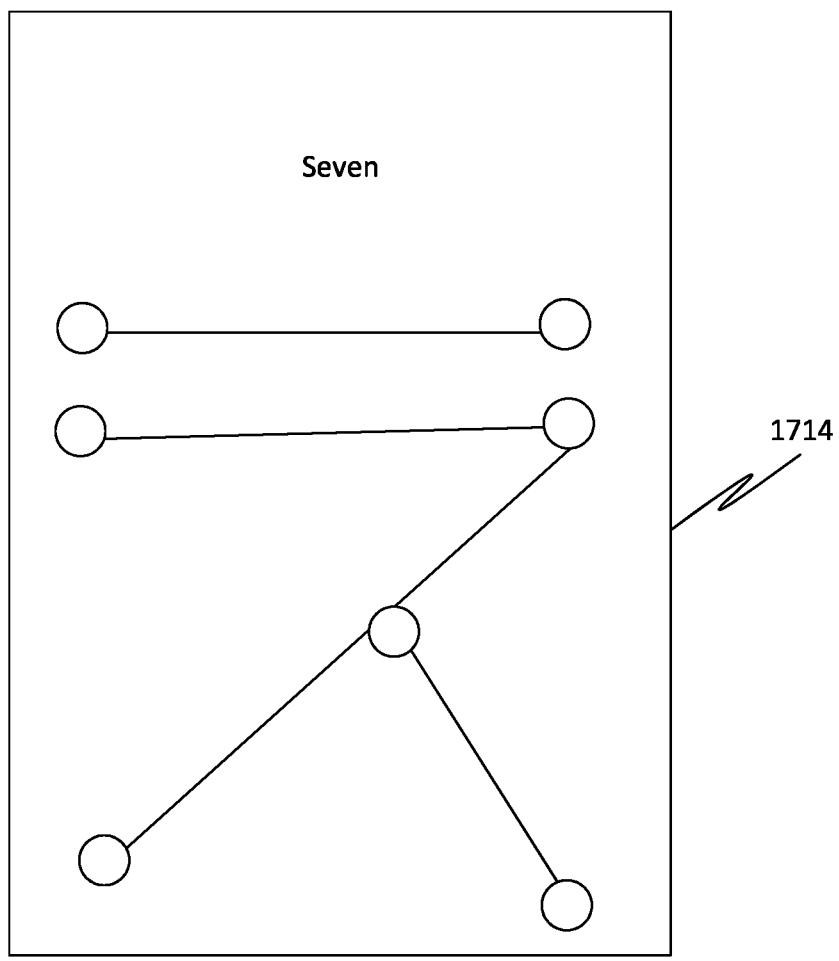
FIG. 33 illustrates a visual representation of a numeric digit ("7") with prompts for facilitating the learning of the concepts associated with mathematics, in accordance with some embodiments.

FIG. 33 illustrates a visual representation 1714 of a numeric digit ("7") with prompts for facilitating the learning of the concepts associated with mathematics, in accordance with some embodiments. Further, the numeric digit may be a number ("7"). Further, the prompts may be dots. Further, a number of the dots on a number refer to a numerical value of the number. Further, the dots are initially orange colored and change to black color.

Figure 34:
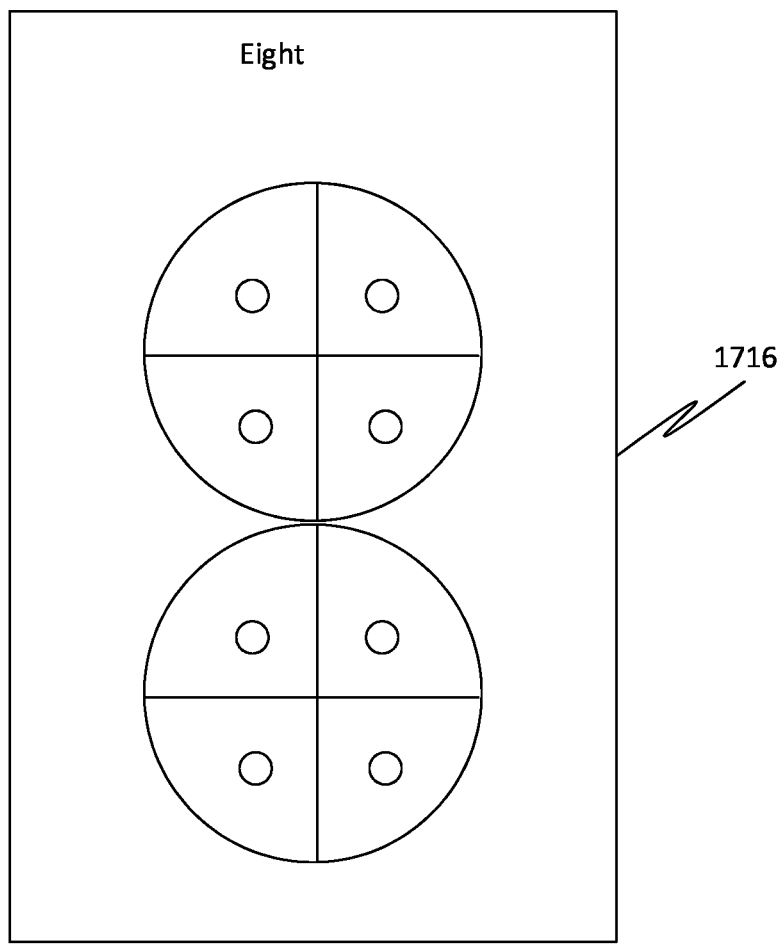
FIG. 34 illustrates a visual representation of a numeric digit ("8") with prompts for facilitating the learning of the concepts associated with mathematics, in accordance with some embodiments.

FIG. 34 illustrates a visual representation 1716 of a numeric digit ("8") with prompts for facilitating the learning of the concepts associated with mathematics, in accordance with some embodiments. Further, the numeric digit may be a number ("8"). Further, the prompts may be dots. Further, a number of the dots on a number refer to a numerical value of the number. Further, the dots are initially orange colored and change to black color.

Figure 35:
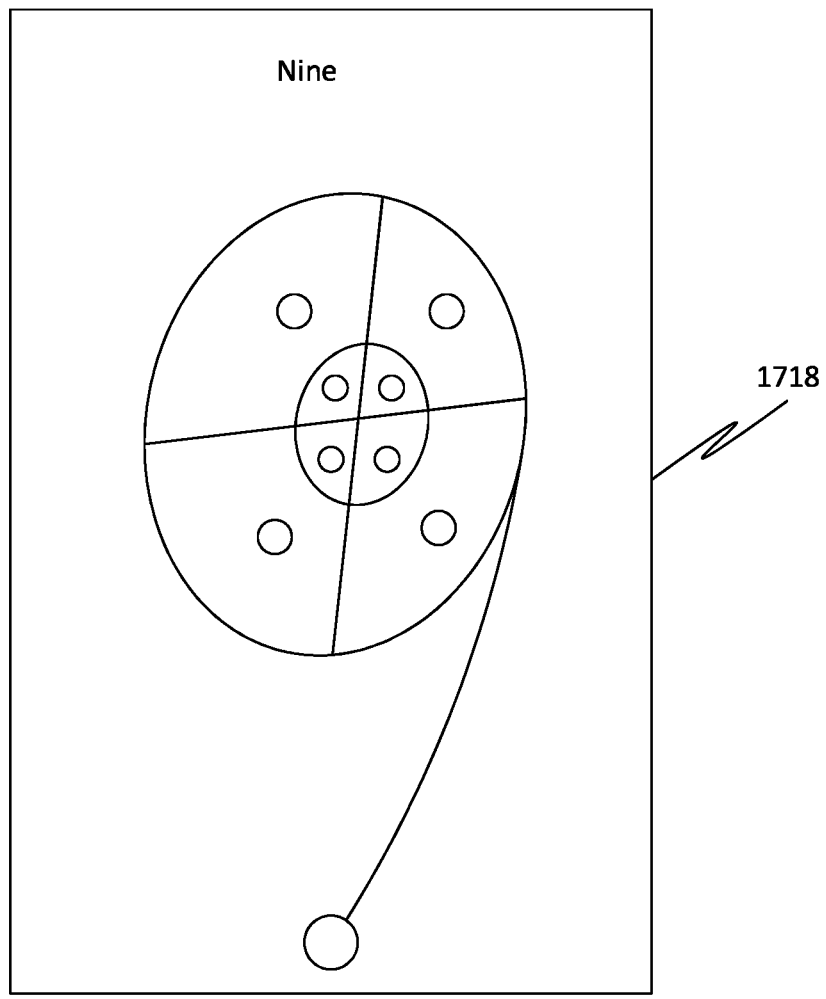
FIG. 35 illustrates a visual representation of a numeric digit ("9") with prompts for facilitating the learning of the concepts associated with mathematics, in accordance with some embodiments.

FIG. 35 illustrates a visual representation 1718 of a numeric digit ("9") with prompts for facilitating the learning of the concepts associated with mathematics, in accordance with some embodiments. Further, the numeric digit may be a number ("9"). Further, the prompts may be dots. Further, a number of the dots on a number refer to a numerical value of the number. Further, the dots are initially orange colored and change to black color.

Figure 36:
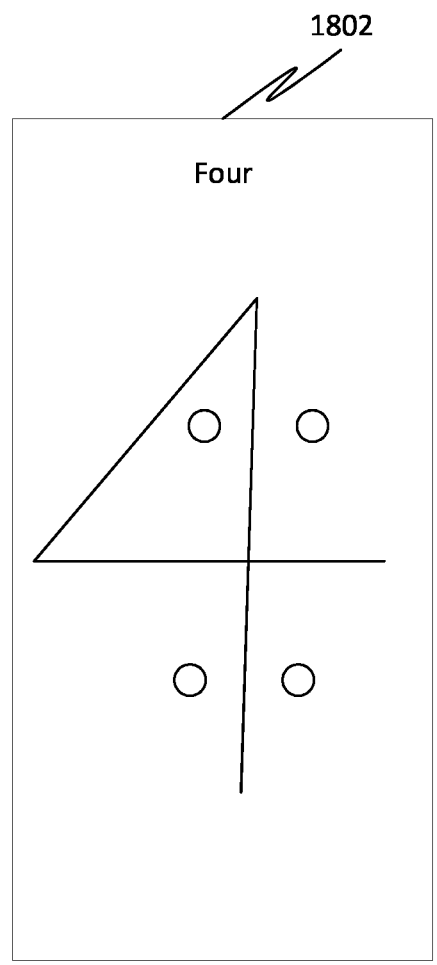
FIG. 36 illustrates a visual representation of the numeric digit ("4") with prompts for facilitating the learning of the concepts associated with mathematics, in accordance with some embodiments.

FIG. 36 illustrates a visual representation 1802 of the numeric digit ("4") with prompts for facilitating the learning of the concepts associated with mathematics, in accordance with some embodiments. Further, the numeric digit may be a number ("4"). Further, the prompts may be dots. Further, a number of the dots on a number refer to a numerical value of the number. Further, the dots are located in areas where the numeric digit will be placed.

Figure 37:
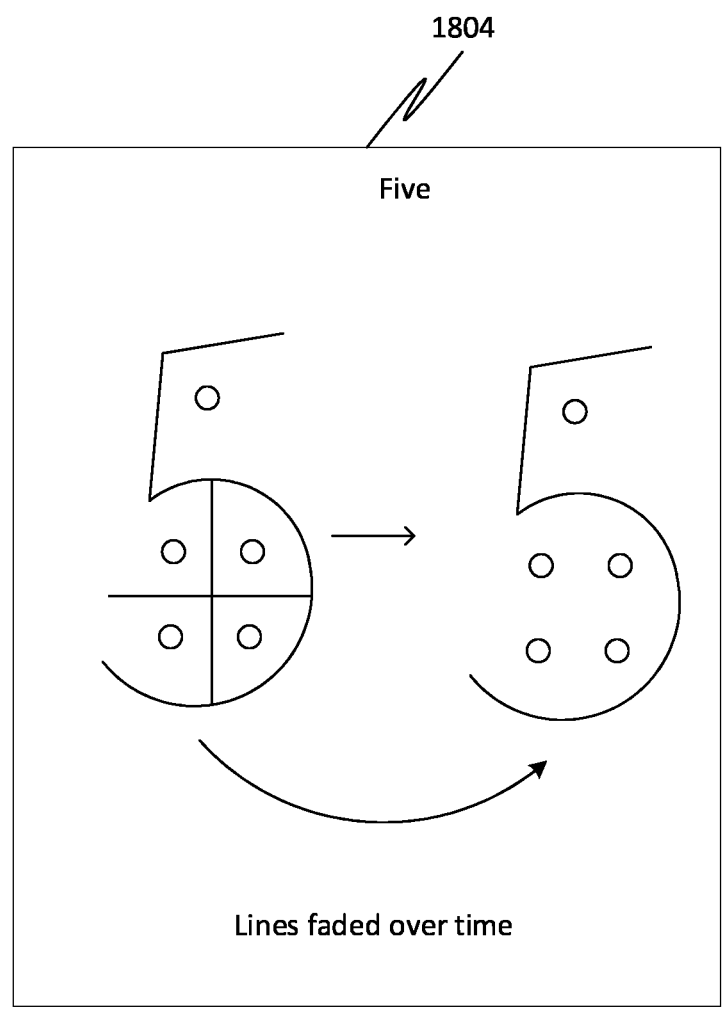
FIG. 37 illustrates a visual representation of the numeric digit ("5") with prompts for facilitating the learning of the concepts associated with mathematics, in accordance with some embodiments.

FIG. 37 illustrates a visual representation 1804 of the numeric digit ("5") with prompts for facilitating the learning of the concepts associated with mathematics, in accordance with some embodiments. Further, the numeric digit may be a number ("5"). Further, the prompts may be dots. Further, a number of the dots on a number refer to a numerical value of the number. Further, the dots are located in areas where the numeric digit will be placed.

Figure 38:
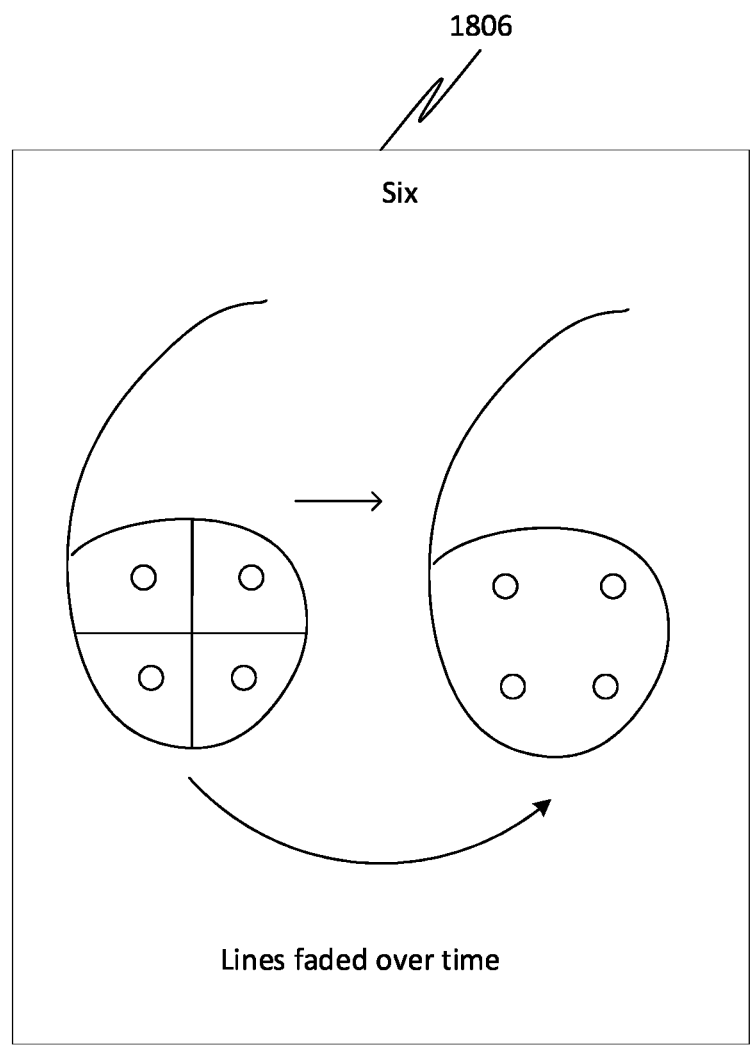
FIG. 38 illustrates a visual representation of the numeric digit ("6") with prompts for facilitating the learning of the concepts associated with mathematics, in accordance with some embodiments.

FIG. 38 illustrates a visual representation 1806 of the numeric digit ("6") with prompts for facilitating the learning of the concepts associated with mathematics, in accordance with some embodiments. Further, the numeric digit may be a number ("6").

Further, the prompts may be dots. Further, a number of the dots on a number refer to a numerical value of the number. Further, the dots are located in areas where the numeric digit will be placed.

Figure 39:
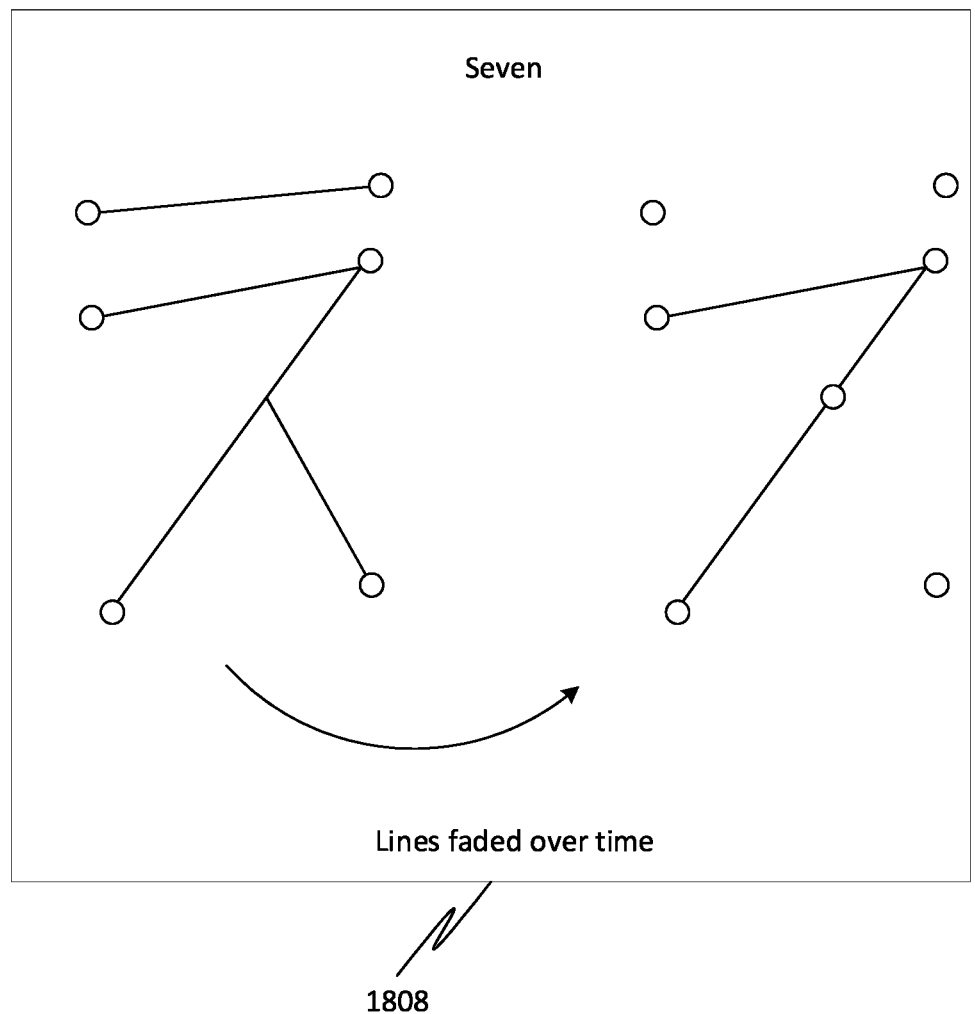
FIG. 39 illustrates a visual representation of the numeric digit ("7") with prompts for facilitating the learning of the concepts associated with mathematics, in accordance with some embodiments.

FIG. 39 illustrates a visual representation 1808 of the numeric digit ("7") with prompts for facilitating the learning of the concepts associated with mathematics, in accordance with some embodiments. Further, the numeric digit may be a number ("7"). Further, the prompts may be dots. Further, a number of the dots on a number refer to a numerical value of the number. Further, the dots are located in areas where the numeric digit will be placed.

Figure 40:
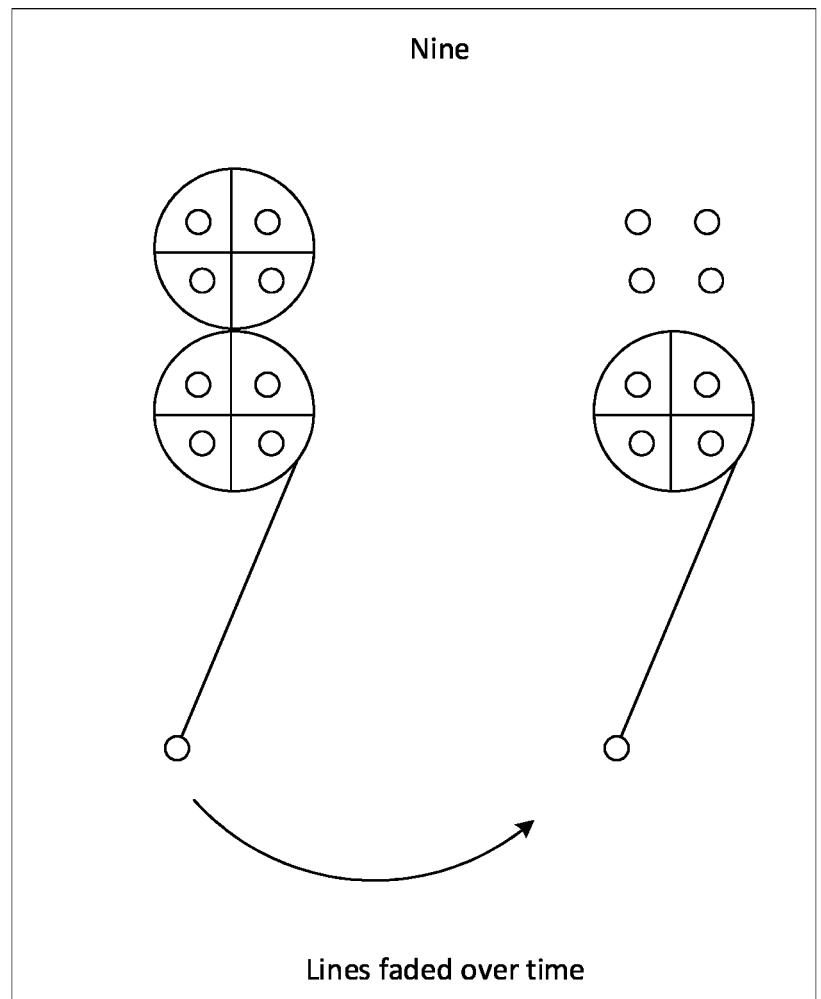
FIG. 40 illustrates a visual representation of a numeric digit ("9") with prompts for facilitating the learning of the concepts associated with mathematics, in accordance with some embodiments.

FIG. 40 illustrates a visual representation 1810 of a numeric digit ("9") with prompts for facilitating the learning of the concepts associated with mathematics, in accordance with some embodiments. Further, the numeric digit may be a number ("9"). Further, the prompts may be dots. Further, a number of the dots on a number refer to a numerical value of the number. Further, the dots are located in areas where the numeric digit will be placed.

Figure 41:
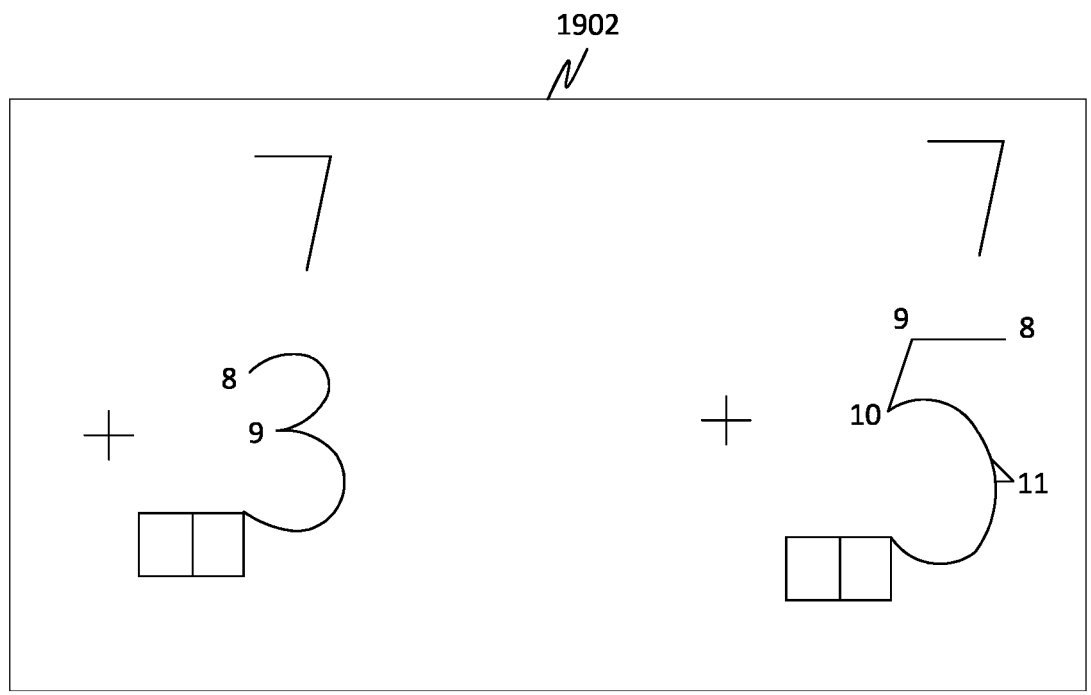
FIG. 41 illustrates a visual representation of a first addition process of multiple addition processes using the plurality of numeric digits with prompts for facilitating the learning of the concepts associated with mathematics, in accordance with some embodiments.

FIG. 41 illustrates a visual representation 1902 of a first addition process of multiple addition processes using the plurality of numeric digits with prompts for facilitating the learning of the concepts associated with mathematics, in accordance with some embodiments. Further, in the first addition process, the prompts may include numbers that are dotted with colors and counted up all the way to the final box.

Figure 42:
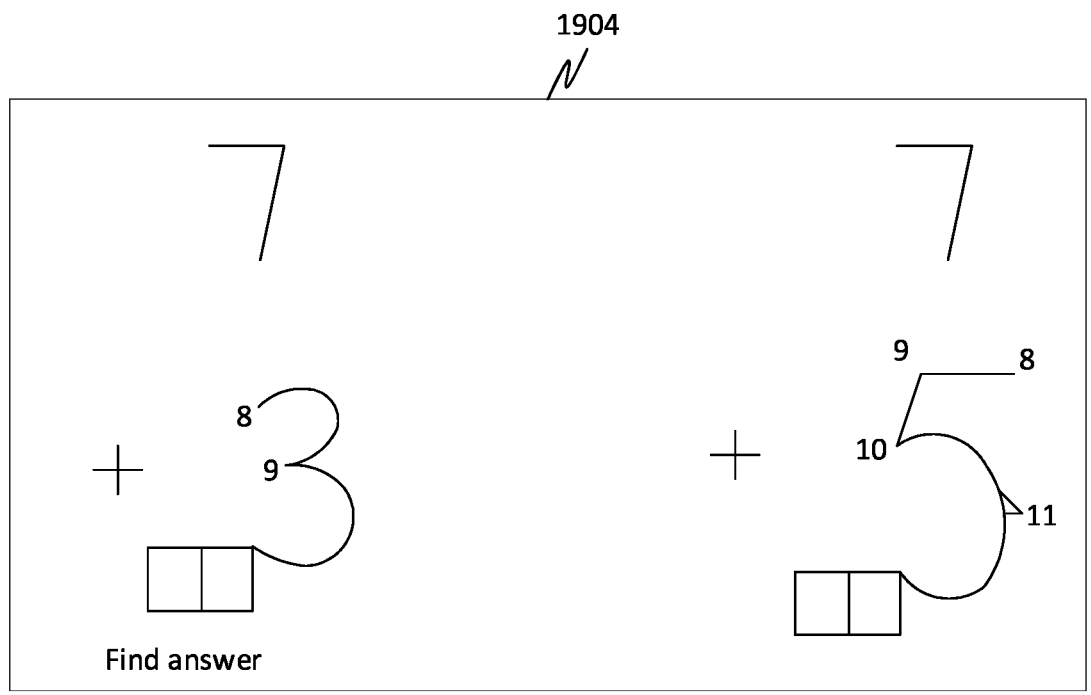
FIG. 42 illustrates a visual representation of a second addition process of multiple addition processes using the plurality of numeric digits with prompts for facilitating the learning of the concepts associated with mathematics, in accordance with some embodiments.

FIG. 42 illustrates a visual representation 1904 of a second addition process of multiple addition processes using the plurality of numeric digits with prompts for facilitating the learning of the concepts associated with mathematics, in accordance with some embodiments. Further, in the second addition process, the prompts are black and counted up all the way to the final box.

Figure 43:
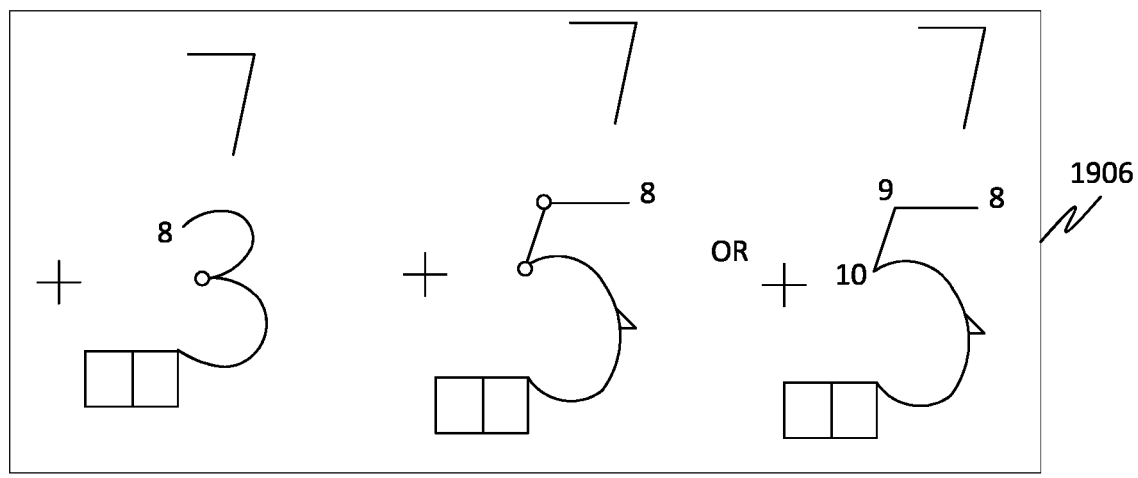
FIG. 43 illustrates a visual representation of a third addition process of the multiple addition processes using the plurality of numeric digits with prompts for facilitating the learning of the concepts associated with mathematics, in accordance with some embodiments.

FIG. 43 illustrates a visual representation 1906 of a third addition process of the multiple addition processes using the plurality of numeric digits with prompts for facilitating the learning of the concepts associated with mathematics, in accordance with some embodiments. Further, in the third addition process, the prompts include a lead number and dots.

Figure 44:
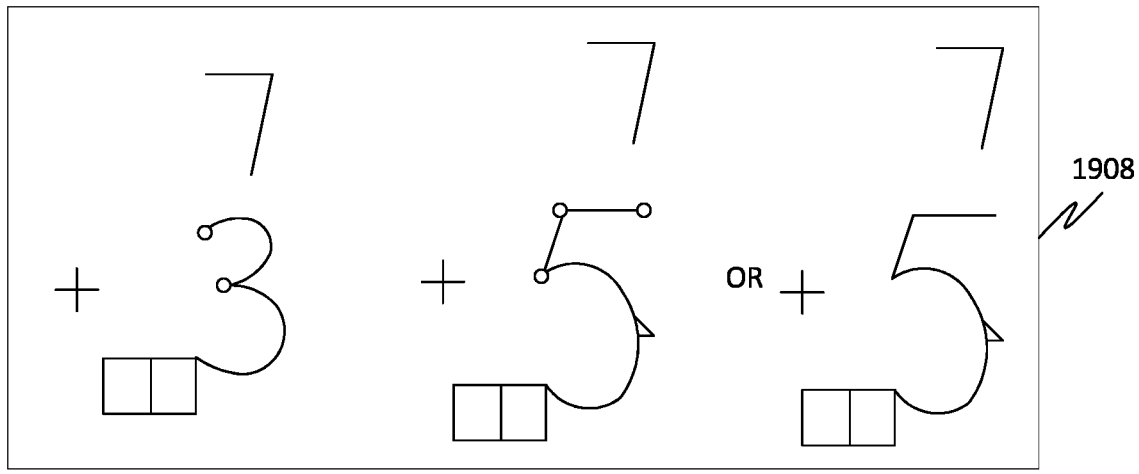
FIG. 44 illustrates a visual representation of a fourth addition process of the multiple addition processes using the plurality of numeric digits with prompts for facilitating the learning of the concepts associated with mathematics, in accordance with some embodiments.
Figure 45:
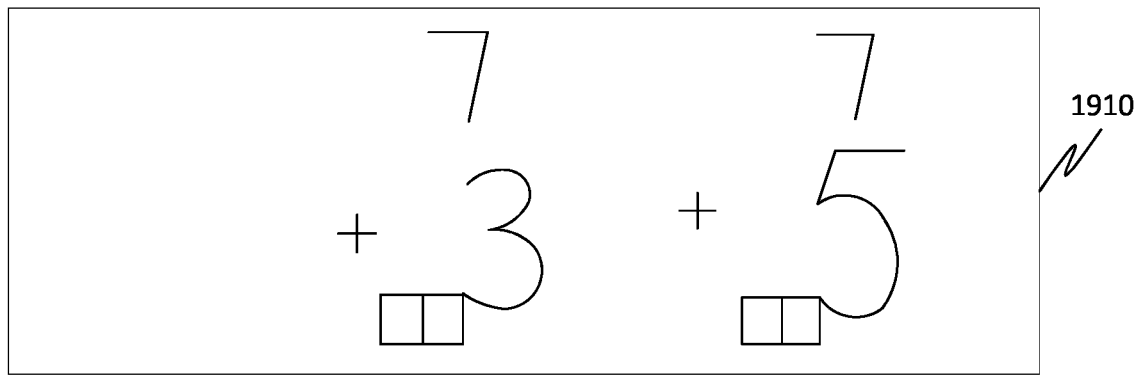
FIG. 45 illustrates a visual representation of a fifth addition process of the multiple addition processes using the plurality of numeric digits with prompts for facilitating the learning of the concepts associated with mathematics, in accordance with some embodiments.

FIG. 44 illustrates a visual representation 1908 of a fourth addition process of the multiple addition processes using the plurality of numeric digits with prompts for facilitating the learning of the concepts associated with mathematics, in accordance with some embodiments. Further, in the fourth addition process, the prompts include dots. FIG. 45 illustrates a visual representation 1910 of a fifth addition process of the multiple addition processes using the plurality of numeric digits with prompts for facilitating the learning of the concepts associated with mathematics, in accordance with some embodiments. Further, in the fifth addition process, the prompts are absent.

Figure 46:
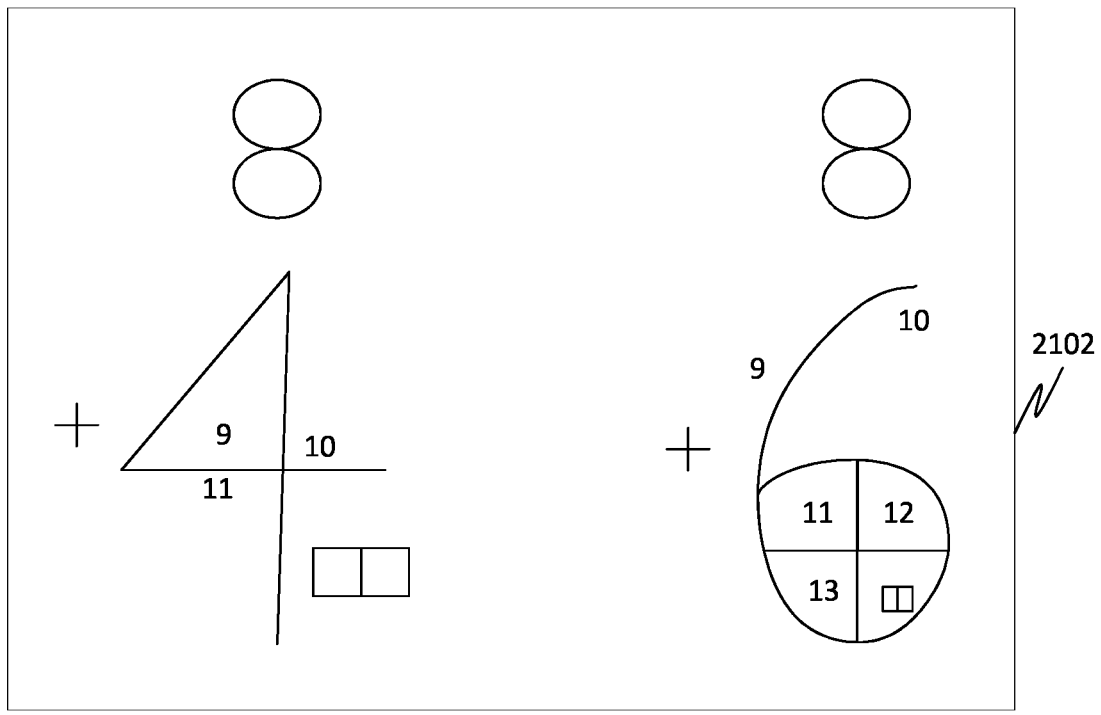
FIG. 46 illustrates a visual representation of a first addition process of multiple addition processes using the plurality of numeric digits with prompts for facilitating the learning of the concepts associated with mathematics, in accordance with some embodiments.

FIG. 46 illustrates a visual representation 2102 of a first addition process of multiple addition processes using the plurality of numeric digits with prompts for facilitating the learning of the concepts associated with mathematics, in accordance with some embodiments. Further, in the first addition process, the prompts may include colored numbers inserted in an area of the plurality of numeric digits and counted up to the final box.

Figure 47:
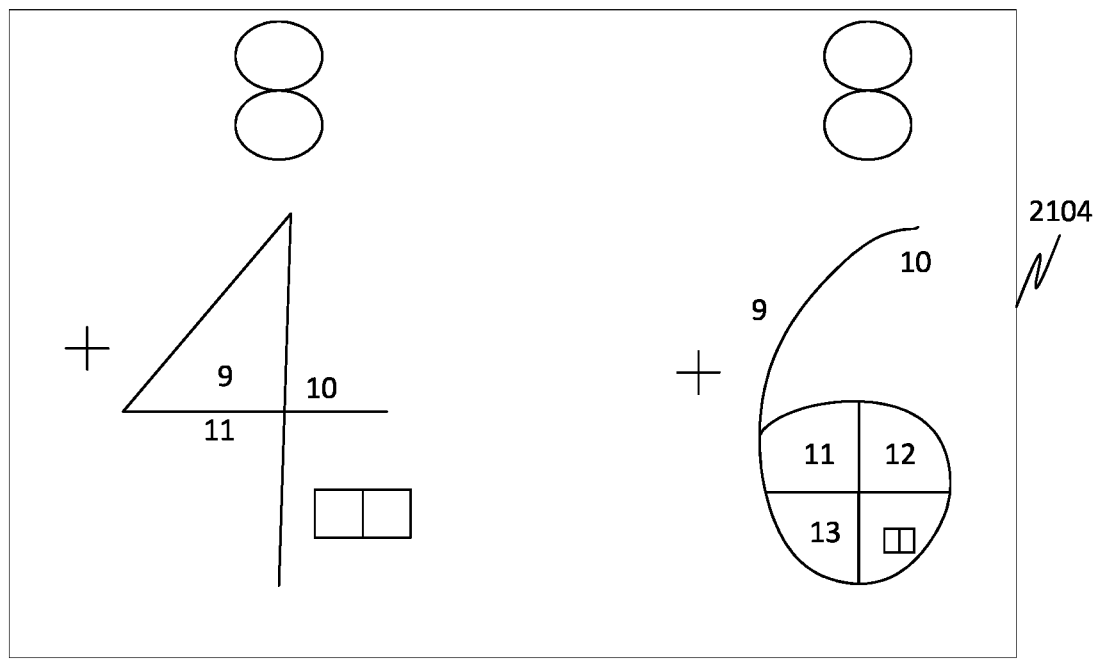
FIG. 47 illustrates a visual representation of a second addition process of multiple addition processes using the plurality of numeric digits with prompts for facilitating the learning of the concepts associated with mathematics, in accordance with some embodiments.

FIG. 47 illustrates a visual representation 2104 of a second addition process of multiple addition processes using the plurality of numeric digits with prompts for facilitating the learning of the concepts associated with mathematics, in accordance with some embodiments. Further, in the second addition process, the prompts are black and counted up to the final box.

Figure 48:
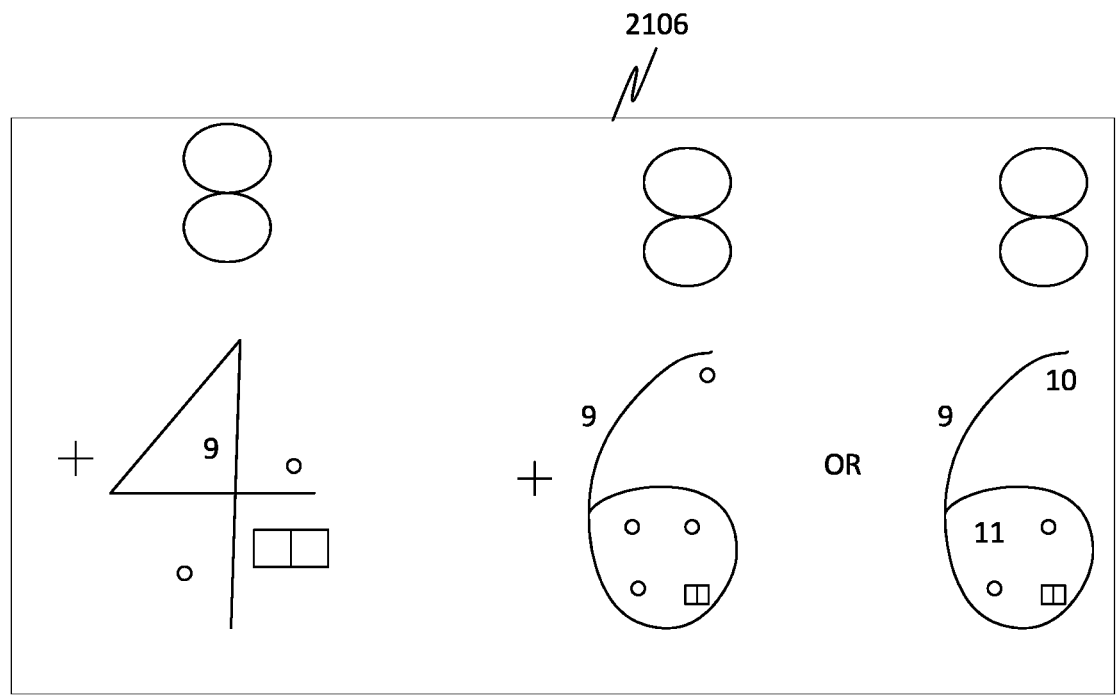
FIG. 48 illustrates a visual representation of a third addition process of multiple addition processes using the plurality of numeric digits with prompts for facilitating the learning of the concepts associated with mathematics, in accordance with some embodiments.

FIG. 48 illustrates a visual representation 2106 of a third addition process of multiple addition processes using the plurality of numeric digits with prompts for facilitating the learning of the concepts associated with mathematics, in accordance with some embodiments. Further, in the third addition process, the prompts include a lead number and dots.

Figure 49:
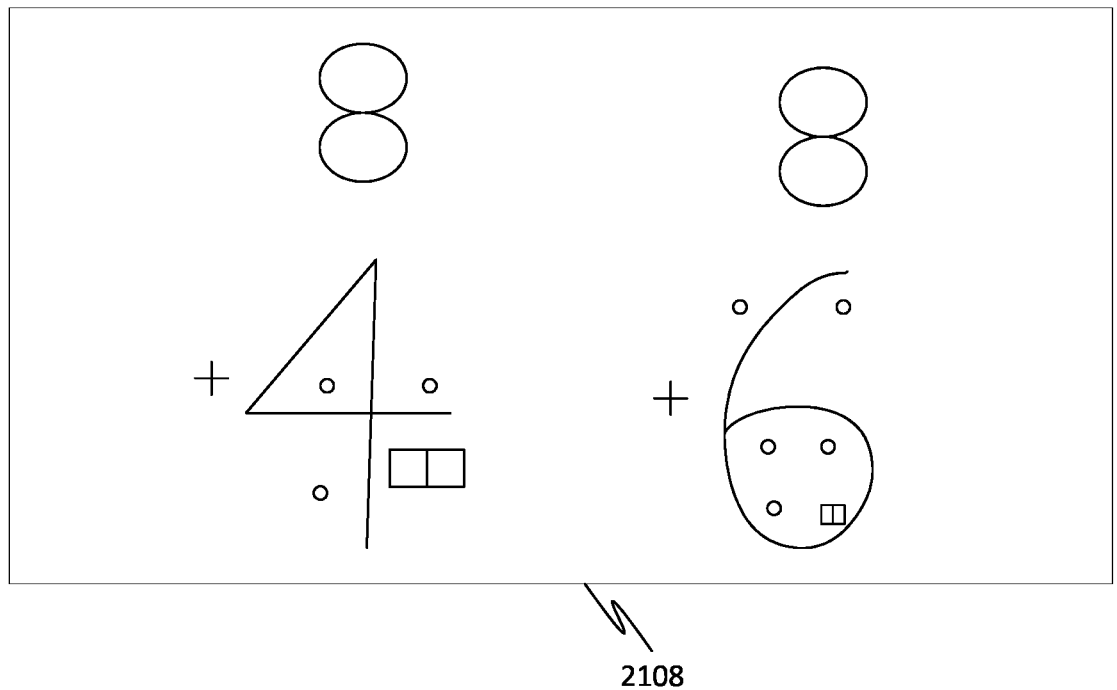
FIG. 49 illustrates a visual representation of a fourth addition process of multiple addition processes using the plurality of numeric digits with prompts for facilitating the learning of the concepts associated with mathematics, in accordance with some embodiments.

FIG. 49 illustrates a visual representation 2108 of a fourth addition process of multiple addition processes using the plurality of numeric digits with prompts for facilitating the learning of the concepts associated with mathematics, in accordance with some embodiments. Further, in the fourth addition process, the prompts include dots.

Figure 50:
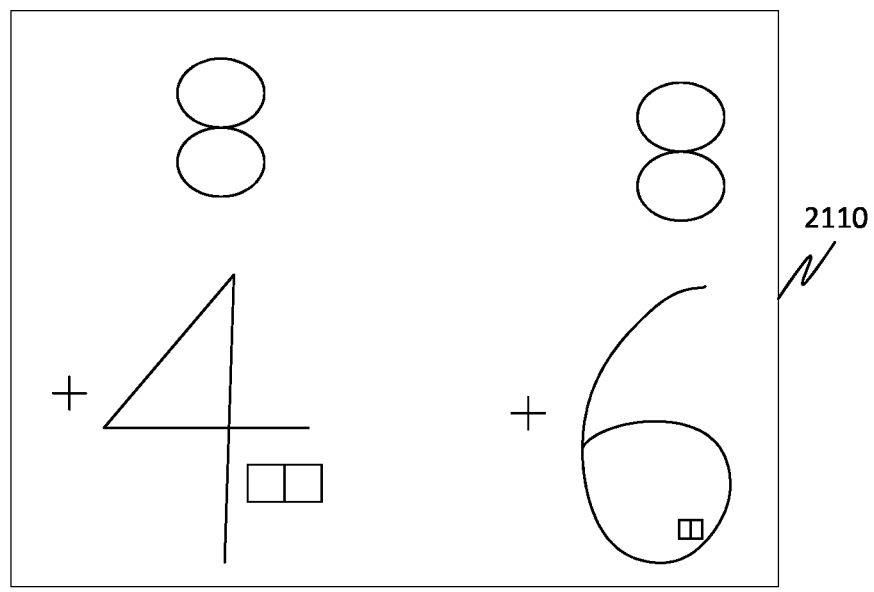
FIG. 50 illustrates a visual representation of a fifth addition process of multiple addition processes using the plurality of numeric digits with prompts for facilitating the learning of the concepts associated with mathematics, in accordance with some embodiments.

FIG. 50 illustrates a visual representation 2110 of a fifth addition process of multiple addition processes using the plurality of numeric digits with prompts for facilitating the learning of the concepts associated with mathematics, in accordance with some embodiments. Further, in the fifth addition process, the prompts are absent.

Figure 51:
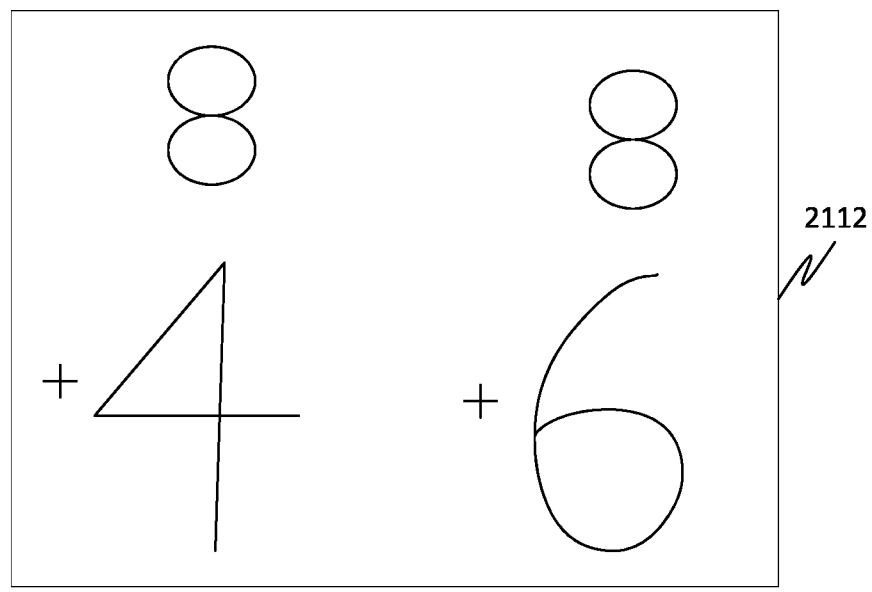
FIG. 51 illustrates a visual representation of a sixth addition process of multiple addition processes using the plurality of numeric digits with prompts for facilitating the learning of the concepts associated with mathematics, in accordance with some embodiments.

FIG. 51 illustrates a visual representation 2112 of a sixth addition process of multiple addition processes using the plurality of numeric digits with prompts for facilitating the learning of the concepts associated with mathematics, in accordance with some embodiments. Further, in the sixth addition process, the plurality of numeric digits is written in standard form without the prompts.

Figure 52:
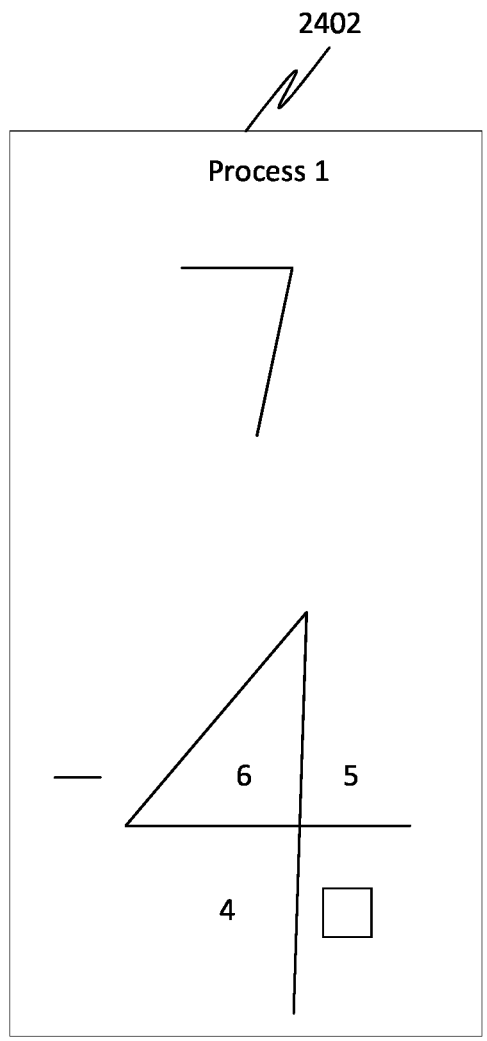
FIG. 52 illustrates a visual representation of a first subtraction process of multiple subtraction processes using the plurality of numeric digits with prompts for facilitating the learning of the concepts associated with mathematics, in accordance with some embodiments.

FIG. 52 illustrates a visual representation 2402 of a first subtraction process of multiple subtraction processes using the plurality of numeric digits with prompts for facilitating the learning of the concepts associated with mathematics, in accordance with some embodiments. Further, in the first subtraction process, the prompts may include numbers that are dotted with colors and counted up all the way to the final box.

Figure 53:
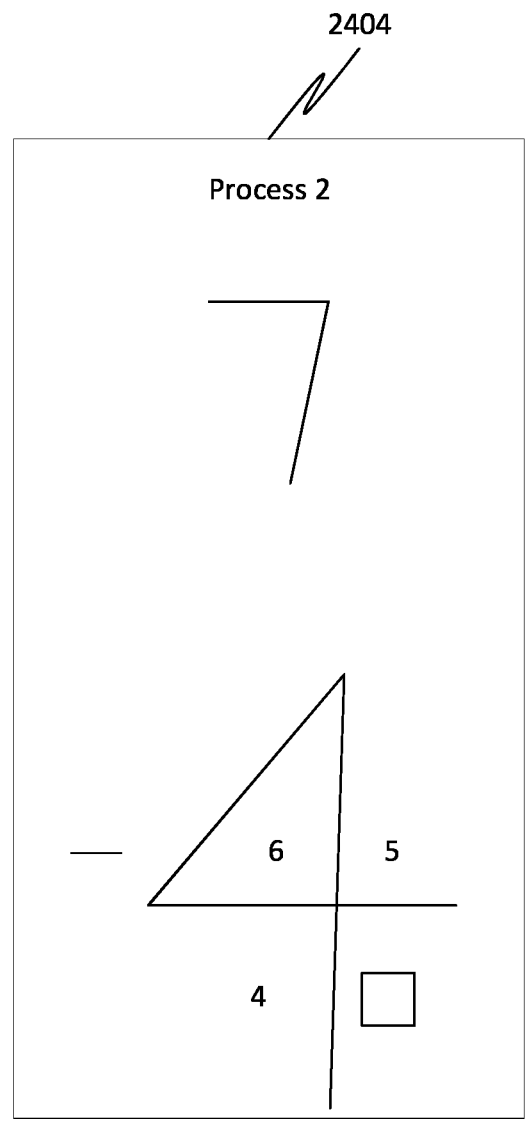
FIG. 53 illustrates a visual representation of a second subtraction process of multiple subtraction processes using the plurality of numeric digits with prompts for facilitating the learning of the concepts associated with mathematics, in accordance with some embodiments.

FIG. 53 illustrates a visual representation 2404 of a second subtraction process of multiple subtraction processes using the plurality of numeric digits with prompts for facilitating the learning of the concepts associated with mathematics, in accordance with some embodiments. Further, in the second subtraction process, the prompts are black and counted up all the way to the final box.

Figure 54:
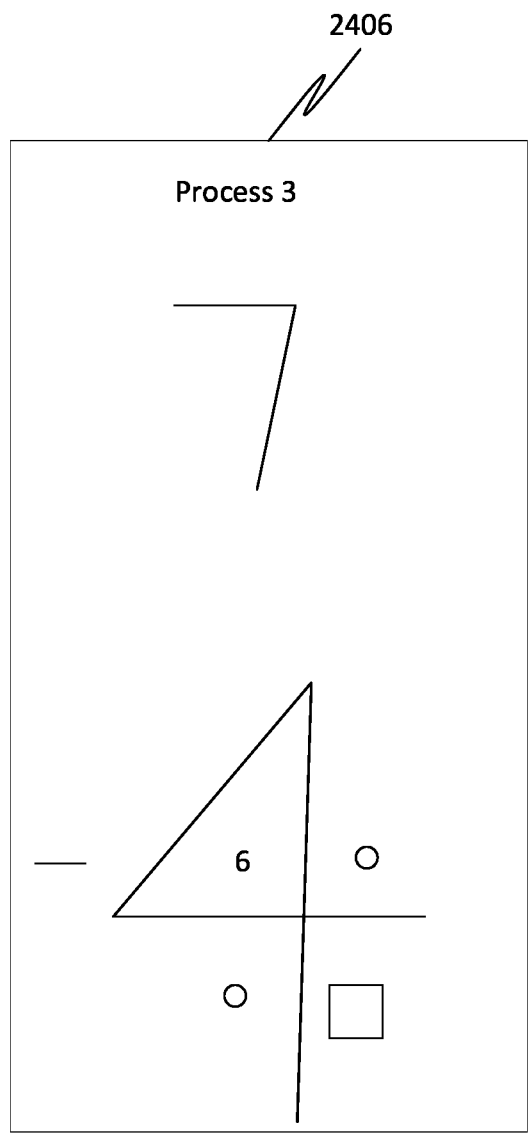
FIG. 54 illustrates a visual representation of a third subtraction process of the multiple subtraction processes using the plurality of numeric digits with prompts for facilitating the learning of the concepts associated with mathematics, in accordance with some embodiments.

FIG. 54 illustrates a visual representation 2406 of a third subtraction process of the multiple subtraction processes using the plurality of numeric digits with prompts for facilitating the learning of the concepts associated with mathematics, in accordance with some embodiments. Further, in the third subtraction process, the prompts include a lead number and dots.

Figure 55:
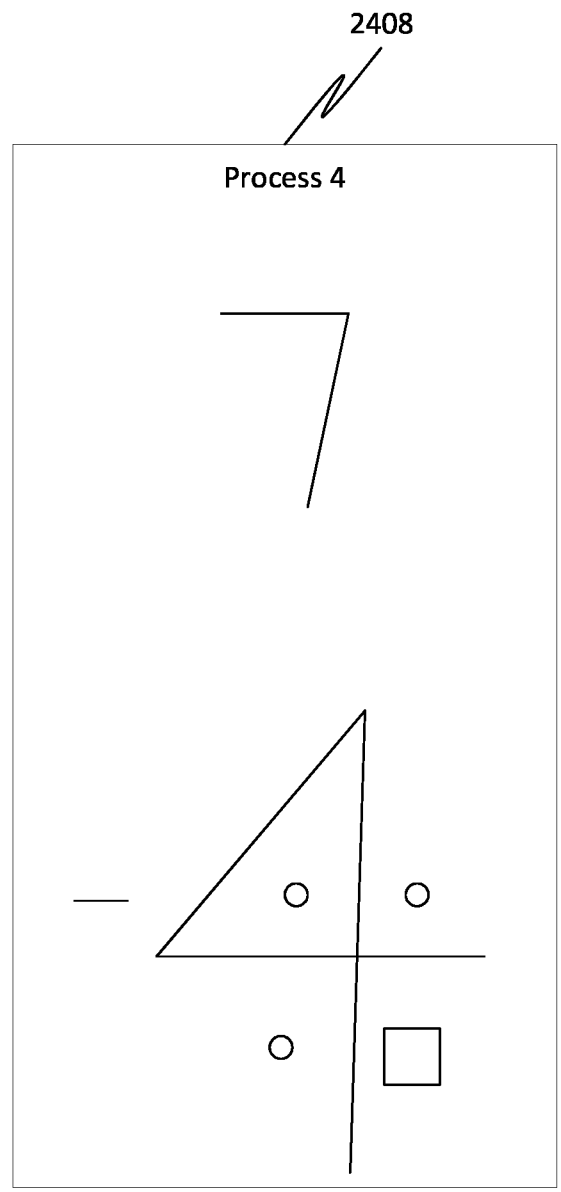
FIG. 55 illustrates a visual representation of a fourth subtraction process of the multiple subtraction processes using the plurality of numeric digits with prompts for facilitating the learning of the concepts associated with mathematics, in accordance with some embodiments.

FIG. 55 illustrates a visual representation 2408 of a fourth subtraction process of the multiple subtraction processes using the plurality of numeric digits with prompts for facilitating the learning of the concepts associated with mathematics, in accordance with some embodiments. Further, in the fourth subtraction process, the prompts include dots.

Figure 56:
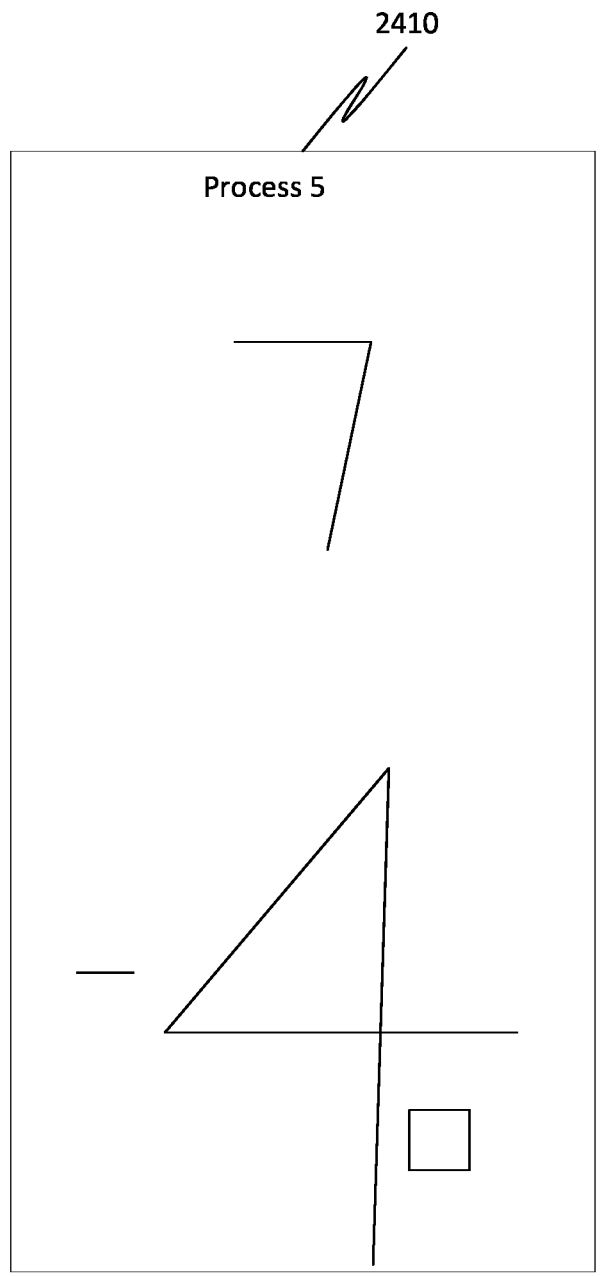
FIG. 56 illustrates a visual representation of a fifth subtraction process of the multiple subtraction processes using the plurality of numeric digits with prompts for facilitating the learning of the concepts associated with mathematics, in accordance with some embodiments.

FIG. 56 illustrates a visual representation 2410 of a fifth subtraction process of the multiple subtraction processes using the plurality of numeric digits with prompts for facilitating the learning of the concepts associated with mathematics, in accordance with some embodiments. Further, in the fifth subtraction process, the prompts are absent.

Figure 57:
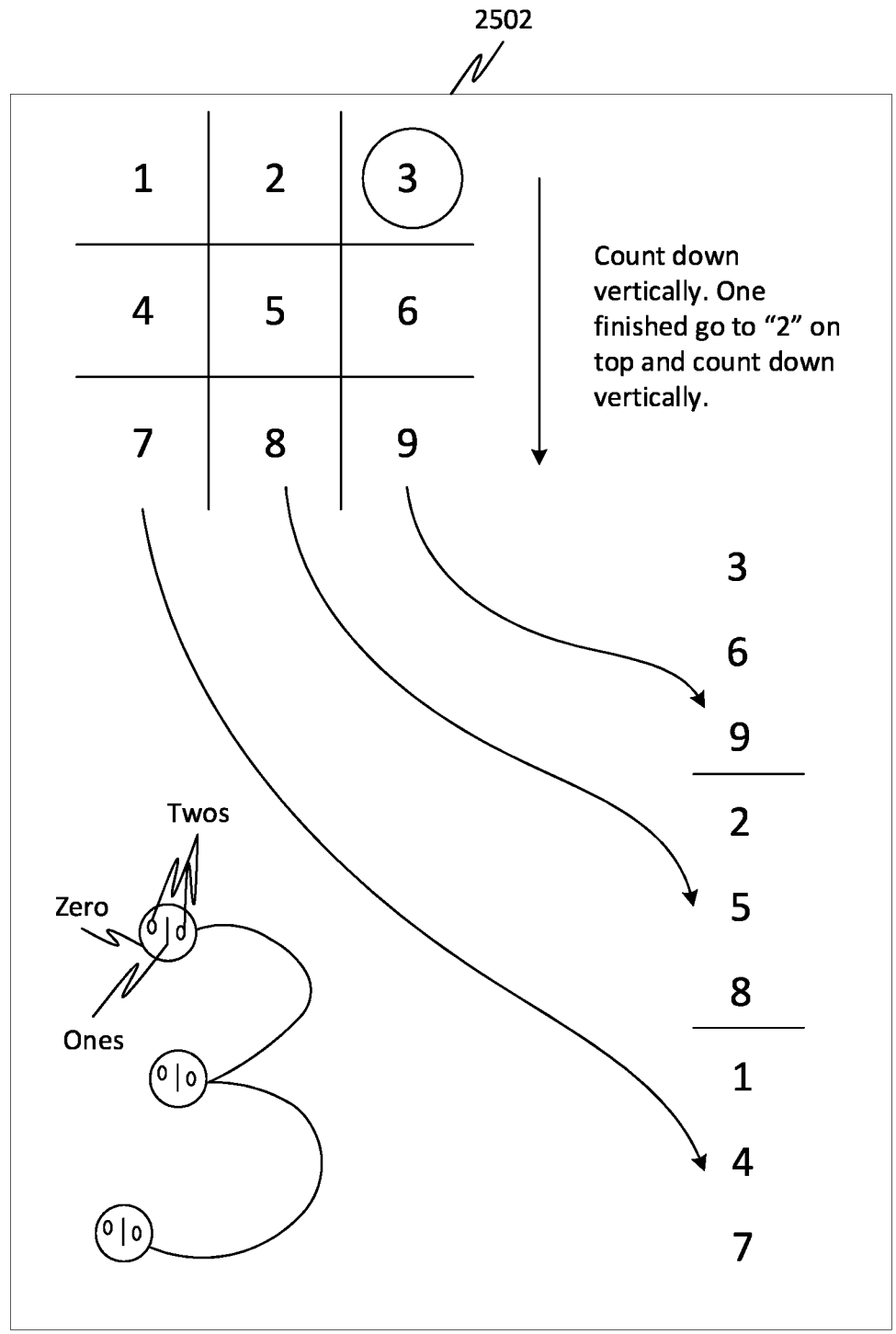
FIG. 57 illustrates a visual representation of a process for writing a times table of three with prompts for facilitating the learning of the concepts associated with mathematics, in accordance with some embodiments.
Figure 58:
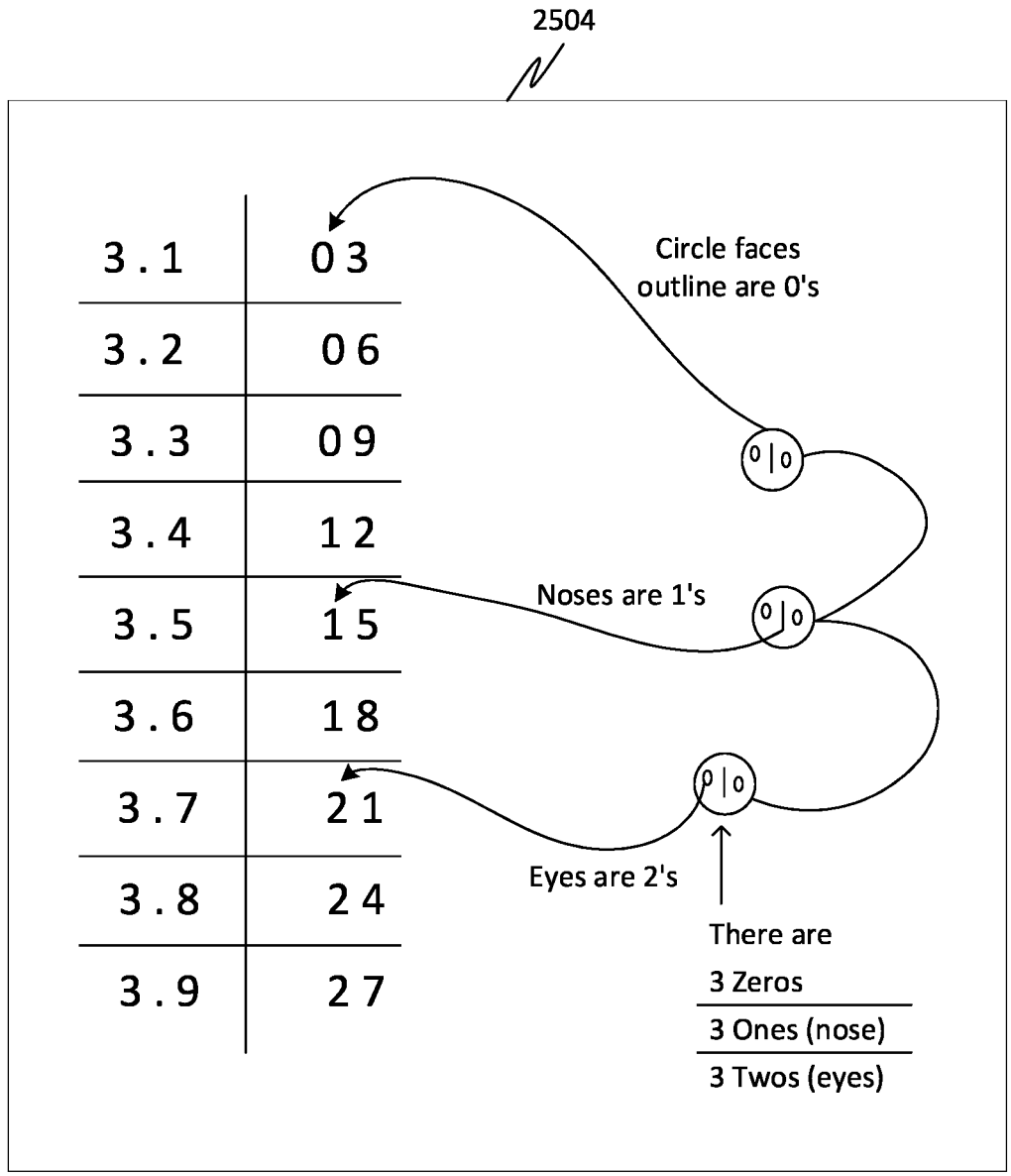
FIG. 58 illustrates a visual representation of the process for writing the times table of three with prompts for facilitating the learning of the concepts associated with mathematics, in accordance with some embodiments.

FIG. 57 illustrates a visual representation 2502 of a process for writing a times table of three with prompts for facilitating the learning of the concepts associated with mathematics, in accordance with some embodiments. Further, the process may include a "phone dial pad" times table method. Further, a dial pad on a standard cell phone is used to determine an answer to one's digit ("3") in the "phone dial pad" times table method. Further, columns of the dial pad are counted downwards from left to right. For the ten's digit, the prompts of "faces" on the "3" are used FIG. 58 illustrates a visual representation 2504 of the process for writing the times table of three with prompts for facilitating the learning of the concepts associated with mathematics, in accordance with some embodiments. Further, the answers are used for the writing of the times table. Further, black numbers are the main numbers in the times table, blue numbers are secondary numbers, and red numbers are answers (i.e., a product of two numbers) in the visual representation 2504. The color red is used to imply "stop"

Figure 59:
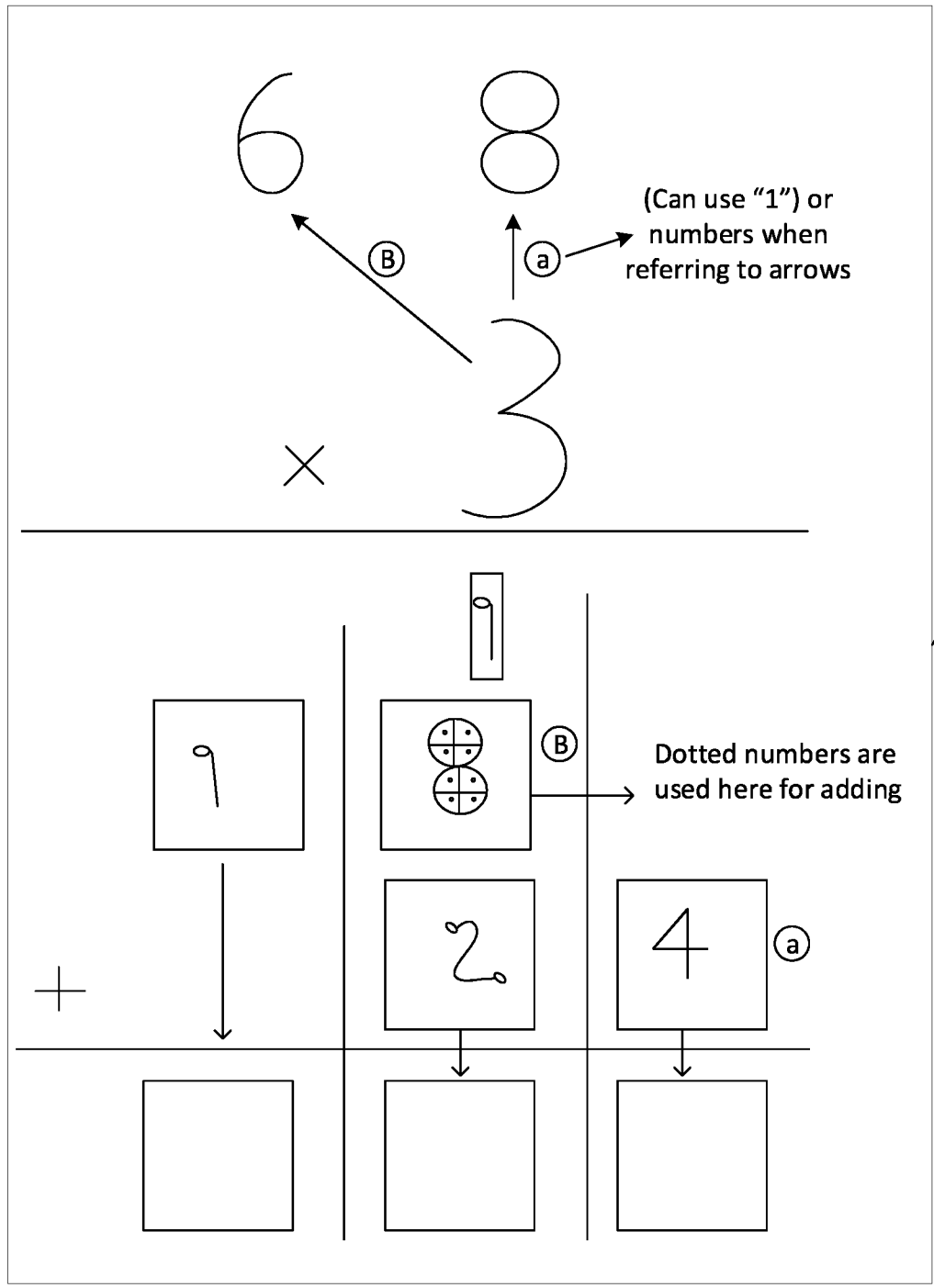
FIG. 59 illustrates a visual representation of a multiplication process with prompts for facilitating the learning of the concepts associated with mathematics, in accordance with some embodiments.

FIG. 59 illustrates a visual representation 2702 of a multiplication process with prompts for facilitating the learning of the concepts associated with mathematics, in accordance with some embodiments. Further, the visual representation 2702 instructs a student to plug in numbers following numbered arrows placing them in appropriate colored boxes based on the times table.

Figure 60:
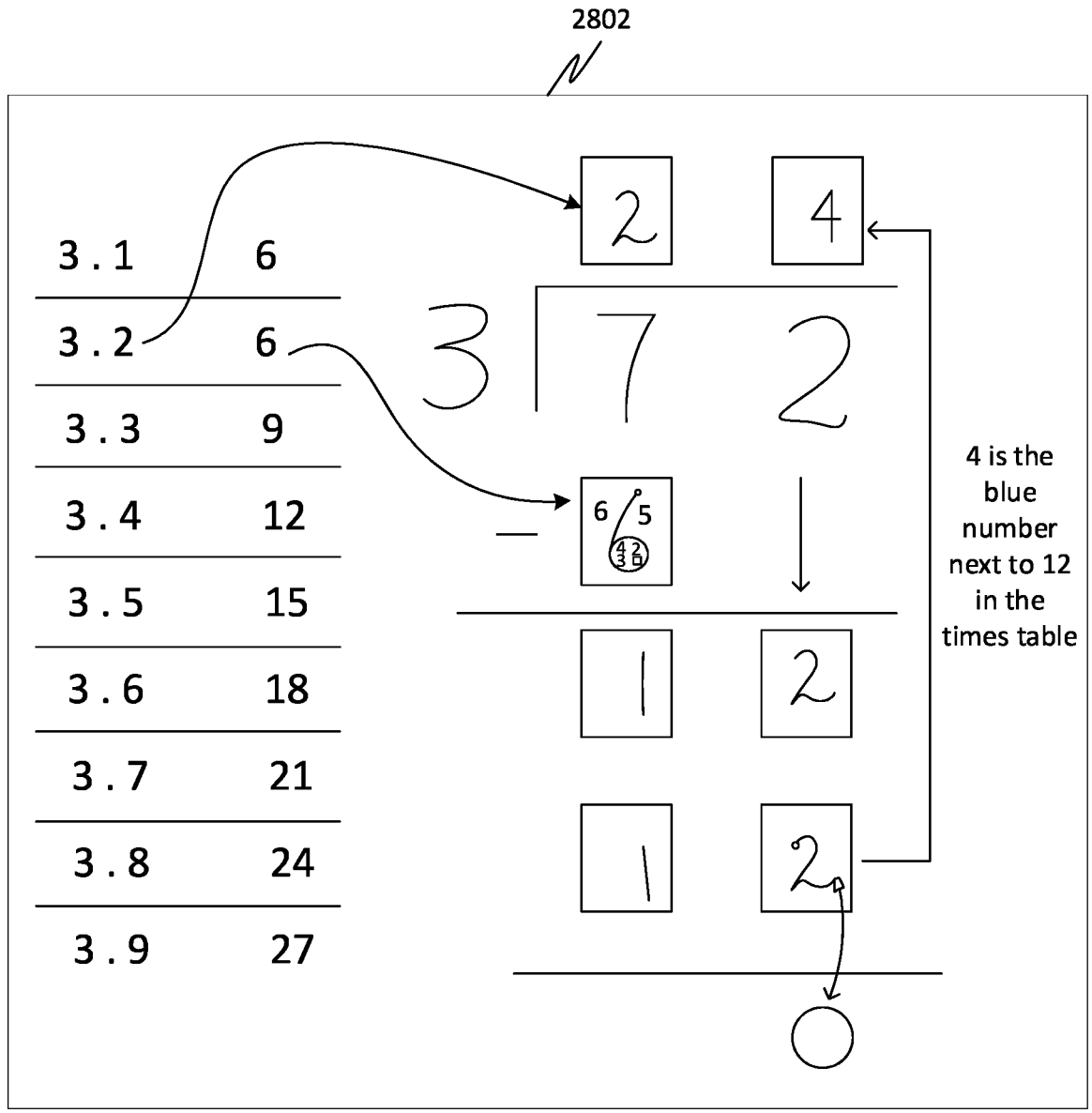
FIG. 60 illustrates a visual representation of a division process with prompts for facilitating the learning of the concepts associated with mathematics, in accordance with some embodiments.

FIG. 60 illustrates a visual representation 2802 of a division process with prompts for facilitating the learning of the concepts associated with mathematics, in accordance with some embodiments. Further, the visual representation 2802 instructs a student to plug in numbers in appropriate colored boxes by following blue numbers that correspond with red numbers connected with arrows (or the arrows that link from red to blue boxes) based on the times table.

Figure 61:
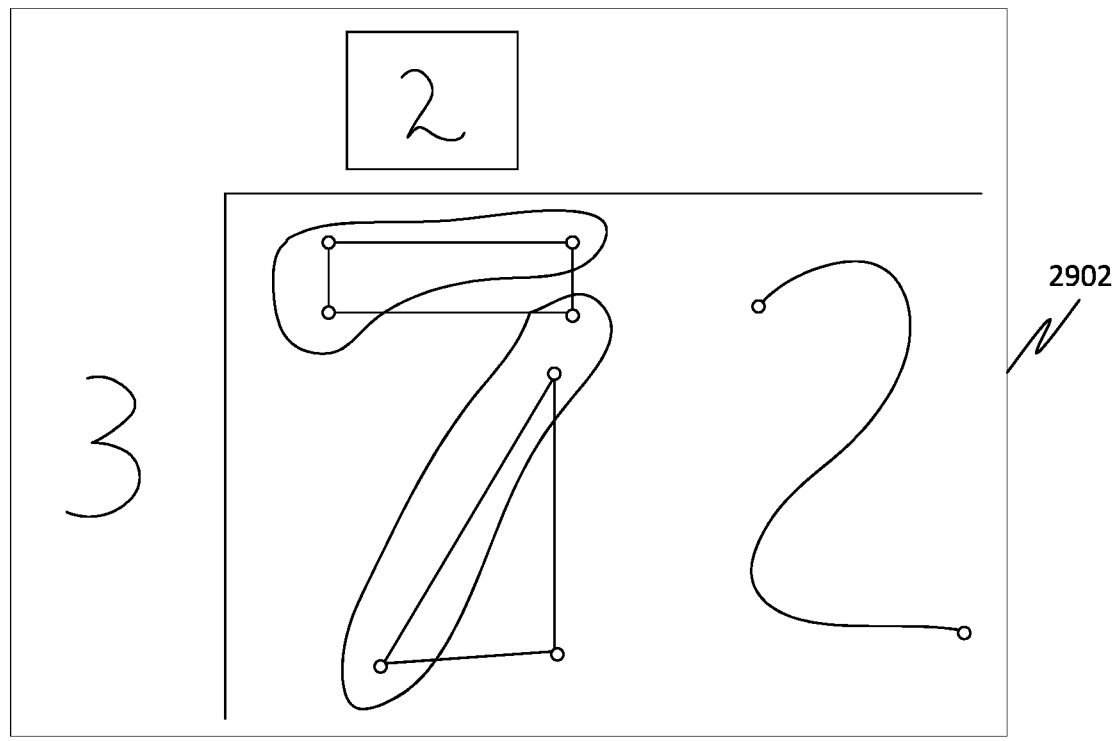
FIG. 61 illustrates a visual representation of a first step of a long division process with prompts for facilitating the learning of the concepts associated with mathematics, in accordance with some embodiments.

FIG. 61 illustrates a visual representation 2902 of a first step of a long division process with prompts for facilitating the learning of the concepts associated with mathematics, in accordance with some embodiments. Further, the long division process which can be performed by simply using the dotted/alternate design numbers without the use of the times table. Further, the first step of the long division process may include circling 3 dots at a time (since the divisor of this question is 3) Count how many groups of 3's have been circled and place that number in the left blue square (quotient).

Figure 62:
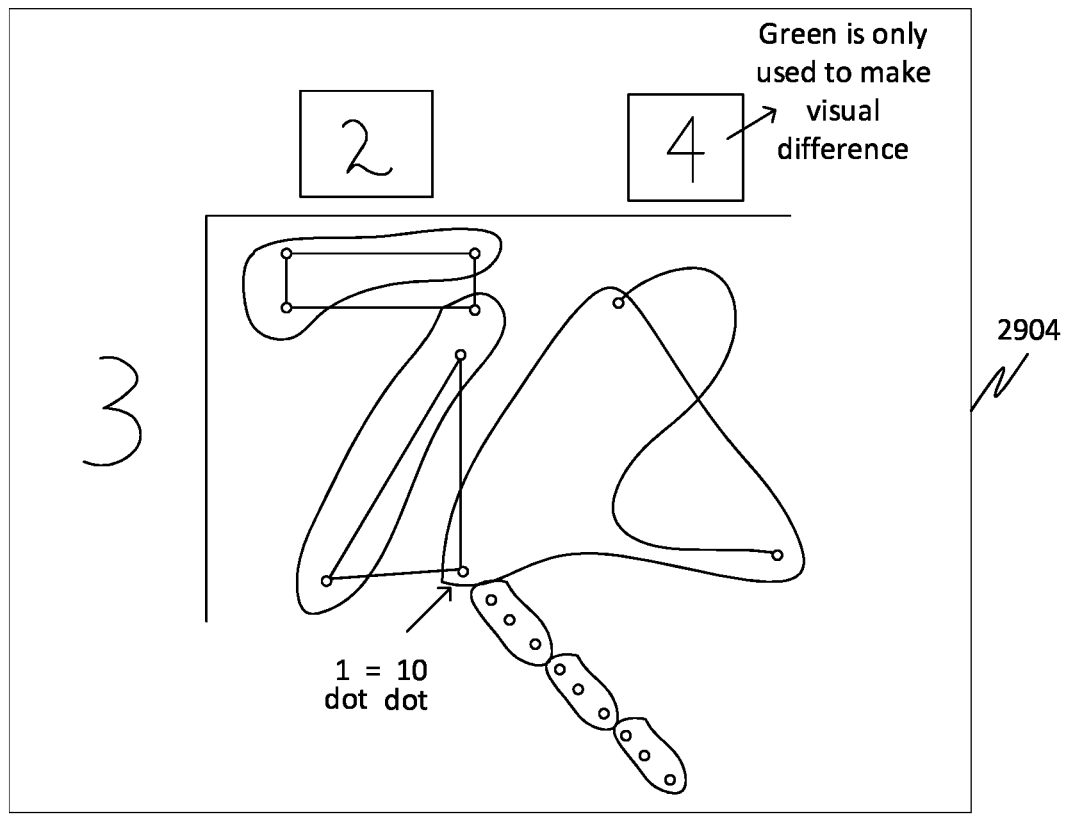
FIG. 62 illustrates a visual representation of a second step of the long division process, in accordance with some embodiments.
Figure 63:
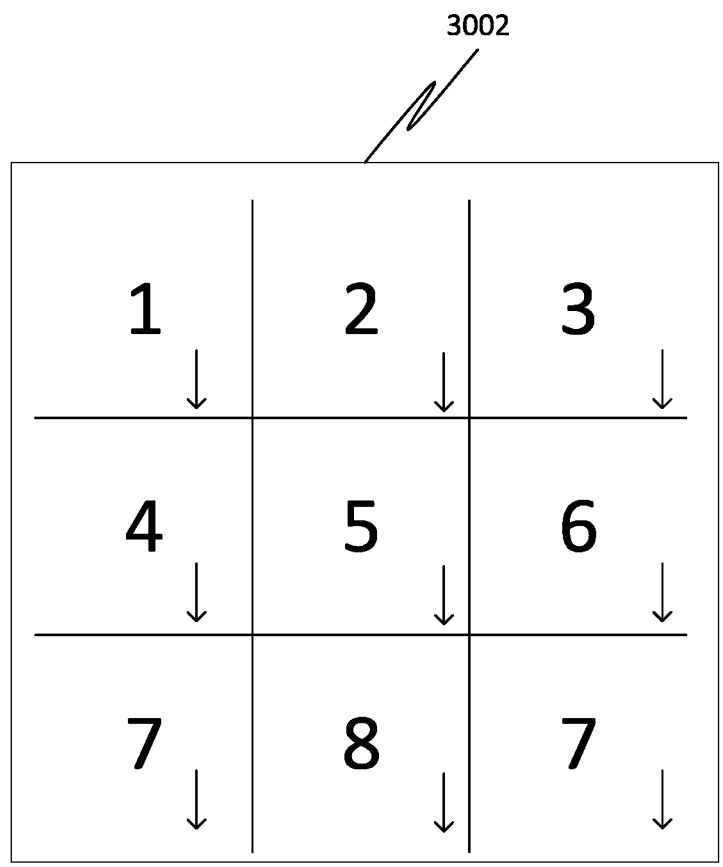
FIG. 63 illustrates a visual representation of step 1 of a process for writing a times table of three with prompts for facilitating the learning of the concepts associated with mathematics, in accordance with some embodiments.

FIG. 62 illustrates a visual representation 2904 of a second step of the long division process, in accordance with some embodiments. Further, the second step of the long division may include checking if there are any leftover dots, each one represents 10 dots because it is in the tens digit. Therefore, we add ten more dots from that 1 leftover dot. With the remaining dots, circle them 3 at a time since 3 is the divisor FIG. 63 illustrates a visual representation 3002 of step 1 of a process for writing a times table of three with prompts for facilitating the learning of the concepts associated with mathematics, in accordance with some embodiments.

Figure 64:
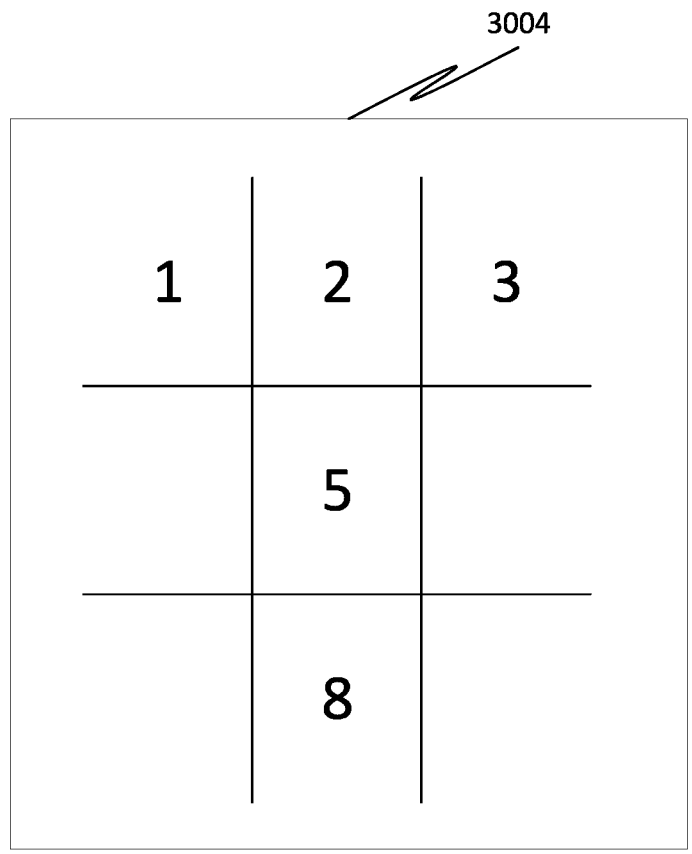
FIG. 64 illustrates a visual representation of step 2 of the process, in accordance with some embodiments.

FIG. 64 illustrates a visual representation 3004 of step 2 of the process, in accordance with some embodiments.

Figure 65:
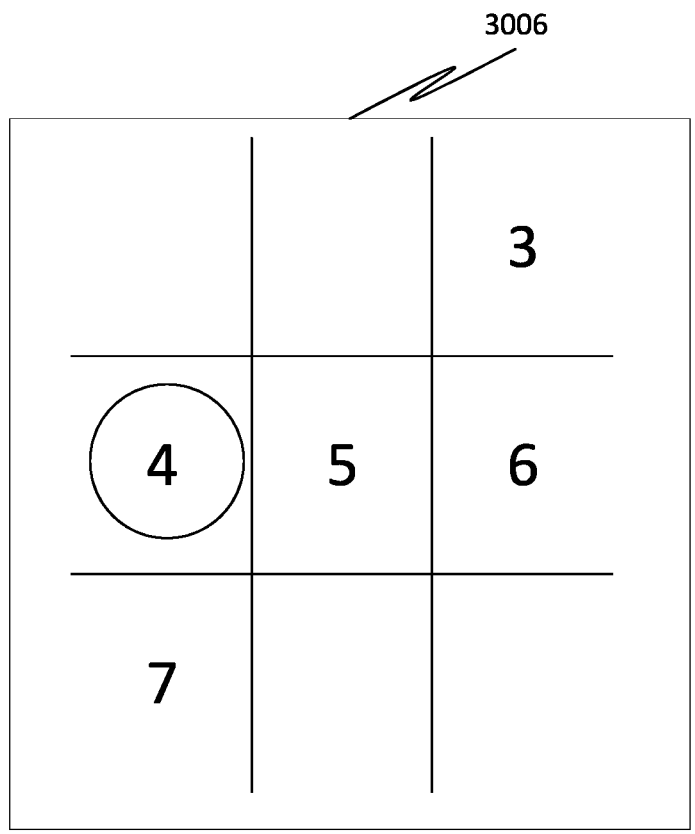
FIG. 65 illustrates a first visual representation of step 3 of the process, in accordance with some embodiments.

FIG. 65 illustrates a first visual representation 3006 of step 3 of the process, in accordance with some embodiments.

Figure 66:
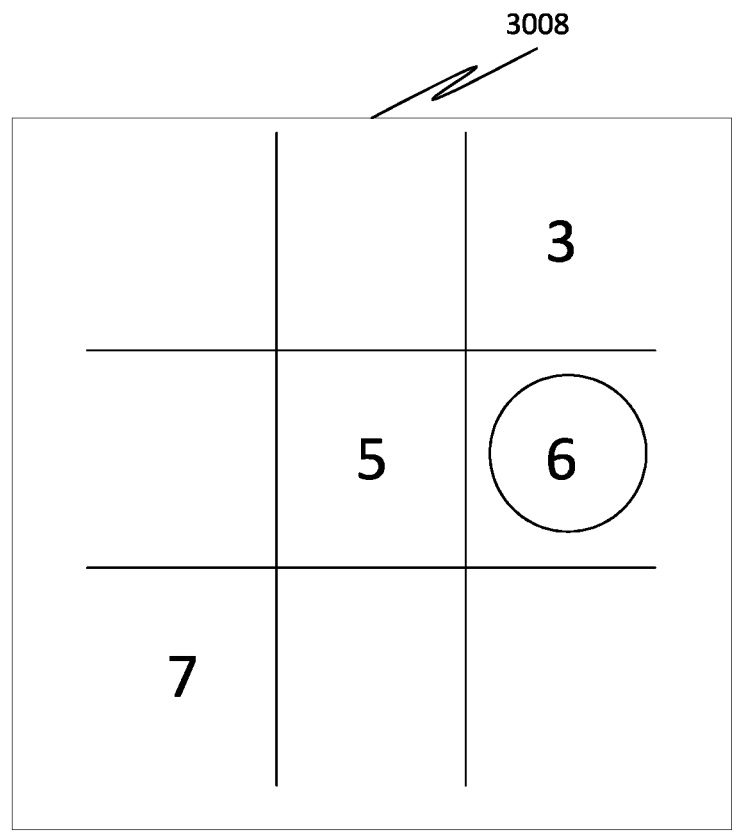
FIG. 66 illustrates a second visual representation of the step 3 of the process, in accordance with some embodiments.

FIG. 66 illustrates a second visual representation 3008 of the step 3 of the process, in accordance with some embodiments.

Figure 67:
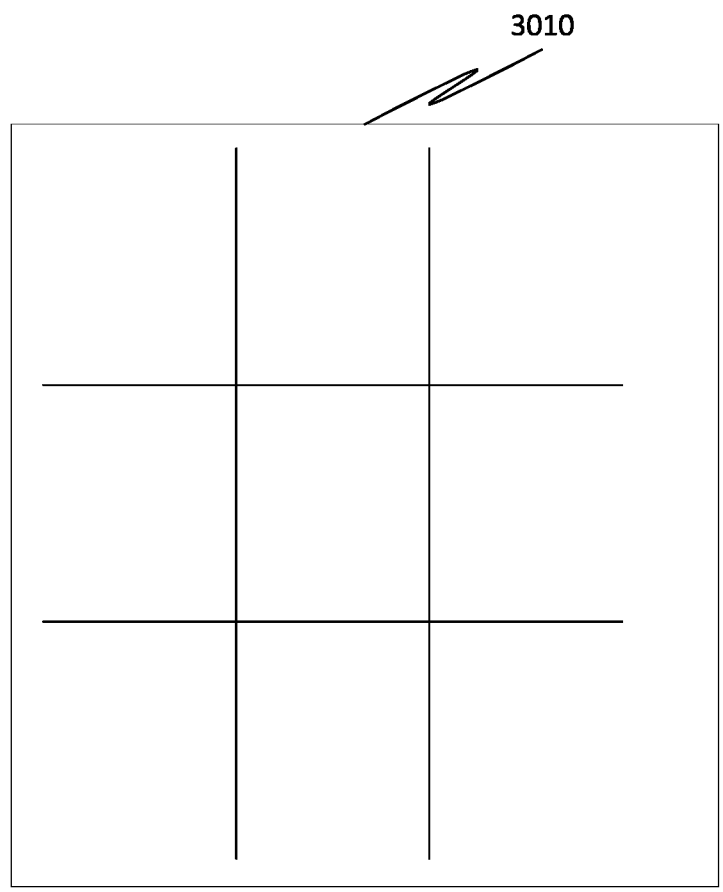
FIG. 67 illustrates a visual representation of step 4 of the process, in accordance with some embodiments.

FIG. 67 illustrates a visual representation 3010 of step 4 of the process, in accordance with some embodiments.

Figure 68:
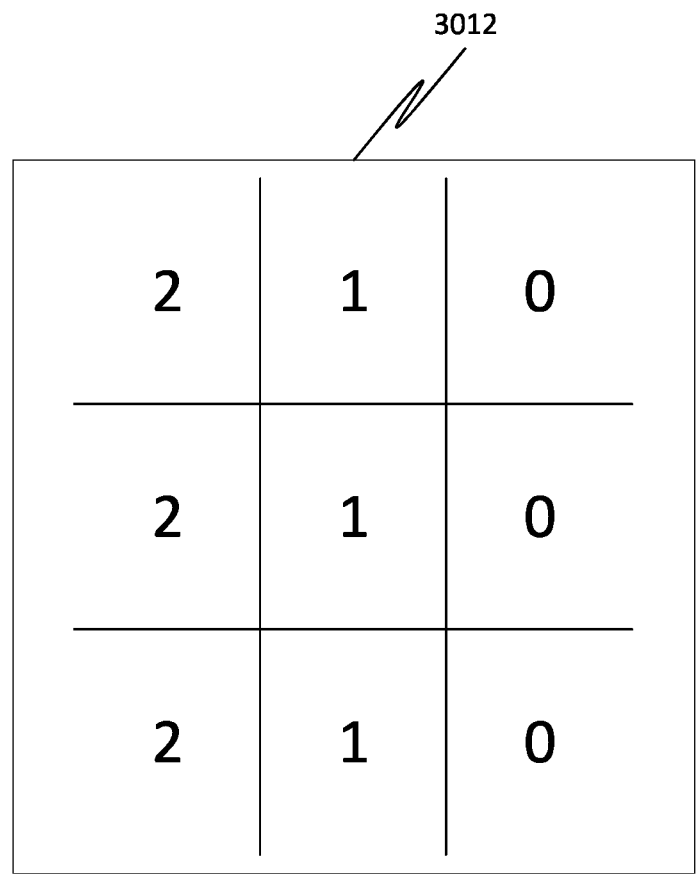
FIG. 68 illustrates a first visual representation of step 5 of the process, in accordance with some embodiments.

FIG. 68 illustrates a first visual representation 3012 of step 5 of the process, in accordance with some embodiments.

Figure 69:
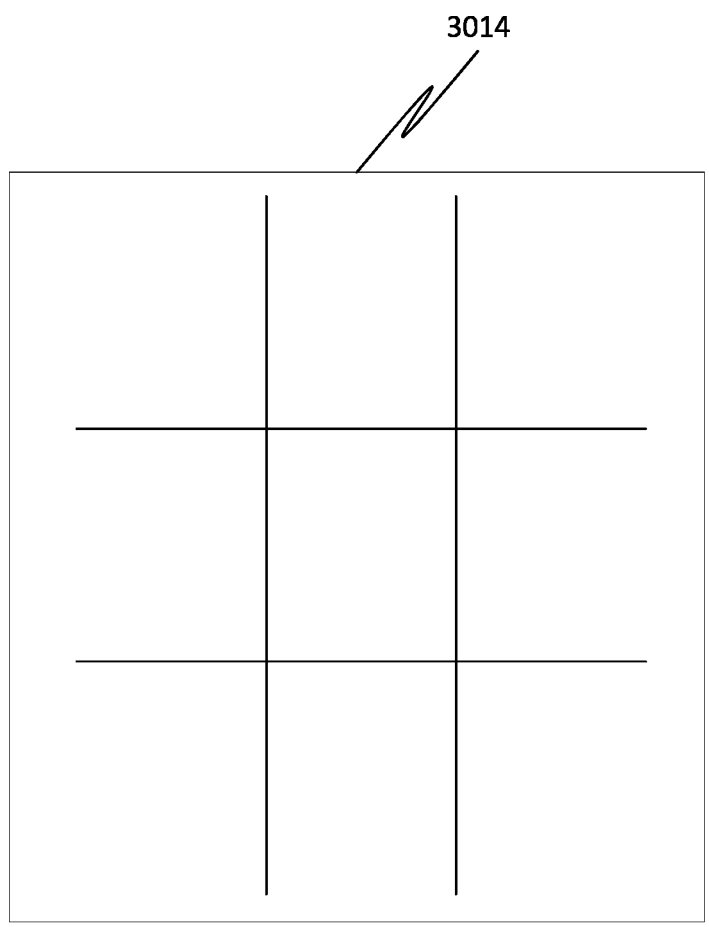
FIG. 69 illustrates a second visual representation of the step 5 of the process, in accordance with some embodiments.

FIG. 69 illustrates a second visual representation 3014 of the step 5 of the process, in accordance with some embodiments.

Figure 70:
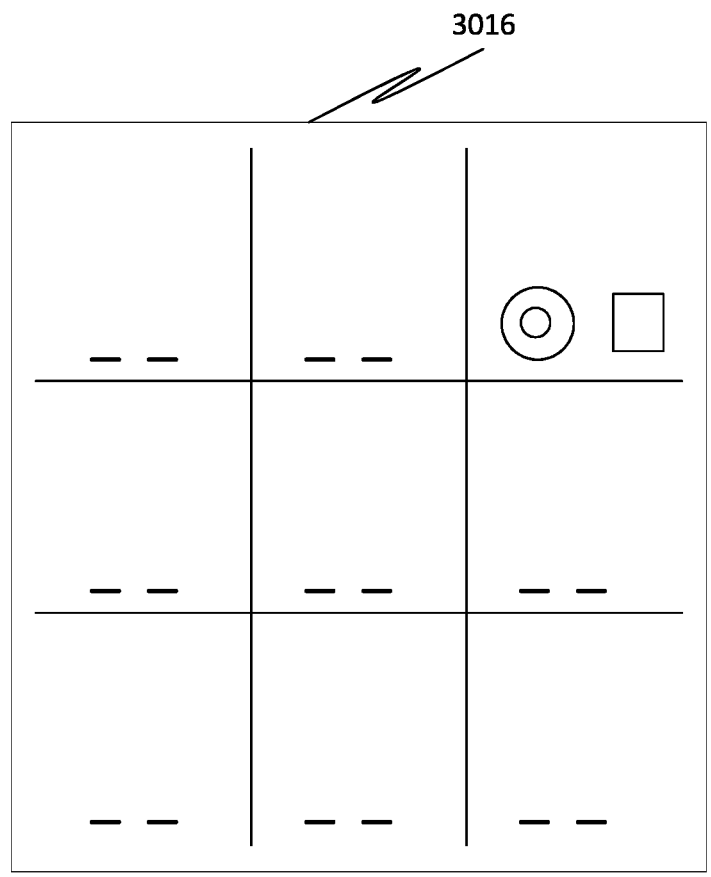
FIG. 70 illustrates a visual representation of step 6 of the process, in accordance with some embodiments.

FIG. 70 illustrates a visual representation 3016 of step 6 of the process, in accordance with some embodiments.

Figure 71:
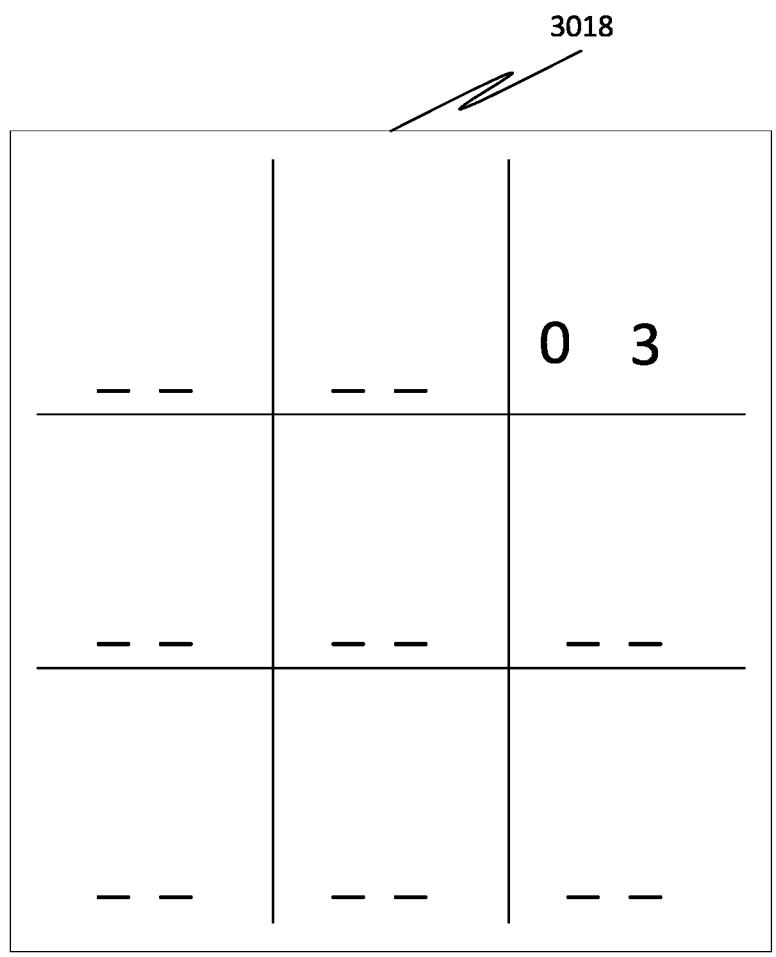
FIG. 71 illustrates a visual representation of step 7 of the process, in accordance with some embodiments.

FIG. 71 illustrates a visual representation 3018 of step 7 of the process, in accordance with some embodiments.

With reference to FIGS. 63-71 the process may include performing the "Dial Pad Exercise". The purpose of this exercise is to memorize the dial pad of a phone by going in specific directions (e.g., downwards for 3's or upwards for 7's) without having the numbers present. Like with all other processes in this patent, all the number is initially present and slowly they fade until all the numbers are gone. (3's times table will be used for this example). Step 1: Run through the 3's by going down one row at a time starting from 3 by having the students say "3, 6, 9, 2, 5, 8,1,4,7) At this point, all the numbers are present in the dial pad. Step 2: Run through the 3's by keeping lead numbers 1, 2, and 3 on top with 5 and 8 in the middle for reference (since the left of 5 is 4 and the right of 5 are 6 on a dial pad when the student gets stuck. And 8 is middle of 7 of 9, it is a good reference point.) So, when a student gets stuck on a box (e.g., they are stuck on box number 7, the teacher says, "What is the number before 8?"). Step 3: Remove all numbers except 3, 5, and 7 which are the first, middle, and last numbers. Have the student name the numbers as you point to each square (Note: The reference number can be used in a flexible way. If a student has a difficulty recalling a certain number in a certain location, it is good to place that number there). Step 4: Remove all numbers and only show the dial pad (which at this point looks like a tic tac toe board) If a student has a particular difficulty with a certain box, write that number in that box to facilitate memory. Step 5: Repeat steps 2 and 3 but with the tens digit (Initially, show the zeros, ones, and twos. Once that is mastered, only leave a one, two, and three on the top boxes. Eventually, erase all numbers and have the student name the answer to the tens digit without any clues). Step 6: Have the student recite the answer to the 3's times table by saying the answers but in the following way "zero three" "zero six" "zero nine", "one two" "one five" "one eight", and "two one" "two four" "two eight". (By stating "one two" instead of "twelve" the need to learn a new vocabulary is eliminated and can therefore streamline the process and memorize the 3's times table faster). Step 7: When the student can perform the times table on the paper, draw the dial pad on a see-through glass (e.g., with a dry erase marker and repeat the same process. This process imitates memorizing the times table by performing "mental math".

Figure 72:
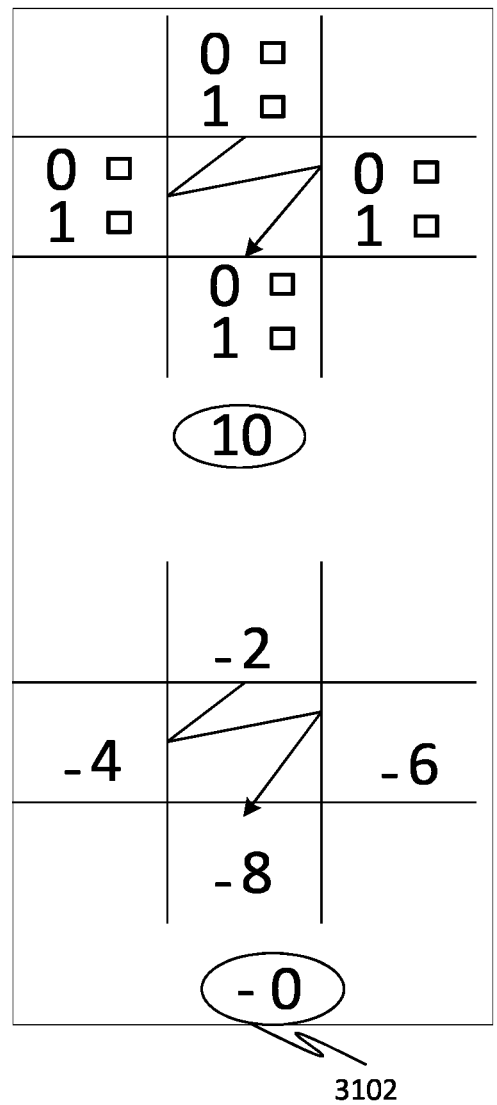
FIG. 72 illustrates a visual representation of a process for writing a times table of two ("2") with prompts for facilitating the learning of the concepts associated with mathematics, in accordance with some embodiments.

FIG. 72 illustrates a visual representation 3102 of a process for writing a times table of two ("2") with prompts for facilitating the learning of the concepts associated with mathematics, in accordance with some embodiments.

Figure 73:
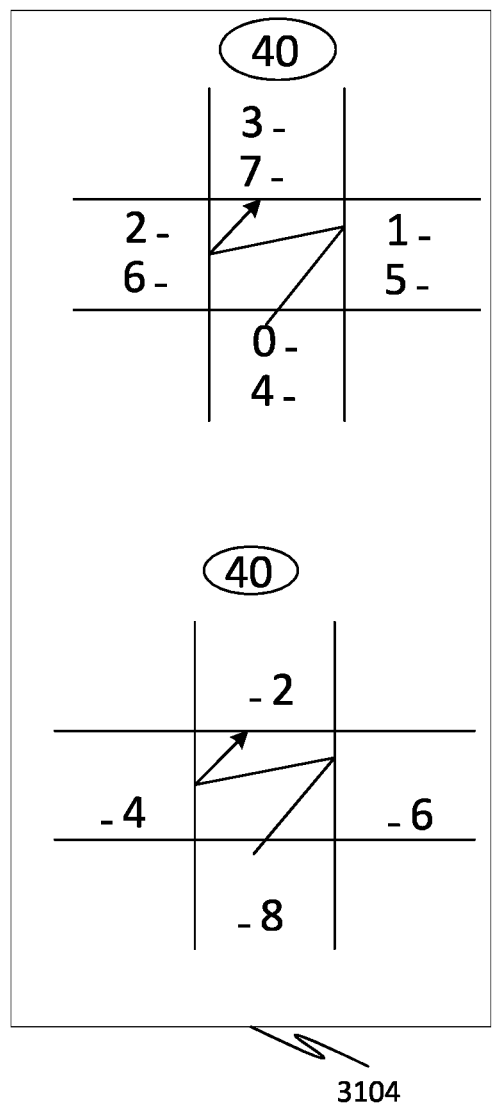
FIG. 73 illustrates a visual representation of a process for writing a times table of eight ("8") with prompts for facilitating the learning of the concepts associated with mathematics, in accordance with some embodiments.

FIG. 73 illustrates a visual representation 3104 of a process for writing a times table of eight ("8") with prompts for facilitating the learning of the concepts associated with mathematics, in accordance with some embodiments.

Figure 74:
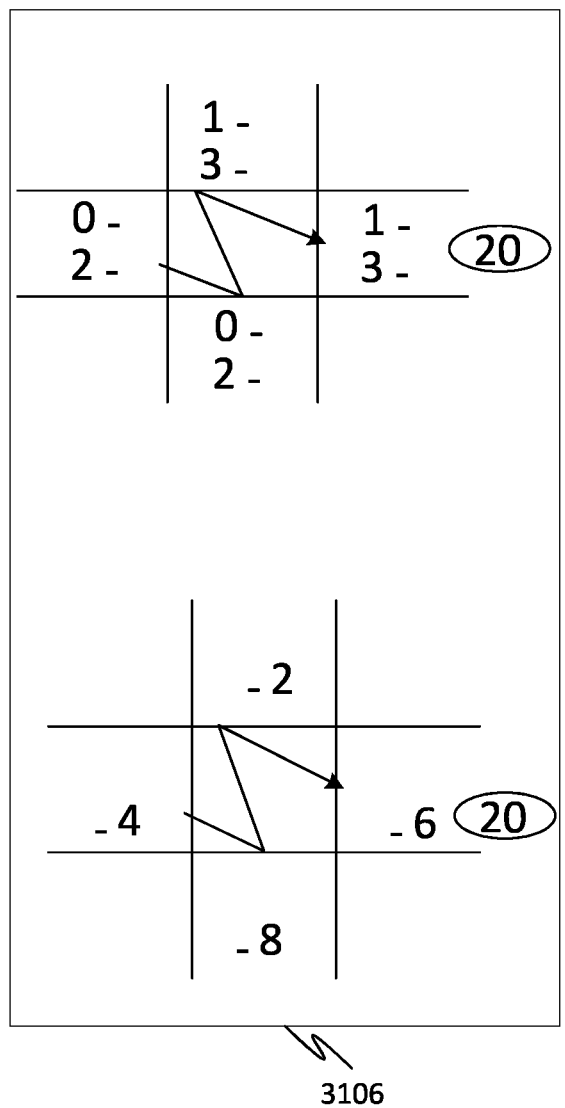
FIG. 74 illustrates a visual representation of a process for writing a times table of four ("4") with prompts for facilitating the learning of the concepts associated with mathematics, in accordance with some embodiments.

FIG. 74 illustrates a visual representation 3106 of a process for writing a times table of four ("4") with prompts for facilitating the learning of the concepts associated with mathematics, in accordance with some embodiments.

Figure 75:
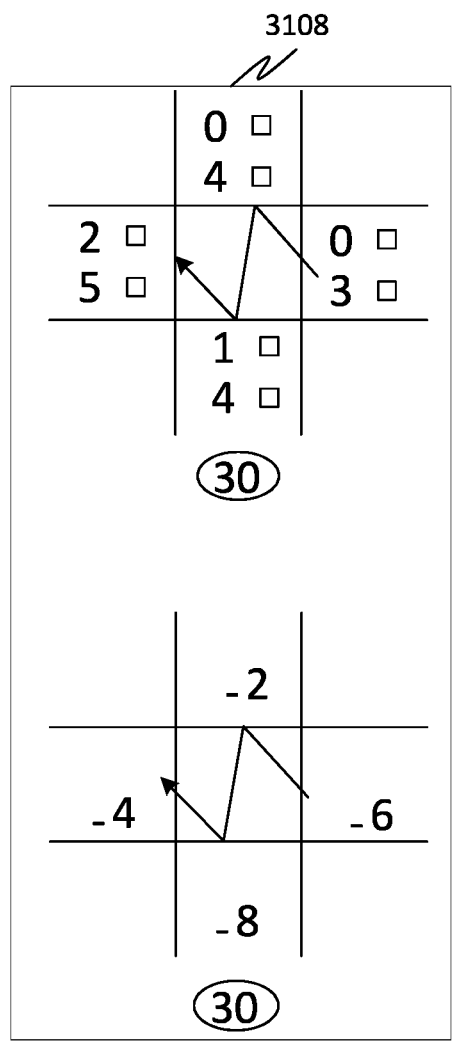
FIG. 75 illustrates a visual representation of a process for writing a times table of six ("6") with prompts for facilitating the learning of the concepts associated with mathematics, in accordance with some embodiments.

FIG. 75 illustrates a visual representation 3108 of a process for writing a times table of six ("6") with prompts for facilitating the learning of the concepts associated with mathematics, in accordance with some embodiments.

Figure 76:
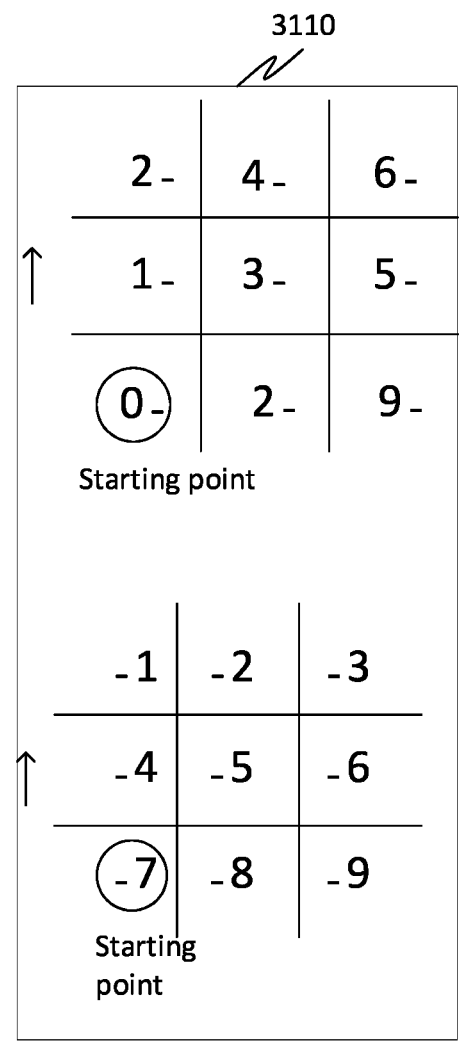

FIG. 76 illustrates a visual representation 3110 of a process for writing a times table of seven ("7") with prompts for facilitating the learning of the concepts associated with mathematics, in accordance with some embodiments.

Figure 77:
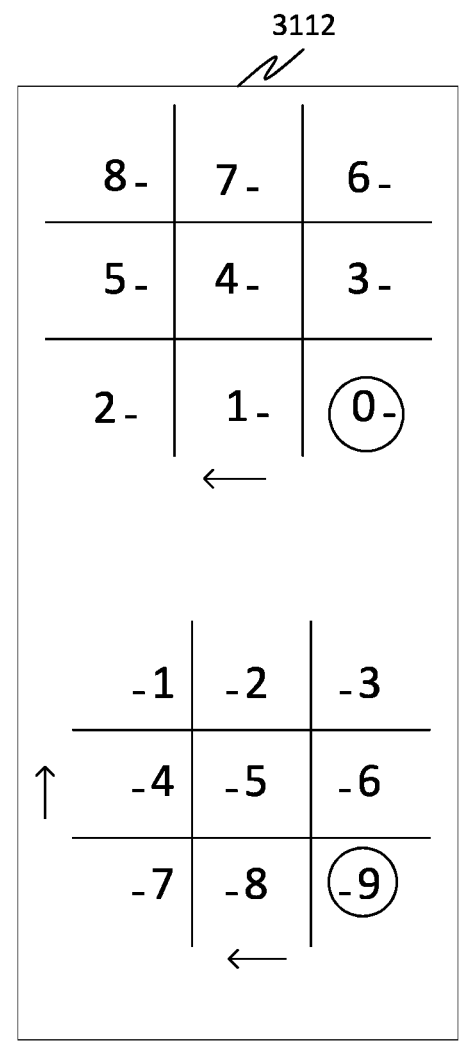

FIG. 77 illustrates a visual representation 3112 of a process for writing a times table of nine ("9") with prompts for facilitating the learning of the concepts associated with mathematics, in accordance with some embodiments.

Figure 78:
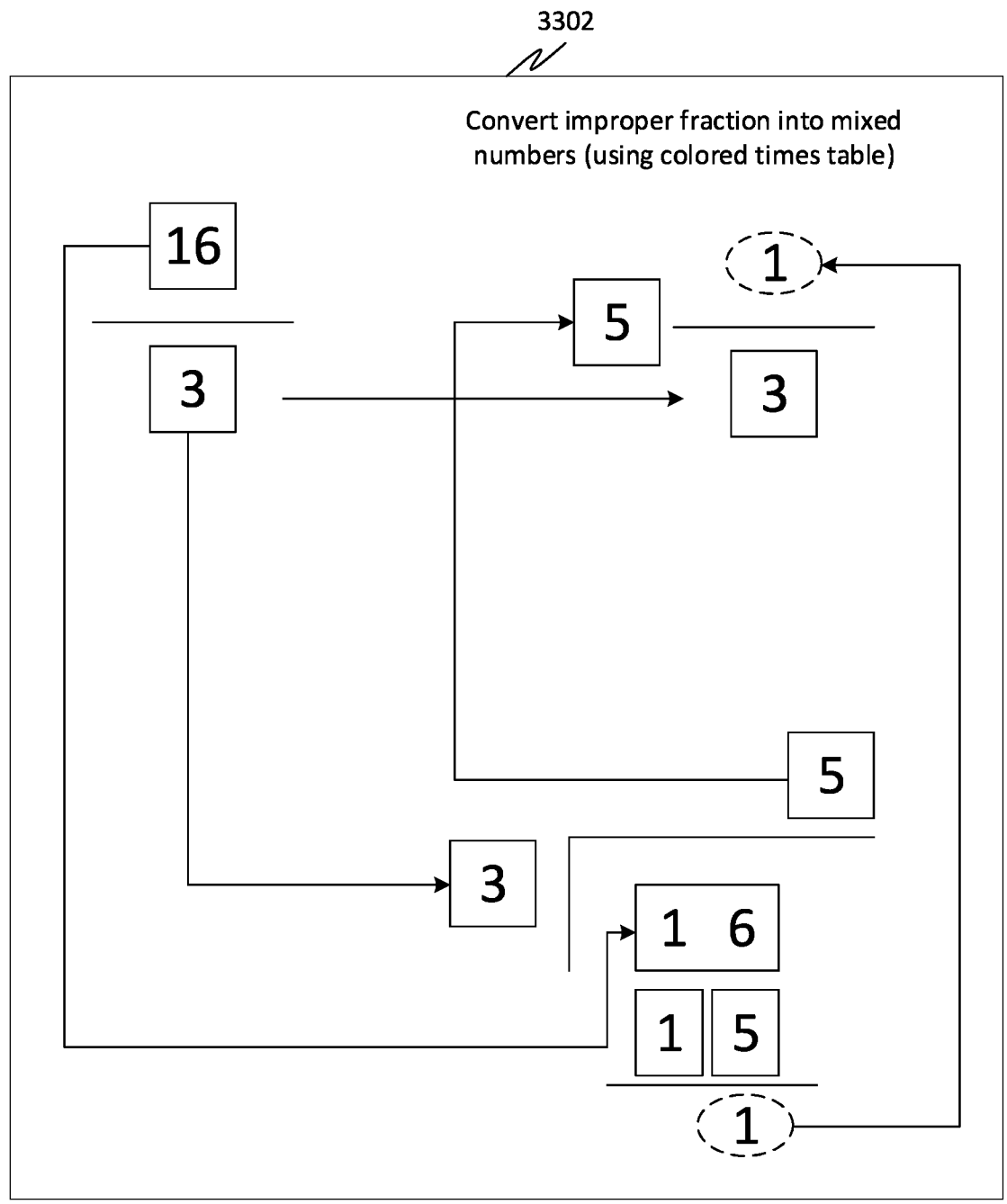
FIG. 78 illustrates a visual representation of a process for converting an improper fraction to a proper fraction with prompts for facilitating the learning of the concepts associated with mathematics, in accordance with some embodiments.

FIG. 78 illustrates a visual representation 3302 of a process for converting an improper fraction to a proper fraction with prompts for facilitating the learning of the concepts associated with mathematics, in accordance with some embodiments. Further, the colored times table may be used for the converting of the improper fraction to the proper fraction.

Figure 79:
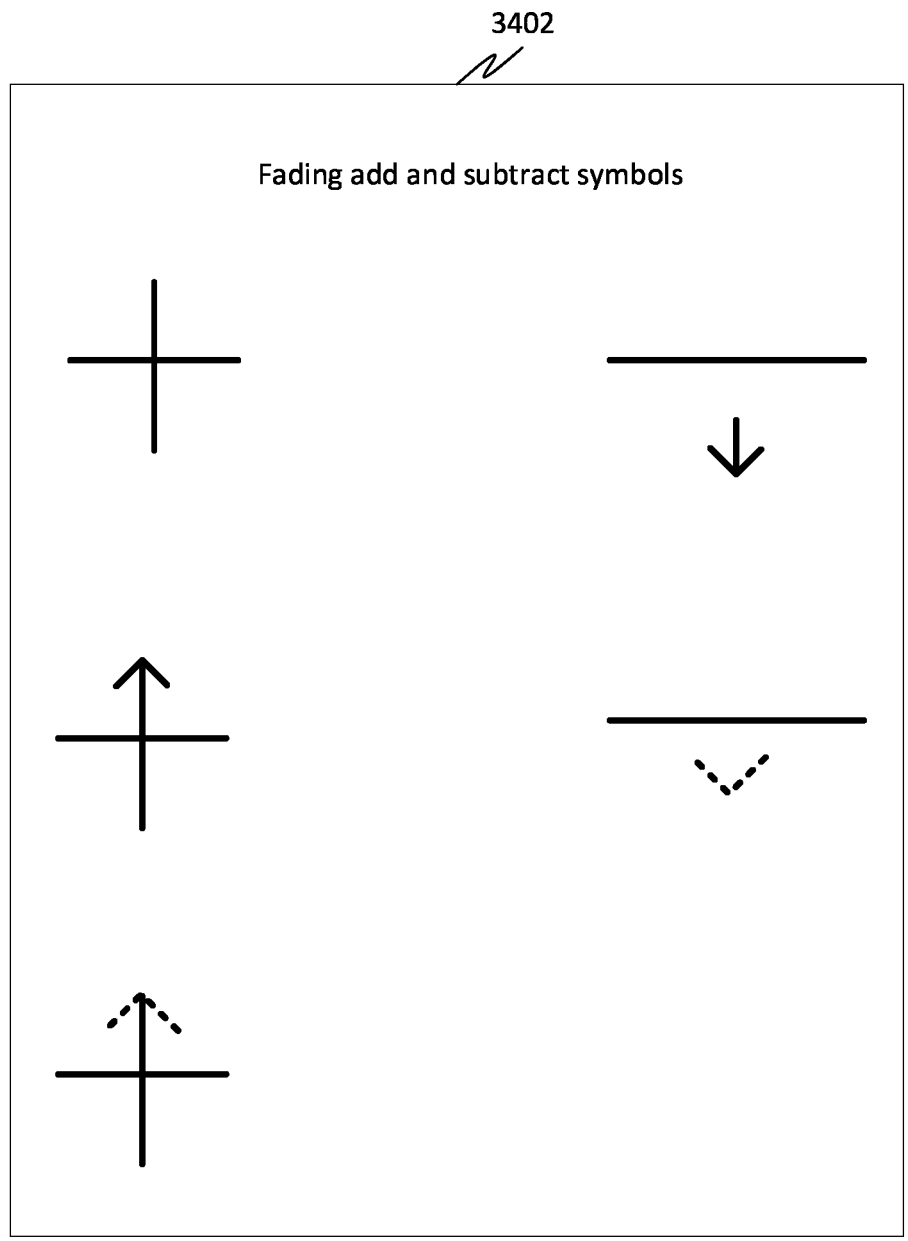
FIG. 79 illustrates a visual representation of mathematical operators with prompts for facilitating the learning of the concepts associated with mathematics, in accordance with some embodiments.

FIG. 79 illustrates a visual representation 3402 of mathematical operators with prompts for facilitating the learning of the concepts associated with mathematics, in accordance with some embodiments.

Figure 80:
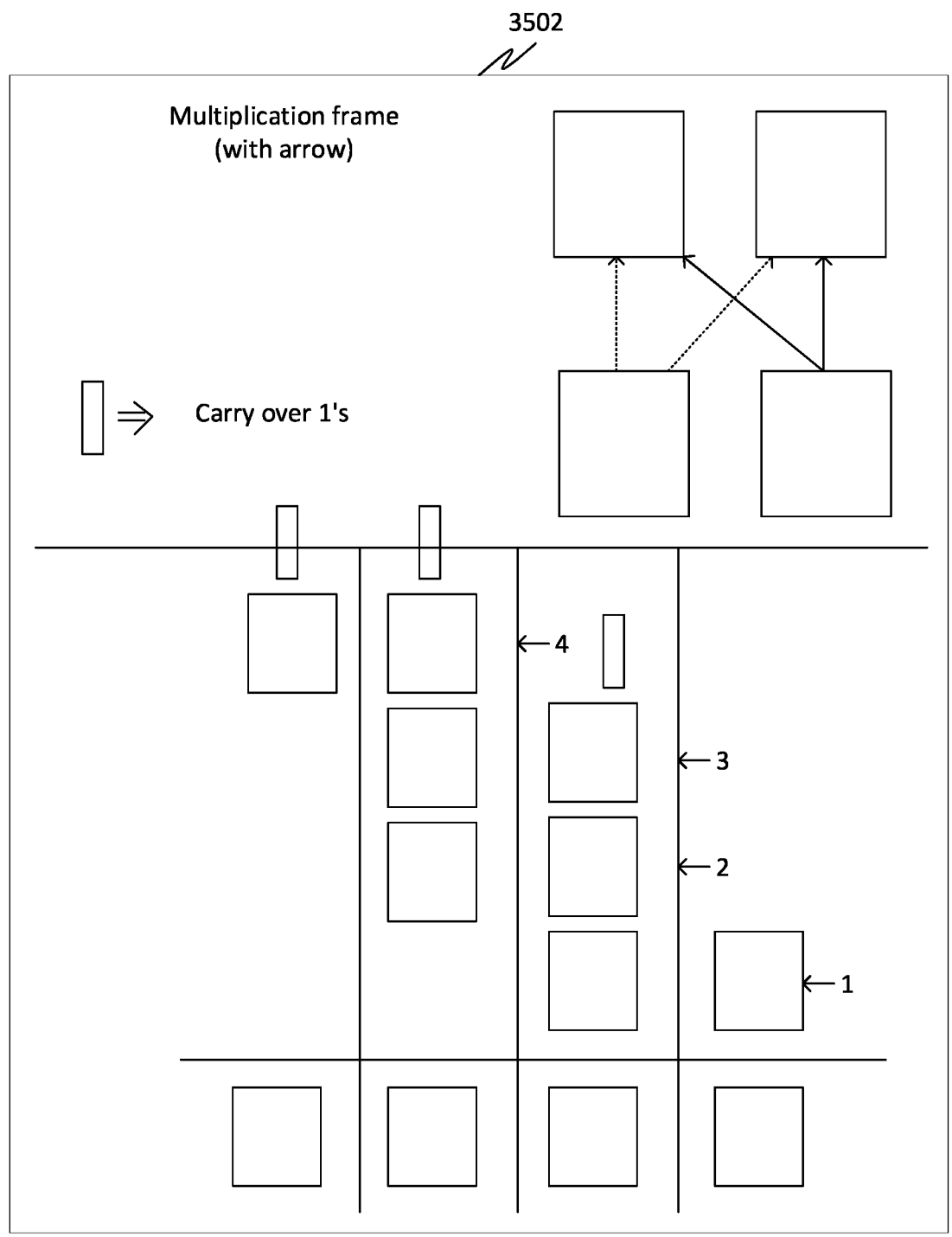
FIG. 80 illustrates a visual representation of a multiplication process with prompts for facilitating the learning of the concepts associated with mathematics, in accordance with some embodiments.

FIG. 80 illustrates a visual representation 3502 of a multiplication process with prompts for facilitating the learning of the concepts associated with mathematics, in accordance with some embodiments.

Figure 81:
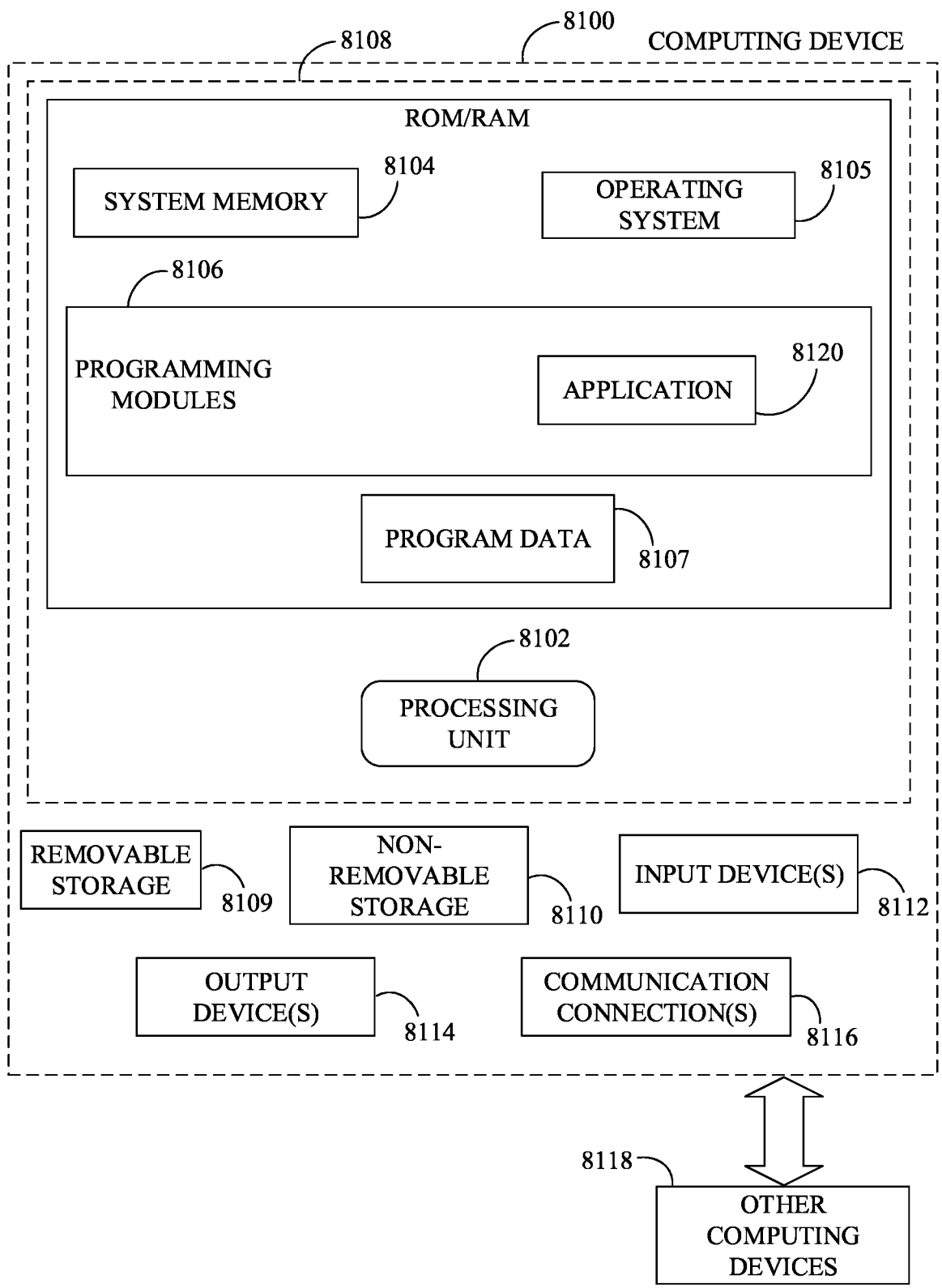
FIG. 81 is a block diagram of a computing device for implementing the methods disclosed herein, in accordance with some embodiments.

With reference to FIG. 81, a system consistent with an embodiment of the disclosure may include a computing device or cloud service, such as computing device 8100. In a basic configuration, computing device 8100 may include at least one processing unit 8102 and a system memory 8104. Depending on the configuration and type of computing device, system memory 8104 may comprise, but is not limited to, volatile (e.g., random-access memory (RAM)), non-volatile (e.g., read-only memory (ROM)), flash memory, or any combination. System memory 8104 may include operating system 8105, one or more programming modules 8106, and may include a program data 8107. Operating system 8105, for example, may be suitable for controlling computing device 8100's operation. In one embodiment, programming modules 8106 may include image-processing module, machine learning module. Furthermore, embodiments of the disclosure may be practiced in conjunction with a graphics library, other operating systems, or any other application program and is not limited to any particular application or system. This basic configuration is illustrated in FIG. 81 by those components within a dashed line 8108.

Computing device 8100 may have additional features or functionality. For example, computing device 8100 may also include additional data storage devices (removable and/or non-removable) such as, for example, magnetic disks, optical disks, or tape. Such additional storage is illustrated in FIG. 81 by a removable storage 8109 and a non-removable storage 8110. Computer storage media may include volatile and non-volatile, removable and non-removable media implemented in any method or technology for storage of information, such as computer-readable instructions, data structures, program modules, or other data. System memory 8104, removable storage 8109, and non-removable storage 8110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 8100. Any such computer storage media may be part of device 8100. Computing device 8100 may also have input device(s) 8112 such as a keyboard, a mouse, a pen, a sound input device, a touch input device, a location sensor, a camera, a biometric sensor, etc. Output device(s) 8114 such as a display, speakers, a printer, etc. may also be included. The aforementioned devices are examples and others may be used.

Computing device 8100 may also contain a communication connection 8116 that may allow device 8100 to communicate with other computing devices 8118, such as over a network in a distributed computing environment, for example, an intranet or the Internet. Communication connection 8116 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 8104, including operating system 8105. While executing on processing unit 8102, programming modules 8106 (e.g., application 8120 such as a media player) may perform processes including, for example, one or more stages of methods, algorithms, systems, applications, servers, databases as described above. The aforementioned process is an example, and processing unit 8102 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 82:
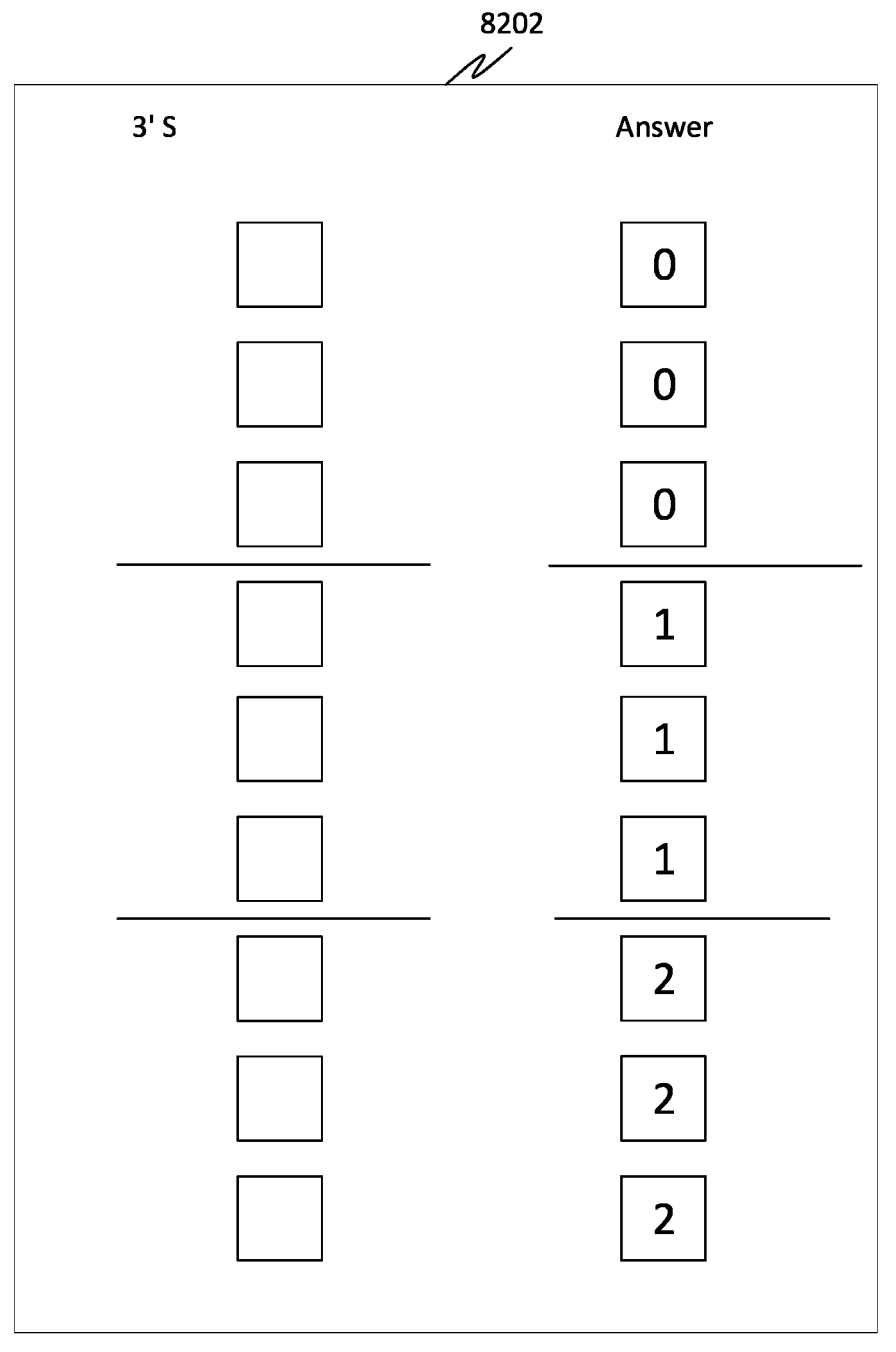

FIG. 82 illustrates a visual representation 8202 of a practice frame for learning a ten's digits of a times table of three ("3") with prompts for facilitating the learning of the concepts associated with mathematics, in accordance with some embodiments. Further, students fill out blank boxes of the practice frame for the times table of three ("3") associated with "answer". Further, the practice frame allows the students to isolate the ten's digit from one's digit of the times table and emphasize a repetition pattern of the ten's digit.

Figure 83:
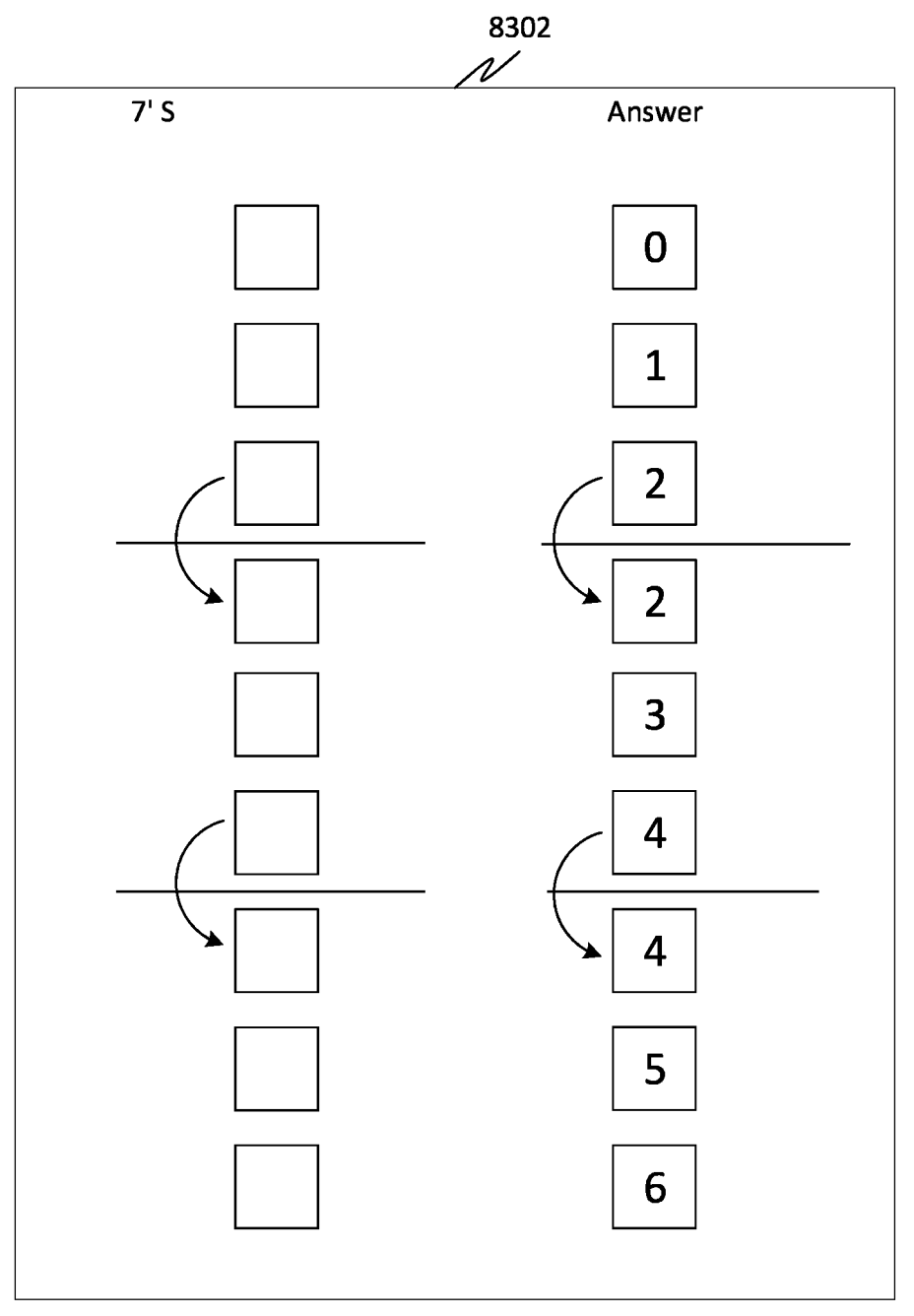

FIG. 83 illustrates a visual representation 8302 of a practice frame for learning a ten's digits of a times table of seven ("7") with prompts for facilitating the learning of the concepts associated with mathematics, in accordance with some embodiments. Further, students fill out blank boxes of the practice frame for the times table of seven ("7") associated with "answer".

Figure 84:
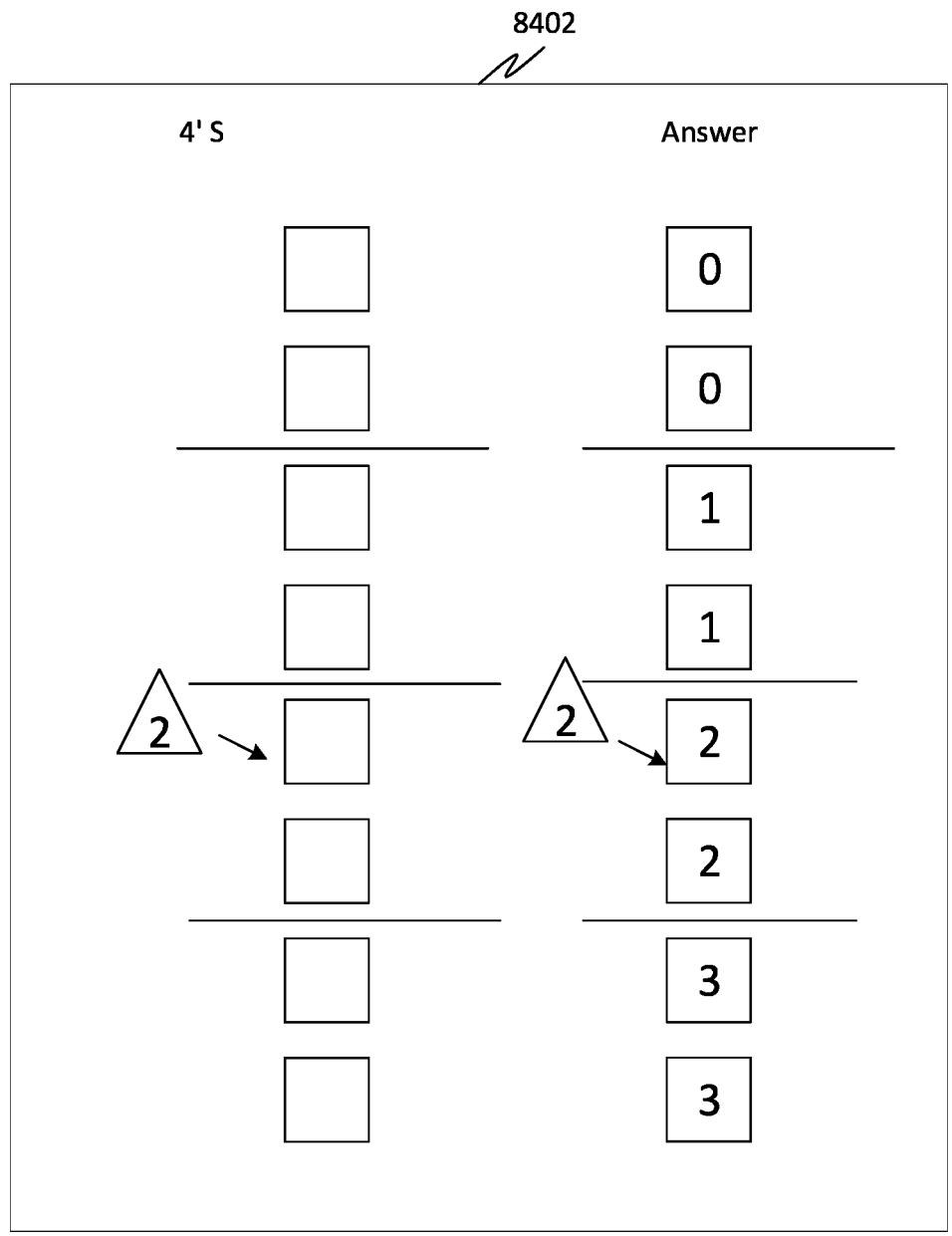
FIG. 84 illustrates a visual representation of a practice frame for learning a ten's digits of a times table of four ("4") with prompts for facilitating the learning of the concepts associated with mathematics, in accordance with some embodiments.

FIG. 84 illustrates a visual representation 8402 of a practice frame for learning a ten's digits of a times table of four ("4") with prompts for facilitating the learning of the concepts associated with mathematics, in accordance with some embodiments. Further, students fill out blank boxes of the practice frame for the times table of four ("4") associated with "answer".

Figure 85:
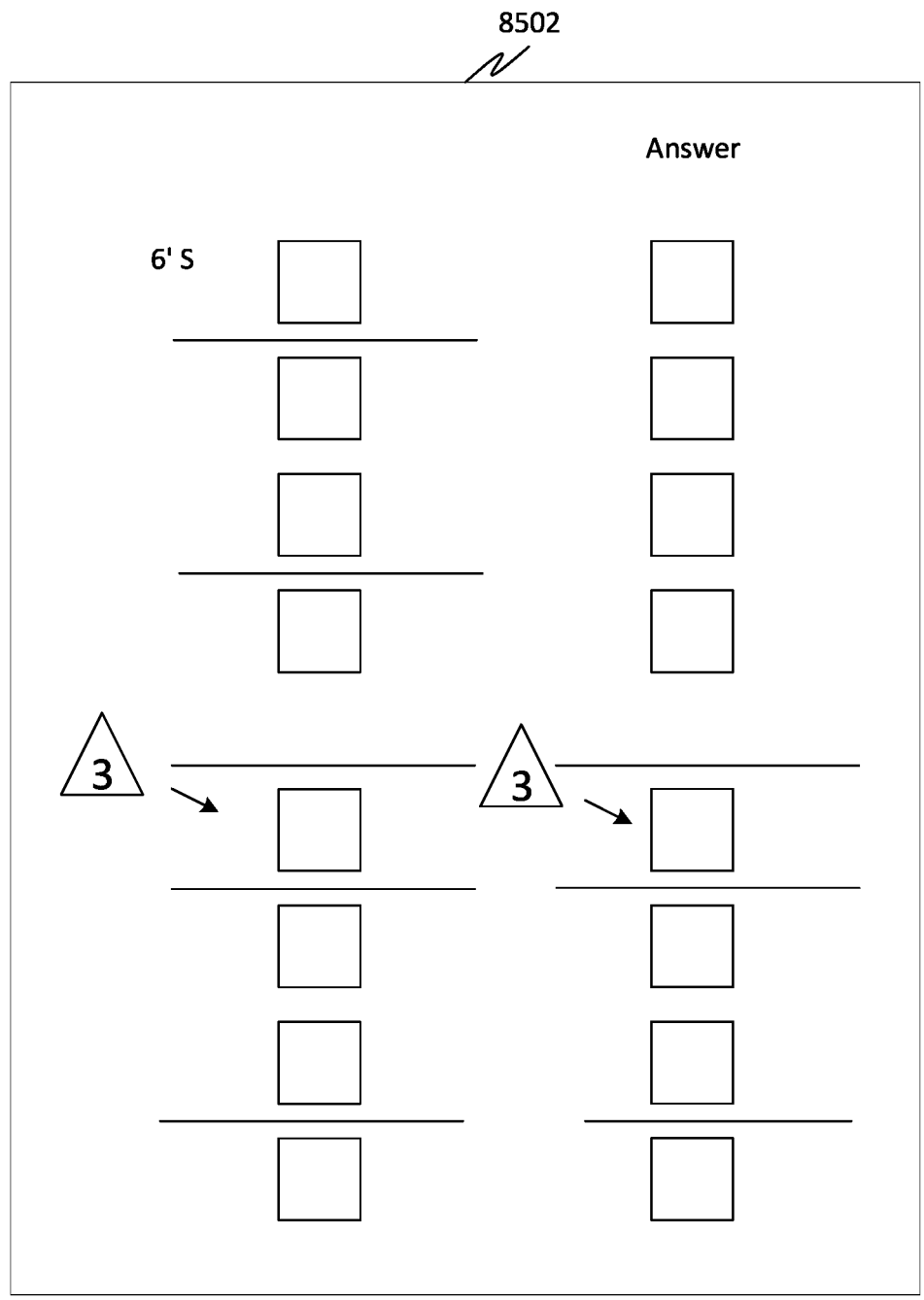
FIG. 85 illustrates a visual representation of a practice frame for learning a ten's digits of a times table of six ("6") with prompts for facilitating the learning of the concepts associated with mathematics, in accordance with some embodiments.

FIG. 85 illustrates a visual representation 8502 of a practice frame for learning a ten's digits of a times table of six ("6") with prompts for facilitating the learning of the concepts associated with mathematics, in accordance with some embodiments. Further, students fill out blank boxes of the practice frame for the times table of six ("6") associated with "answer".

Figure 86:
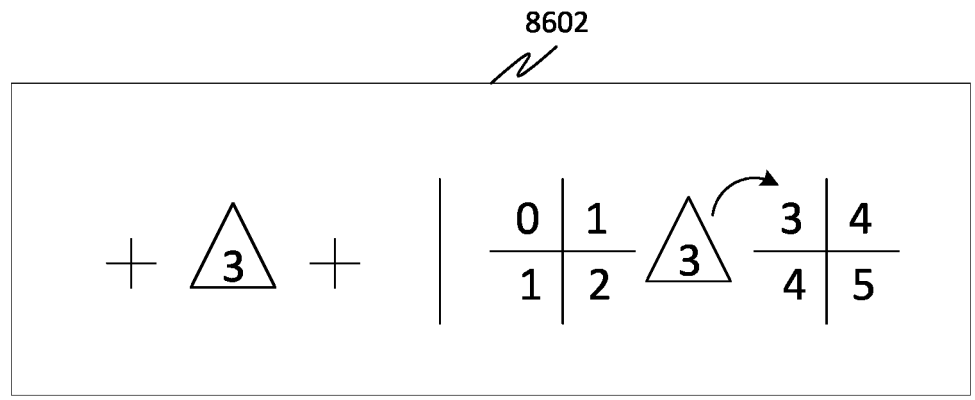
FIG. 86 illustrates a visual representation of an alternate practice frame for learning a ten's digits of the times table of six ("6") with prompts for facilitating the learning of the concepts associated with mathematics, in accordance with some embodiments.

FIG. 86 illustrates a visual representation 8602 of an alternate practice frame for learning a ten's digits of the times table of six ("6") with prompts for facilitating the learning of the concepts associated with mathematics, in accordance with some embodiments.

Figure 87:
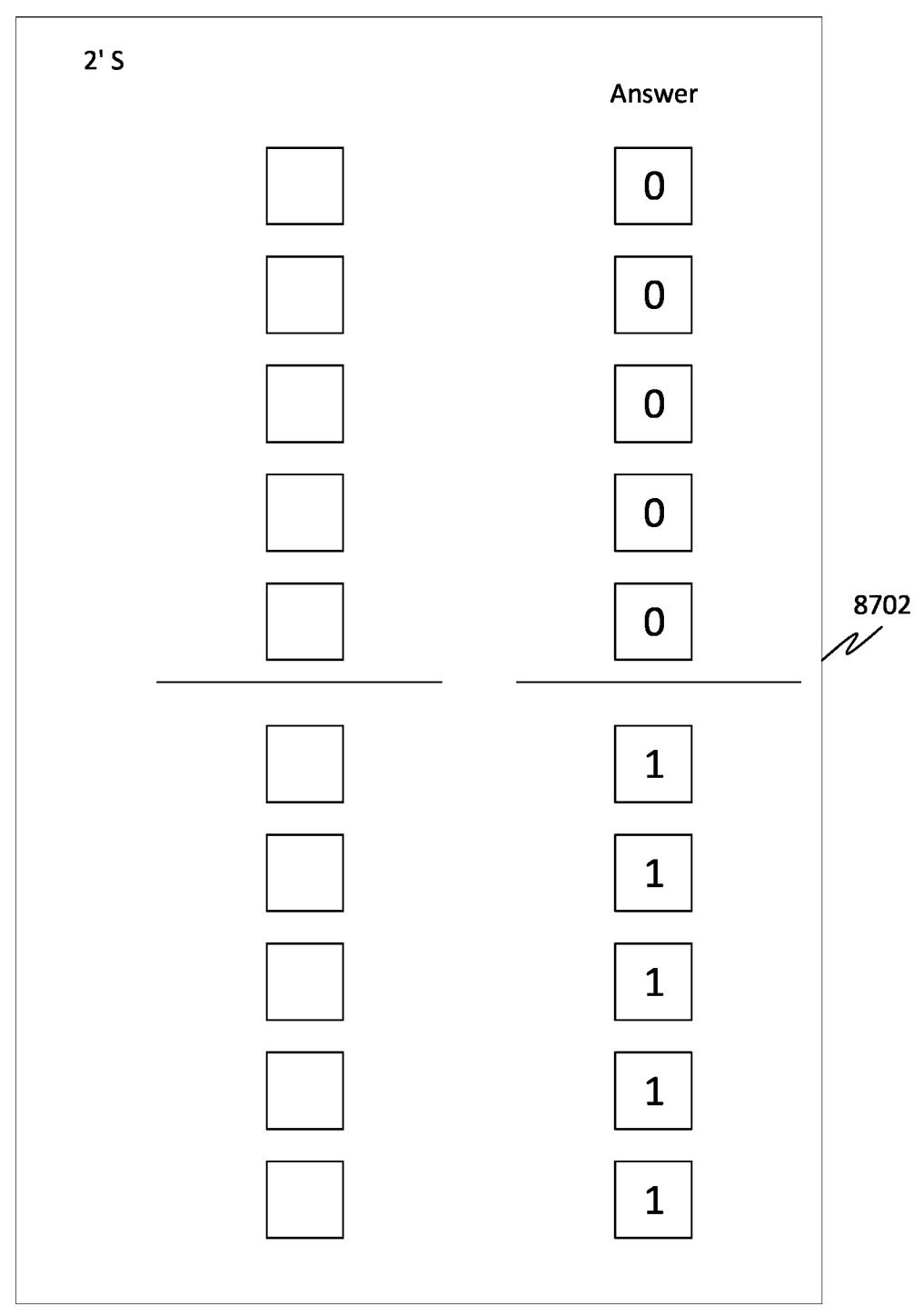

FIG. 87 illustrates a visual representation 8702 of a practice frame for learning a ten's digits of a times table of two ("2") with prompts for facilitating the learning of the concepts associated with mathematics, in accordance with some embodiments. Further, students fill out blank boxes of the practice frame for the times table of two ("2") associated with "answer".

Figure 88:
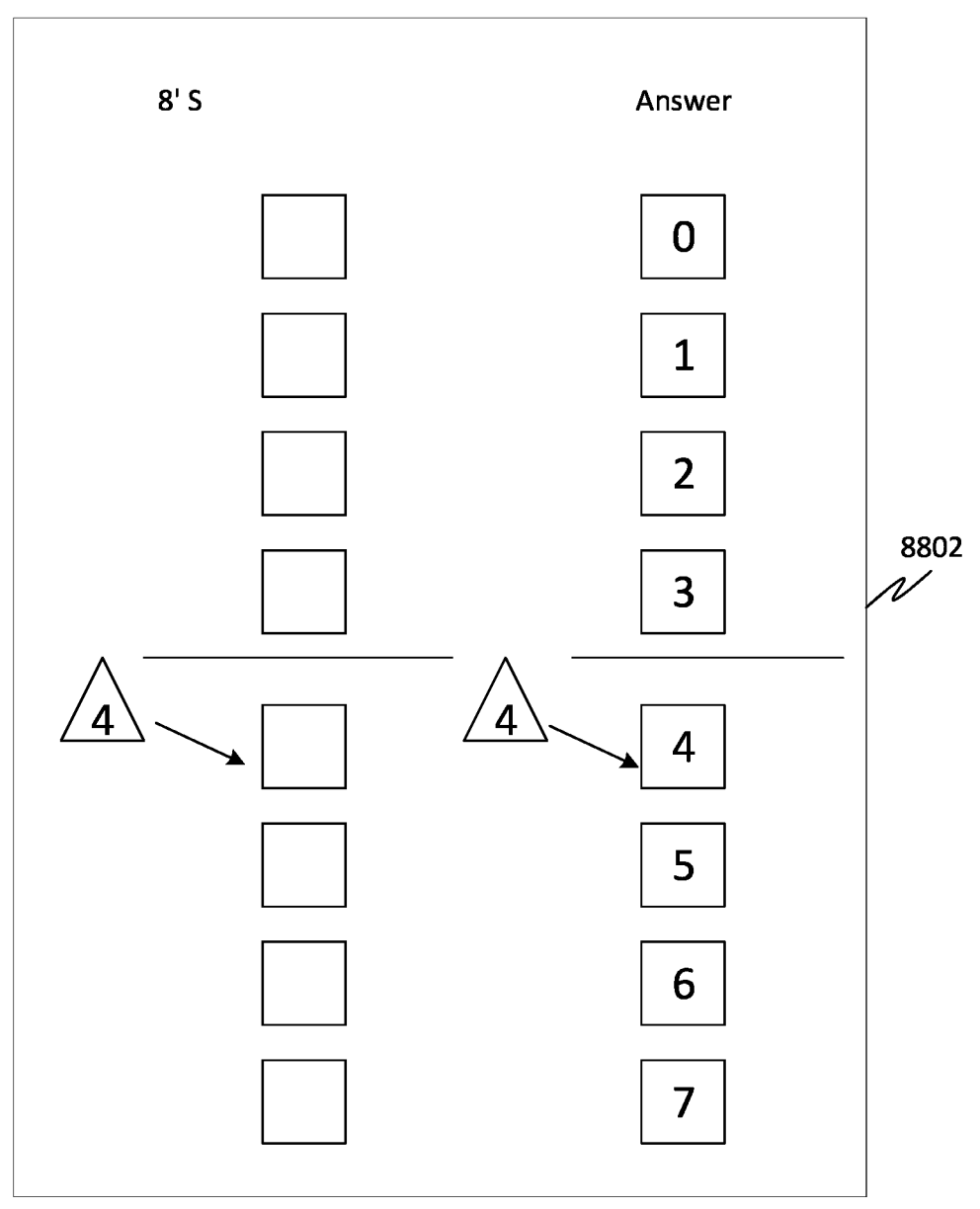

FIG. 88 illustrates a visual representation 8802 of a practice frame for learning a ten's digits of a times table of eight ("8") with prompts for facilitating the learning of the concepts associated with mathematics, in accordance with some embodiments. Further, students fill out blank boxes of the practice frame for the times table of eight ("8") associated with "answer".

Although the present disclosure has been explained in relation to its preferred embodiment, it is to be understood that many other possible modifications and variations can be made without departing from the spirit and scope of the disclosure.

What is claimed is:

1. A method for facilitating learning of concepts associated with mathematics, the method comprising:
   receiving, using a communication device, a request for learning a concept associated with mathematics from at least one user device, wherein the request comprises the concept;
   retrieving, using a storage device, an example associated with the concept based on the concept, wherein the example comprises at least one example component, wherein the at least one example component comprises at least one numeric digit;

generating, using a processing device, a dynamic prompt for the example based on the example, wherein the dynamic prompt assists a user in performing a task for the learning of the concept, wherein the dynamic prompt is associated with a visual prompt representation, wherein the visual prompt representation is configured to be transitionable between a plurality of modified visual prompt representations;

integrating, using the processing device, the dynamic prompt with the at least one example component based on the generating;

generating, using the processing device, a visual representation of the example based on the integrating;

transmitting, using the communication device, the visual representation of the example to the at least one user device, wherein the at least one user device comprises at least one output device and at least one input device, wherein the at least one output device is configured for presenting the visual representation of the example to the user, wherein the at least one input device is configured for receiving at least one input from the user corresponding to the performing of the task, wherein the visual prompt representation of the dynamic prompt transitions to one of the plurality of modified visual prompt representations based on the at least one input;

generating, using the processing device, at least one visual numeric representation of the at least one numeric digit based on the at least one numeric digit;

identifying, using the processing device, at least one object similar to the at least one visual numeric representation based on the at least one visual numeric representation;

objectifying, using the processing device, the at least one visual numeric representation based on the at least one object; and generating, using the processing device, at least one objectified numeric visual representation of the at least one numeric digit based on the objectifying, wherein the integrating comprises overlaying the visual prompt representation of the dynamic prompt over the at least one objectified numeric visual representation, wherein the generating of the visual representation is further based on the overlaying of the visual prompt representation of the dynamic prompt over the at least one objectified numeric visual representation.

2. The method of claim 1, wherein the dynamic prompt comprises a number of dynamic prompts, wherein the number of dynamic prompts is equal to a numerical value of one of the at least one numeric digit, wherein the overlaying of the visual prompt representation of the dynamic prompt over the at least one objectified numeric visual representation comprises overlaying the visual prompt representation of each of the number of dynamic prompts over one of the at least one objectified numeric visual representation, wherein the generating of the visual representation of the example is further based on the overlaying of the visual prompt representation of each of the number of dynamic prompts over one of the at least one objectified numeric visual representation.

3. The method of claim 2 further comprising:
analyzing, using the processing device, one of the at least one objectified numeric visual representation;
identifying, using the processing device, a number of features in one of the at least one objectified numeric visual representation based on the analyzing, wherein the number of features of one of the at least one objectified numeric visual representation corresponds to the numerical value of one of the at least one numeric digit; and
assigning, using the processing device, each of the number of dynamic prompts to each of the number of features in one of the at least one objectified numeric visual representation based on the identifying of the number of features, wherein the overlaying of the visual prompt representation of each of the number of dynamic prompts over one of the at least one objectified numeric visual representation comprises placing the visual prompt representation of each of the number of dynamic prompts onto each of the number of features in one of the at least one objectified numeric visual representation, wherein the generating of the visual representation of the example is further based on the placing.

4. The method of claim 3, wherein the analyzing of the at least one objectified numeric visual representation comprises analyzing the at least one objectified numeric visual representation using at least one machine learning model, wherein the at least one machine learning model is trained for identifying distinct visual features in visual representations, wherein the identifying of the number of features in one of the at least one objectified numeric visual representation based on the analyzing of the at least one objectified numeric visual representation using the at least one machine learning model.

5. The method of claim 3, wherein the number of dynamic prompts is countable by the user by perceiving the visual representation of each of the number of dynamic prompts based on the presenting of the visual representation, wherein the performing of the task by the user is based on counting the visual representation of each of the number of dynamic prompts.

6. The method of claim 1 further comprising:
analyzing, using the processing device, the at least one input;
determining, using the processing device, a learning status of the user based on the analysing of the at least one input; and
identifying, using the processing device, the example based on the learning status, wherein the retrieving of the example is further based on the identifying of the example.

7. The method of claim 1, wherein the at least one example component further comprises at least one mathematical operator, wherein the method further comprises generating, using the processing device, at least one visual operator representation of the at least one mathematical operator based on the at least one mathematical operator, wherein the integrating comprises overlaying the visual prompt representation of the dynamic prompt over the at least one visual operator representation, wherein the generating of the visual representation is further based on the overlaying of the visual prompt representation of the dynamic prompt over the at least one visual operator representation.

8. The method of claim 1, wherein the at least one example component further comprises at least one mathematical symbol, wherein the method further comprises generating, using the processing device, at least one visual symbol representation of the at least one mathematical symbol based on the at least one mathematical symbol, wherein the integrating comprises overlaying the visual prompt representation of the dynamic prompt over the at least one visual symbol representation, wherein the generating of the visual representation is further based on the overlaying of the visual prompt representation of the dynamic prompt over the at least one visual symbol representation.

9. A system for facilitating learning of concepts associated with mathematics, the system comprising:
a communication device configured for:
receiving a request for learning a concept associated with mathematics from at least one user device, wherein the request comprises the concept; and
transmitting a visual representation of an example to the at least one user device, wherein the at least one user device comprises at least one output device and at least one input device, wherein the at least one output device is configured for presenting the visual representation of the example to a user, wherein the at least one input device is configured for receiving at least one input from the user corresponding to performing a task;
a storage device communicatively coupled with the communication device, wherein the storage device is configured for retrieving the example associated with the concept based on the concept, wherein the example comprises at least one example component, wherein the at least one example component comprises at least one numeric digit; and
a processing device communicatively coupled with the communication device and the storage device, wherein the processing device is configured for:
generating a dynamic prompt for the example based on the example, wherein the dynamic prompt assists the user in the performing of the task for the learning of the concept, wherein the dynamic prompt is associated with a visual prompt representation, wherein the visual prompt representation is configured to be transitionable between a plurality of modified visual prompt representations, wherein the visual prompt representation of the dynamic prompt transitions to one of the plurality of modified visual prompt representations based on the at least one input;
integrating the dynamic prompt with the at least one example component based on the generating;
generating the visual representation of the example based on the integrating;
generating at least one visual numeric representation of the at least one numeric digit based on the at least one numeric digit;
identifying at least one object similar to the at least one visual numeric representation based on the at least one visual numeric representation;
objectifying the at least one visual numeric representation based on the at least one object; and
generating at least one objectified numeric visual representation of the at least one numeric digit based on the objectifying, wherein the integrating comprises overlaying the visual prompt representation of the dynamic prompt over the at least one objectified numeric visual representation, wherein the generating of the visual representation is further based on the overlaying of the visual prompt representation of the dynamic prompt over the at least one objectified numeric visual representation.

10. The system of claim 9 wherein the dynamic prompt comprises a number of dynamic prompts, wherein the number of dynamic prompts is equal to a numerical value of one of the at least one numeric digit, wherein the overlaying of the visual prompt representation of the dynamic prompt over the at least one objectified numeric visual representation comprises overlaying the visual prompt representation of each of the number of dynamic prompts over one of the at least one objectified numeric visual representation, wherein the generating of the visual representation of the example is further based on the overlaying of the visual prompt representation of each of the number of dynamic prompts over one of the at least one objectified numeric visual representation.

11. The system of claim 10, wherein the processing device is further configured for:
analyzing one of the at least one objectified numeric visual representation;
identifying a number of features in one of the at least one objectified numeric visual representation based on the analyzing, wherein the number of features of one of the at least one objectified numeric visual representation corresponds to the numerical value of one of the at least one numeric digit; and
assigning each of the number of dynamic prompts to each of the number of features in one of the at least one objectified numeric visual representation based on the identifying of the number of features, wherein the overlaying of the visual prompt representation of each of the number of dynamic prompts over one of the at least one objectified numeric visual representation comprises placing the visual prompt representation of each of the number of dynamic prompts onto each of the number of features in one of the at least one objectified numeric visual representation, wherein the generating of the visual representation of the example is further based on the placing.

12. The system of claim 11, wherein the analyzing of the at least one objectified numeric visual representation comprises analyzing the at least one objectified numeric visual representation using at least one machine learning model, wherein the at least one machine learning model is trained for identifying distinct visual features in visual representations, wherein the identifying of the number of features in one of the at least one objectified numeric visual representation based on the analyzing of the at least one objectified numeric visual representation using the at least one machine learning model.

13. The system of claim 11, wherein the number of dynamic prompts is countable by the user by perceiving the visual representation of each of the number of dynamic prompts based on the presenting of the visual representation, wherein the performing of the task by the user is based on counting the visual representation of each of the number of dynamic prompts.

14. The system of claim 9, wherein the processing device is further configured for:
analyzing the at least one input;
determining a learning status of the user based on the analysing of the at least one input; and
identifying the example based on the learning status, wherein the retrieving of the example is further based on the identifying of the example.

15. The system of claim 9, wherein the at least one example component further comprises at least one mathematical operator, wherein the processing device is further configured for generating at least one visual operator representation of the at least one mathematical operator based on the at least one mathematical operator, wherein the integrating comprises overlaying the visual prompt representation of the dynamic prompt over the at least one visual operator representation, wherein the generating of the visual representation is further based on the overlaying of the visual prompt representation of the dynamic prompt over the at least one visual operator representation.

16. The system of claim 9, wherein the at least one example component further comprises at least one mathematical symbol, wherein the processing device is further configured for generating at least one visual symbol representation of the at least one mathematical symbol based on the at least one mathematical symbol, wherein the integrating comprises overlaying the visual prompt representation of the dynamic prompt over the at least one visual symbol representation, wherein the generating of the visual representation is further based on the overlaying of the visual prompt representation of the dynamic prompt over the at least one visual symbol representation.

17. A device for facilitating learning of concepts associated with mathematics, the device comprising:
   at least one input device configured for:
      receiving a request for learning a concept associated with mathematics from a user, wherein the request comprises the concept; and
      receiving at least one input from the user corresponding to performing a task by the user;
   a storage device communicatively coupled with the at least one input device, wherein the storage device is configured for retrieving an example associated with the concept based on the concept, wherein the example comprises at least one example component, wherein the at least one example component comprises at least one numeric digit;
   a processing device communicatively coupled with the storage device, wherein the processing device is configured for:
      generating a dynamic prompt for the example based on the example, wherein the dynamic prompt assists the user in the performing of the task for the learning of the concept, wherein the dynamic prompt is associated with a visual prompt representation, wherein the visual prompt representation is configured to be transitionable between a plurality of modified visual prompt representations;
      integrating the dynamic prompt with the at least one example component based on the generating;
      generating a visual representation of the example based on the integrating;
      generating at least one visual numeric representation of the at least one numeric digit based on the at least one numeric digit;
      identifying at least one object similar to the at least one visual numeric representation based on the at least one visual numeric representation;
      objectifying the at least one visual numeric representation based on the at least one object; and
      generating at least one objectified numeric visual representation of the at least one numeric digit based on the objectifying, wherein the integrating comprises overlaying the visual prompt representation of the dynamic prompt over the at least one objectified numeric visual representation, wherein the generating of the visual representation is further based on the overlaying of the visual prompt representation of the dynamic prompt over the at least one objectified numeric visual representation; and
   at least one output device communicatively coupled with the processing device and the at least one input device, wherein the at least one output device is configured for presenting the visual representation of the example to the user, wherein the visual prompt representation of the dynamic prompt in the visual representation transitions to one of the plurality of modified visual prompt representations based on the at least one input.

* * * * *